United States Patent
Oren et al.

(10) Patent No.: US 9,862,551 B2
(45) Date of Patent: Jan. 9, 2018

(54) METHODS AND SYSTEMS TO TRANSFER PROPPANT FOR FRACKING WITH REDUCED RISK OF PRODUCTION AND RELEASE OF SILICA DUST AT A WELL SITE

(71) Applicant: Oren Technologies, LLC, Houston, TX (US)

(72) Inventors: John Oren, Houston, TX (US); Joshua Oren, Houston, TX (US)

(73) Assignee: OREN TECHNOLOGIES, LLC, Houston, TX (US)

(*) Notice: Subject to any disclaimer, the term of this patent is extended or adjusted under 35 U.S.C. 154(b) by 0 days.

(21) Appl. No.: 14/927,614

(22) Filed: Oct. 30, 2015

(65) Prior Publication Data
US 2016/0046438 A1    Feb. 18, 2016

Related U.S. Application Data

(63) Continuation of application No. 14/676,039, filed on Apr. 1, 2015, now Pat. No. 9,340,353, which is a
(Continued)

(51) Int. Cl.
*B65G 47/19* (2006.01)
*B65D 83/06* (2006.01)
(Continued)

(52) U.S. Cl.
CPC .............. *B65G 47/19* (2013.01); *B65D 83/06* (2013.01); *B65D 88/30* (2013.01); *B65D 90/587* (2013.01);
(Continued)

(58) Field of Classification Search
CPC ........ B65D 88/28; B65D 88/30; B65D 88/32; B65D 88/54; B65D 88/128; B65D 90/12;
(Continued)

(56) References Cited

U.S. PATENT DOCUMENTS

| 137,871 A | 4/1873 | Worsley |
| 150,894 A | 5/1874 | Safely |

(Continued)

FOREIGN PATENT DOCUMENTS

| CA | 2023138 | 2/1992 |
| CA | 2791088 | 3/2013 |

(Continued)

OTHER PUBLICATIONS

International Search Report for PCT/US15/35635, dated Oct. 30, 2015. (12 pages).
(Continued)

*Primary Examiner* — Glenn Myers
(74) *Attorney, Agent, or Firm* — Hogan Lovells US LLP

(57) ABSTRACT

Embodiments of methods and systems of transferring proppant for fracking to reduce risk of production and release of silica dust at a well site are provided. An embodiment of a method can include positioning a plurality of containers each having proppant for fracking contained therein onto a conveyor at a well site, downwardly discharging proppant from each respective container of the plurality of containers, funneling proppant from the one or more outlets of each of the plurality of containers through a plurality of conveyor hoppers, receiving proppant onto the conveyor belt, conveying proppant on the conveyor to a chute, and depositing the proppant into the chute for use in a blender or other location at the well site.

13 Claims, 23 Drawing Sheets

Related U.S. Application Data continuation-in-part of application No. 13/555,635, filed on Jul. 23, 2012, now Pat. No. 9,718,610.

(60) Provisional application No. 62/012,160, filed on Jun. 13, 2014, provisional application No. 62/014,479, filed on Jun. 19, 2014, provisional application No. 62/114,614, filed on Feb. 11, 2015.

(51) Int. Cl.
| | |
|---|---|
| *B65G 15/30* | (2006.01) |
| *B65G 65/30* | (2006.01) |
| *B65G 65/42* | (2006.01) |
| *B65G 69/18* | (2006.01) |
| *B65D 88/30* | (2006.01) |
| *B65D 90/58* | (2006.01) |
| *B65G 15/58* | (2006.01) |
| *B65G 15/42* | (2006.01) |
| *B65G 41/00* | (2006.01) |

(52) U.S. Cl.
CPC ............ *B65G 15/30* (2013.01); *B65G 15/58* (2013.01); *B65G 65/30* (2013.01); *B65G 65/42* (2013.01); *B65G 69/181* (2013.01); *B65G 69/185* (2013.01); *B65D 2581/00* (2013.01); *B65D 2585/00* (2013.01); *B65D 2588/54* (2013.01); *B65D 2590/0091* (2013.01); *B65G 15/42* (2013.01); *B65G 41/006* (2013.01); *B65G 65/425* (2013.01)

(58) Field of Classification Search
CPC ............ B65D 90/125; B65D 2588/12; B65D 2588/125; B65D 2588/54; B65D 3/20; B65G 47/16; B65G 47/18; B65G 47/19; B65G 65/34; B65G 65/42; B65G 65/425; B65G 69/181; B65G 2812/0618; B61D 45/007; B60P 7/13; B60P 1/36; B60P 1/38

See application file for complete search history.

(56) References Cited

U.S. PATENT DOCUMENTS

| | | | |
|---|---|---|---|
| 384,443 | A | 6/1888 | Hoover |
| 448,238 | A | 3/1891 | Johnson |
| 711,632 | A | 10/1902 | Johnson |
| 917,649 | A | 4/1909 | Otto |
| 1,143,641 | A | 6/1915 | McGregor |
| 1,331,883 | A | 2/1920 | Stuart |
| 1,344,768 | A | 6/1920 | Messiter |
| 1,434,488 | A | 11/1922 | Forsythe et al. |
| 1,520,560 | A | 12/1923 | Burno |
| 1,506,936 | A | 9/1924 | Lea |
| 1,526,527 | A | 2/1925 | Butler |
| 1,573,664 | A | 2/1926 | Wetherill |
| 1,807,447 | A | 5/1931 | Smith |
| 1,850,000 | A | 3/1932 | Fernand |
| 1,932,320 | A | 10/1933 | Steward |
| 1,973,312 | A | 9/1934 | Hardinge |
| 2,020,628 | A | 11/1935 | Woodruff |
| 2,233,005 | A | 2/1941 | Garlinghouse |
| 2,255,448 | A | 9/1941 | Morris |
| 2,284,853 | A * | 6/1942 | Wall .................. B60P 1/36 198/544 |
| 2,293,160 | A | 8/1942 | Miller et al. |
| 2,300,753 | A * | 11/1942 | Wagner ............... B60P 1/38 222/129 |
| 2,368,672 | A | 2/1945 | McNamara |
| 2,381,103 | A | 8/1945 | Frank |
| 2,385,245 | A | 9/1945 | Willoughby |
| 2,423,879 | A | 7/1947 | De Frees |
| 2,564,020 | A | 8/1951 | Mengel |
| 2,603,342 | A | 7/1952 | Martinson |
| 2,616,758 | A | 11/1952 | Meyers |
| 2,622,771 | A | 12/1952 | Tulou |
| 2,652,174 | A | 9/1953 | Shea et al. |
| 2,670,866 | A | 3/1954 | Glesby |
| 2,678,145 | A | 5/1954 | Ejuzwiak et al. |
| 2,693,282 | A | 11/1954 | Sensibar |
| 2,700,574 | A | 1/1955 | Tourneau |
| 2,792,262 | A | 4/1955 | Hathorn |
| 2,774,515 | A | 12/1956 | Johansson et al. |
| 2,791,973 | A | 5/1957 | Dorey |
| 2,801,125 | A | 7/1957 | Page et al. |
| 2,808,164 | A | 10/1957 | Glendinning |
| 2,812,970 | A | 11/1957 | Martinson |
| 2,837,369 | A | 6/1958 | Stopps |
| 2,865,521 | A | 12/1958 | Fisher et al. |
| 2,873,036 | A | 2/1959 | Noble |
| 2,894,666 | A | 7/1959 | Campbell, Jr. |
| 2,988,235 | A | 6/1961 | Ronyak |
| 2,994,460 | A | 8/1961 | Matthews |
| 3,041,113 | A | 6/1962 | Sackett |
| 3,049,248 | A | 8/1962 | Heltzel et al. |
| 3,064,832 | A | 11/1962 | Heltzel |
| 3,083,879 | A | 4/1963 | Coleman |
| 3,090,527 | A | 5/1963 | Rensch |
| 3,109,389 | A | 11/1963 | Karlsson |
| 3,122,258 | A | 2/1964 | Raymond |
| 3,134,606 | A | 5/1964 | Oyler |
| 3,135,432 | A | 6/1964 | McKinney |
| 3,163,127 | A | 12/1964 | Gutridge et al. |
| 3,187,684 | A | 6/1965 | Ortner |
| 3,198,494 | A | 8/1965 | Curran et al. |
| 3,199,585 | A | 8/1965 | Cronberger |
| 3,248,026 | A | 4/1966 | Kemp |
| 3,255,927 | A | 6/1966 | Ruppert et al. |
| 3,265,443 | A | 8/1966 | Simas |
| 3,270,921 | A | 9/1966 | Nadolske et al. |
| 3,281,006 | A | 10/1966 | Wei |
| 3,294,306 | A | 12/1966 | Areddy |
| 3,318,473 | A | 5/1967 | Jones et al. |
| 3,353,599 | A | 11/1967 | Swift |
| 3,354,918 | A | 11/1967 | Coleman |
| 3,378,152 | A | 4/1968 | Warner |
| 3,387,570 | A | 6/1968 | Pulcrano et al. |
| 3,396,675 | A | 8/1968 | Stevens |
| 3,397,654 | A | 8/1968 | Snyder |
| 3,406,995 | A | 10/1968 | McCarthy |
| 3,407,971 | A | 10/1968 | Oehler |
| 3,425,599 | A | 2/1969 | Sammarco et al. |
| 3,455,474 | A | 7/1969 | Truncali |
| 3,486,787 | A | 12/1969 | Campbell |
| 3,499,694 | A | 3/1970 | Coppel |
| 3,508,762 | A | 4/1970 | Pratt |
| 3,524,567 | A | 8/1970 | Coleman |
| 3,528,570 | A | 9/1970 | Pase |
| 3,561,633 | A | 2/1971 | Morrison et al. |
| 3,587,834 | A | 6/1971 | Dugge |
| 3,596,609 | A | 8/1971 | Ortner |
| 3,601,244 | A | 8/1971 | Ort et al. |
| 3,602,400 | A | 8/1971 | Cooke |
| 3,650,567 | A | 3/1972 | Danielson |
| 3,653,521 | A | 4/1972 | Bridge |
| 3,661,293 | A | 5/1972 | Gerhard et al. |
| 3,692,363 | A | 9/1972 | Tenebaum et al. |
| 3,704,797 | A | 12/1972 | Suykens |
| 3,721,199 | A | 3/1973 | Hassenauer |
| 3,729,121 | A | 4/1973 | Cannon |
| 3,734,215 | A | 5/1973 | Smith |
| 3,738,511 | A | 6/1973 | Lemon et al. |
| 3,752,511 | A | 8/1973 | Racy |
| 3,777,909 | A | 12/1973 | Rheinfrank |
| 3,785,534 | A | 1/1974 | Smith |
| 3,800,712 | A | 4/1974 | Krug, Jr. |
| 3,802,584 | A | 4/1974 | Sackett |
| 3,817,261 | A | 6/1974 | Rogge |
| 3,820,762 | A | 6/1974 | Bostrom et al. |
| 3,827,578 | A | 8/1974 | Hough |
| 3,840,141 | A | 10/1974 | Allom et al. |
| 3,854,612 | A | 12/1974 | Snape |

(56) References Cited

U.S. PATENT DOCUMENTS

| | | |
|---|---|---|
| 3,861,716 A | 1/1975 | Baxter et al. |
| 3,883,005 A | 5/1975 | Stevens |
| 3,909,223 A | 9/1975 | Schmidt |
| 3,913,933 A | 10/1975 | Visser et al. |
| 3,933,100 A | 1/1976 | Dugge |
| 3,963,149 A | 6/1976 | Fassauer |
| 3,970,123 A | 7/1976 | Poulton et al. |
| 3,986,708 A | 10/1976 | Hellzel et al. |
| 3,997,089 A | 12/1976 | Clarke et al. |
| 4,003,301 A | 1/1977 | Norton |
| 4,004,700 A | 1/1977 | Empey |
| 4,057,153 A | 11/1977 | Weaver |
| 4,058,239 A | 11/1977 | Van Mill |
| 4,063,656 A | 12/1977 | Lambert |
| 4,073,410 A | 2/1978 | Melcher |
| 4,125,195 A | 11/1978 | Sasadi |
| 4,138,163 A | 2/1979 | Calvert et al. |
| 4,178,117 A | 12/1979 | Brugler |
| 4,204,773 A | 5/1980 | Bates |
| 4,210,273 A | 7/1980 | Hegele |
| 4,210,963 A | 7/1980 | Ricciardi et al. |
| RE30,358 E | 8/1980 | Sensibar |
| 4,222,498 A | 9/1980 | Brock |
| 4,227,732 A | 10/1980 | Kish |
| 4,232,884 A | 11/1980 | DeWitt |
| 4,239,424 A | 12/1980 | Pavolka |
| 4,245,820 A | 1/1981 | Muryn |
| 4,247,228 A | 1/1981 | Gray et al. |
| 4,247,370 A | 1/1981 | Nijhawan et al. |
| 4,258,953 A | 3/1981 | Johnson |
| 4,265,266 A | 5/1981 | Kierbow et al. |
| 4,278,190 A | 7/1981 | Oory et al. |
| 4,282,988 A | 8/1981 | Hulbert, Jr. |
| 4,287,921 A | 9/1981 | Sanford |
| 4,287,997 A | 9/1981 | Rolfe et al. |
| 4,289,353 A | 9/1981 | Merritt |
| 4,299,597 A | 11/1981 | Oetiker et al. |
| 4,306,895 A | 12/1981 | Thompson et al. |
| 4,329,106 A | 5/1982 | Adler |
| 4,350,241 A | 9/1982 | Wenzel |
| 4,359,176 A | 11/1982 | Johnson |
| 4,363,396 A | 12/1982 | Wolf et al. |
| 4,395,052 A | 7/1983 | Rash |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,410,106 A | 10/1983 | Kierbow et al. |
| 4,420,285 A | 12/1983 | Loyer et al. |
| 4,427,133 A | 1/1984 | Kierbow et al. |
| 4,428,504 A | 1/1984 | Bassett et al. |
| 4,449,861 A | 5/1984 | Saito et al. |
| 4,453,645 A | 6/1984 | Usui et al. |
| 4,474,204 A | 10/1984 | West |
| 4,475,672 A | 10/1984 | Whitehead |
| 4,478,155 A | 10/1984 | Cena et al. |
| 4,483,462 A | 11/1984 | Heintz |
| 4,525,071 A | 6/1985 | Horowitz |
| 4,526,353 A | 7/1985 | Stomp |
| 4,532,098 A | 7/1985 | Campbell |
| 4,534,869 A | 8/1985 | Seibert |
| 4,552,573 A | 11/1985 | Weis |
| 4,569,394 A | 2/1986 | Sweatman et al. |
| 4,570,967 A | 2/1986 | Allnut |
| 4,571,143 A | 2/1986 | Hellerich |
| 4,608,931 A | 9/1986 | Ruhmann et al. |
| 4,619,531 A | 10/1986 | Dunstan |
| 4,624,729 A | 11/1986 | Bresciani et al. |
| 4,626,155 A | 12/1986 | Hlinsky et al. |
| 4,626,166 A | 12/1986 | Jolly |
| 4,628,825 A | 12/1986 | Taylor et al. |
| 4,639,015 A | 1/1987 | Pitts |
| 4,660,733 A | 4/1987 | Snyder et al. |
| 4,701,095 A | 10/1987 | Berryman et al. |
| 4,715,754 A | 12/1987 | Scully |
| 4,738,774 A | 4/1988 | Patrick |
| 4,741,273 A | 5/1988 | Sherwood |
| 4,801,389 A | 1/1989 | Brannon et al. |
| 4,819,830 A | 4/1989 | Schultz |
| 4,836,735 A | 6/1989 | Dennehy |
| 4,848,605 A | 7/1989 | Wise |
| 4,882,784 A | 11/1989 | Tump |
| 4,889,219 A * | 12/1989 | Key ............... B65D 88/64 |
| | | 193/25 R |
| 4,901,649 A | 2/1990 | Fehrenbach et al. |
| 4,909,378 A | 3/1990 | Webb |
| 4,909,556 A | 3/1990 | Koskinen |
| 4,917,019 A | 4/1990 | Hesch et al. |
| 4,919,583 A | 4/1990 | Speakman, Jr. |
| 4,923,358 A | 5/1990 | Van Mill |
| 4,946,068 A | 8/1990 | Erickson et al. |
| 4,947,760 A | 8/1990 | Dawson et al. |
| 4,954,975 A | 9/1990 | Kalata |
| 4,956,821 A | 9/1990 | Fenelon |
| 4,964,243 A | 10/1990 | Reiter |
| 4,975,205 A | 12/1990 | Sloan |
| 4,988,115 A | 1/1991 | Steinke |
| 4,995,522 A | 2/1991 | Barr |
| 5,004,400 A | 4/1991 | Handke |
| 5,042,538 A | 8/1991 | Wiese |
| 5,069,352 A | 12/1991 | Harbolt et al. |
| 5,080,259 A | 1/1992 | Hadley |
| 5,082,304 A | 1/1992 | Preller |
| 5,102,281 A | 4/1992 | Handke |
| 5,102,286 A | 4/1992 | Fenton |
| 5,105,858 A | 4/1992 | Levinson |
| 5,131,524 A | 7/1992 | Uehara |
| 5,190,182 A | 3/1993 | Copas et al. |
| 5,195,861 A | 3/1993 | Handke |
| 5,199,826 A | 4/1993 | Lawrence |
| 5,201,546 A | 4/1993 | Lindsay |
| 5,224,635 A | 7/1993 | Wise |
| 5,253,746 A | 10/1993 | Friesen et al. |
| 5,253,776 A | 10/1993 | Decroix et al. |
| 5,265,763 A | 11/1993 | Heinrici et al. |
| 5,286,158 A | 2/1994 | Zimmerman |
| 5,290,139 A | 3/1994 | Hedrick |
| 5,317,783 A | 6/1994 | Williamson |
| 5,320,046 A | 6/1994 | Hesch |
| 5,324,097 A | 6/1994 | DeCap |
| 5,339,996 A | 8/1994 | Dubbert |
| 5,345,982 A | 9/1994 | Nadeau et al. |
| 5,358,137 A * | 10/1994 | Shuert ............... B65D 77/0466 |
| | | 206/600 |
| 5,373,792 A | 12/1994 | Pileggi et al. |
| 5,392,946 A | 2/1995 | Holbrook et al. |
| 5,402,915 A | 4/1995 | Hogan |
| 5,413,154 A | 5/1995 | Hurst et al. |
| 5,429,259 A | 7/1995 | Robin |
| 5,441,321 A | 8/1995 | Karpisek |
| 5,445,289 A | 8/1995 | Owen |
| 5,465,829 A | 11/1995 | Kruse |
| 5,470,175 A | 11/1995 | Jensen et al. |
| 5,470,176 A | 11/1995 | Corcoran et al. |
| 5,493,852 A | 2/1996 | Stewart |
| 5,507,514 A | 4/1996 | Jacques |
| 5,538,286 A | 7/1996 | Hoff |
| 5,549,278 A | 8/1996 | Sidler |
| 5,564,599 A | 10/1996 | Barber et al. |
| 5,570,743 A | 11/1996 | Padgett et al. |
| 5,590,976 A | 1/1997 | Kilheffer et al. |
| 5,601,181 A | 2/1997 | Lindhorst |
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |
| 5,687,881 A | 11/1997 | Rouse et al. |
| 5,690,466 A | 11/1997 | Gaddis et al. |
| 5,697,535 A | 12/1997 | Coleman |
| 5,706,614 A | 1/1998 | Wiley et al. |
| 5,718,555 A | 2/1998 | Swalheim |

(56) References Cited

U.S. PATENT DOCUMENTS

| | | | |
|---|---|---|---|
| 5,722,552 A | 3/1998 | Olson | |
| 5,722,688 A | 3/1998 | Garcia | |
| 5,746,258 A | 5/1998 | Huck | |
| 5,761,854 A | 6/1998 | Johnson et al. | |
| 5,762,222 A | 6/1998 | Liu | |
| 5,772,390 A | 6/1998 | Walker | |
| 5,782,524 A | 7/1998 | Heider et al. | |
| 5,785,421 A * | 7/1998 | Milek | B28C 7/0486 366/16 |
| 5,803,296 A | 9/1998 | Olson | |
| 5,806,863 A | 9/1998 | Heger et al. | |
| 5,836,480 A | 11/1998 | Epp et al. | |
| 5,845,799 A | 12/1998 | Deaton | |
| 5,876,172 A | 3/1999 | Di Rosa | |
| 5,906,471 A | 5/1999 | Schwoerer | |
| 5,911,337 A | 6/1999 | Bedeker | |
| 5,924,829 A | 7/1999 | Hastings | |
| 5,927,558 A | 7/1999 | Bruce | |
| 5,960,974 A | 10/1999 | Kee | |
| 5,971,219 A | 10/1999 | Karpisek | |
| 5,993,202 A | 11/1999 | Yamazaki et al. | |
| 5,997,099 A | 12/1999 | Collins | |
| 6,002,063 A | 12/1999 | Bilak et al. | |
| 6,006,918 A | 12/1999 | Hart | |
| 6,069,118 A | 5/2000 | Hinkel et al. | |
| 6,077,068 A | 6/2000 | Okumura | |
| 6,092,974 A * | 7/2000 | Roth | A01C 7/208 414/523 |
| 6,109,486 A | 8/2000 | Lee | |
| 6,120,233 A | 9/2000 | Adam | |
| D431,358 S | 10/2000 | Willemsen | |
| 6,155,175 A | 12/2000 | Rude et al. | |
| 6,186,654 B1 | 2/2001 | Gunteret et al. | |
| 6,190,107 B1 | 2/2001 | Lanigan et al. | |
| 6,192,985 B1 | 2/2001 | Hinkel et al. | |
| 6,196,590 B1 | 3/2001 | Kim | |
| 6,205,938 B1 | 3/2001 | Foley et al. | |
| 6,210,088 B1 | 4/2001 | Crosby | |
| 6,247,594 B1 | 6/2001 | Garton | |
| 6,263,803 B1 | 7/2001 | Dohr et al. | |
| 6,269,849 B1 | 8/2001 | Fields | |
| 6,273,154 B1 | 8/2001 | Laug | |
| 6,283,212 B1 | 9/2001 | Hinkel et al. | |
| 6,286,986 B2 | 9/2001 | Grimland | |
| 6,296,109 B1 | 10/2001 | Nohl | |
| 6,306,800 B1 | 10/2001 | Samuel et al. | |
| 6,328,156 B1 | 12/2001 | Otsman | |
| 6,328,183 B1 | 12/2001 | Coleman | |
| 6,364,584 B1 | 4/2002 | Taylor | |
| 6,374,915 B1 | 4/2002 | Andrews | |
| 6,382,446 B1 | 5/2002 | Hinkle et al. | |
| 6,390,742 B1 | 5/2002 | Breeden | |
| 6,401,983 B1 | 6/2002 | McDonald et al. | |
| 6,412,422 B2 | 7/2002 | Dohr et al. | |
| 6,415,909 B1 | 7/2002 | Mitchell et al. | |
| 6,416,271 B1 | 7/2002 | Pigott et al. | |
| 6,425,725 B1 | 7/2002 | Ehlers | |
| 6,450,522 B1 | 9/2002 | Yamada et al. | |
| 6,457,291 B2 | 10/2002 | Wick | |
| 6,498,976 B1 | 12/2002 | Ehlbeck et al. | |
| 6,505,760 B1 | 1/2003 | Werner | |
| 6,508,387 B1 | 1/2003 | Simon et al. | |
| 6,508,615 B2 | 1/2003 | Taylor | |
| 6,523,482 B2 | 2/2003 | Wingate | |
| 6,537,002 B2 | 3/2003 | Gloystein | |
| 6,557,896 B1 | 5/2003 | Stobart | |
| 6,575,614 B2 | 6/2003 | Tosco et al. | |
| 6,660,693 B2 | 12/2003 | Miller et al. | |
| 6,663,373 B2 | 12/2003 | Yoshida | |
| 6,666,573 B2 | 12/2003 | Grassi | |
| 6,675,066 B2 | 1/2004 | Moshgbar | |
| 6,675,073 B2 | 1/2004 | Kieman et al. | |
| 6,705,449 B2 | 3/2004 | Wagstaffe | |
| 6,720,290 B2 | 4/2004 | England et al. | |
| 6,772,912 B1 | 8/2004 | Schall et al. | |
| 6,774,318 B2 | 8/2004 | Beal et al. | |
| 6,776,235 B1 | 8/2004 | England | |
| 6,783,032 B2 | 8/2004 | Fons | |
| 6,811,048 B2 | 11/2004 | Lau | |
| 6,828,280 B2 | 12/2004 | England et al. | |
| 6,835,041 B1 | 12/2004 | Albert | |
| 6,882,960 B2 | 4/2005 | Miller | |
| 6,902,061 B1 | 6/2005 | Elstone | |
| 6,915,854 B2 | 7/2005 | England et al. | |
| 6,953,119 B1 | 10/2005 | Wening | |
| 6,955,127 B2 | 10/2005 | Taylor | |
| 6,964,551 B1 | 11/2005 | Friesen | |
| 6,968,946 B2 | 11/2005 | Shuert | |
| 6,974,021 B1 | 12/2005 | Boevers | |
| 7,008,163 B2 | 3/2006 | Russell | |
| 7,051,661 B2 | 5/2006 | Herzog et al. | |
| 7,084,095 B2 | 8/2006 | Lee et al. | |
| 7,104,425 B2 | 9/2006 | Le Roy | |
| 7,140,516 B2 | 11/2006 | Bothor | |
| 7,146,914 B2 | 12/2006 | Morton et al. | |
| 7,201,290 B2 | 4/2007 | Mehus et al. | |
| 7,214,028 B2 | 5/2007 | Boasso | |
| 7,240,681 B2 | 7/2007 | Saik | |
| 7,252,309 B2 | 8/2007 | Eng Soon et al. | |
| 7,284,579 B2 | 10/2007 | Elgan et al. | |
| 7,284,670 B2 | 10/2007 | Schmid | |
| 7,316,333 B2 | 1/2008 | Wegner | |
| 7,367,271 B2 | 5/2008 | Early | |
| 7,377,219 B2 | 5/2008 | Brandt | |
| 7,410,623 B2 | 8/2008 | Mehus et al. | |
| 7,475,796 B2 | 1/2009 | Garton | |
| 7,500,817 B2 | 3/2009 | Furrer et al. | |
| 7,513,280 B2 | 4/2009 | Brashears et al. | |
| 7,591,386 B2 | 9/2009 | Hooper | |
| 7,640,075 B2 | 12/2009 | Wietgrefe | |
| 7,695,538 B2 | 4/2010 | Cheng | |
| 7,753,637 B2 | 7/2010 | Benedict et al. | |
| 7,798,558 B2 | 9/2010 | Messier | |
| 7,802,958 B2 | 9/2010 | Garcia et al. | |
| 7,803,321 B2 | 9/2010 | Lark et al. | |
| 7,837,427 B2 | 11/2010 | Beckel | |
| 7,841,394 B2 | 11/2010 | McNeel et al. | |
| 7,845,516 B2 | 12/2010 | Pessin et al. | |
| 7,858,888 B2 | 12/2010 | Lucas et al. | |
| 7,867,613 B2 | 1/2011 | Smith | |
| 7,891,304 B2 | 2/2011 | Herzog et al. | |
| 7,891,523 B2 | 2/2011 | Mehus et al. | |
| 7,896,198 B2 | 3/2011 | Mehus et al. | |
| 7,921,783 B2 | 4/2011 | Forbes et al. | |
| 7,967,161 B2 | 6/2011 | Townsend | |
| 7,980,803 B2 | 7/2011 | Brandstätter et al. | |
| 7,997,213 B1 | 8/2011 | Gauthier et al. | |
| 7,997,623 B2 | 8/2011 | Williams | |
| 8,083,083 B1 | 12/2011 | Mohns | |
| 8,201,520 B2 | 6/2012 | Meritt | |
| 8,313,278 B2 | 11/2012 | Simmons et al. | |
| 8,366,349 B2 | 2/2013 | Beachner | |
| 8,375,690 B2 | 2/2013 | LaFargue et al. | |
| 8,379,927 B2 | 2/2013 | Taylor | |
| 8,387,824 B2 | 3/2013 | Wietgrefe | |
| 8,393,502 B2 | 3/2013 | Renyer et al. | |
| 8,424,666 B2 | 4/2013 | Berning et al. | |
| D688,351 S | 8/2013 | Oren | |
| 8,505,780 B2 | 8/2013 | Oren | |
| 8,544,419 B1 | 10/2013 | Spalding et al. | |
| 8,545,148 B2 * | 10/2013 | Wanek-Pusset | B65D 90/20 410/68 |
| 8,562,022 B2 | 10/2013 | Nadeau et al. | |
| 8,573,387 B2 | 11/2013 | Trimble | |
| 8,573,917 B2 * | 11/2013 | Renyer | A01C 15/003 414/523 |
| 8,585,341 B1 | 11/2013 | Oren | |
| D694,670 S | 12/2013 | Oren | |
| 8,616,370 B2 | 12/2013 | Allegretti | |
| 8,622,251 B2 | 1/2014 | Oren | |
| 8,636,832 B2 | 1/2014 | Stutzman et al. | |
| 8,646,641 B2 * | 2/2014 | Moir | B65D 88/128 206/386 |
| 8,662,525 B1 | 3/2014 | Dierks et al. | |

(56) References Cited

U.S. PATENT DOCUMENTS

| | | |
|---|---|---|
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,881,749 B1 | 11/2014 | Smith |
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| D740,556 S | 10/2015 | Huber |
| 9,162,261 B1 | 10/2015 | Smith |
| 9,267,266 B2 | 2/2016 | Cutler et al. |
| 9,296,572 B2 | 3/2016 | Houghton et al. |
| 9,309,064 B2 | 4/2016 | Sheesley |
| 9,410,414 B2 | 8/2016 | Tudor |
| D780,883 S | 3/2017 | Schaffner et al. |
| D783,771 S | 4/2017 | Stegemoeller et al. |
| D783,772 S | 4/2017 | Stegemoeller, III et al. |
| 2001/0022308 A1 | 9/2001 | Epp et al. |
| 2001/0045338 A1 | 11/2001 | Ransil et al. |
| 2002/0134550 A1 | 9/2002 | Leeson et al. |
| 2002/0139643 A1* | 10/2002 | Peltier .................. B65G 15/08 198/821 |
| 2003/0006248 A1 | 1/2003 | Gill et al. |
| 2003/0111470 A1 | 6/2003 | Fouillet et al. |
| 2003/0145418 A1 | 8/2003 | Ikeda et al. |
| 2003/0156929 A1 | 8/2003 | Russell |
| 2004/0065699 A1* | 4/2004 | Schoer ................. A01C 15/003 222/608 |
| 2004/0074922 A1* | 4/2004 | Bothor ................. B65B 69/0083 222/105 |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1* | 2/2006 | Beach ................. B65D 77/0466 220/495.05 |
| 2006/0053582 A1 | 3/2006 | Engel et al. |
| 2006/0091072 A1 | 5/2006 | Schmid et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2007/0194564 A1 | 8/2007 | Garceau et al. |
| 2008/0008562 A1 | 1/2008 | Beckel et al. |
| 2008/0029546 A1 | 2/2008 | Shuld |
| 2008/0029553 A1 | 2/2008 | Culleton |
| 2008/0058228 A1 | 3/2008 | Wilson |
| 2008/0017905 A1 | 7/2008 | McGough et al. |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2008/0315558 A1 | 12/2008 | Cesterino |
| 2009/0038242 A1 | 2/2009 | Cope |
| 2009/0078410 A1 | 3/2009 | Krenek et al. |
| 2009/0278326 A1 | 11/2009 | Rowland et al. |
| 2010/0021258 A1 | 1/2010 | Kim |
| 2010/0037572 A1 | 2/2010 | Cheng |
| 2010/0038143 A1 | 2/2010 | Burnett et al. |
| 2010/0040446 A1 | 2/2010 | Renyer |
| 2010/0065466 A1 | 3/2010 | Perkins |
| 2010/0080681 A1 | 4/2010 | Bain |
| 2010/0108711 A1 | 5/2010 | Wietgrefe |
| 2010/0129193 A1 | 5/2010 | Sherrer |
| 2010/0199668 A1 | 8/2010 | Coustou et al. |
| 2010/0207371 A1 | 8/2010 | Van Houdt et al. |
| 2010/0278621 A1 | 11/2010 | Redekop |
| 2010/0288603 A1 | 11/2010 | Schafer |
| 2010/0320727 A1 | 12/2010 | Haut et al. |
| 2011/0011893 A1 | 1/2011 | Cerny |
| 2011/0017693 A1 | 1/2011 | Thomas |
| 2011/0101040 A1 | 5/2011 | Weissbrod |
| 2011/0109703 A1 | 5/2011 | Williams |
| 2011/0127178 A1* | 6/2011 | Claussen ................ B65D 88/26 206/216 |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0090956 A1 | 4/2012 | Brobst |
| 2012/0103848 A1 | 5/2012 | Allegretti et al. |
| 2012/0219391 A1 | 8/2012 | Teichrob et al. |
| 2012/0255539 A1 | 10/2012 | Kolecki |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0034662 A1 | 2/2014 | Chalmers et al. |
| 2014/0044507 A1 | 2/2014 | Naizer et al. |
| 2014/0077484 A1 | 3/2014 | Harrell |
| 2014/0083554 A1 | 3/2014 | Harris |
| 2014/0093319 A1 | 4/2014 | Harris et al. |
| 2014/0097182 A1 | 4/2014 | Sheesley |
| 2014/0166647 A1 | 6/2014 | Sheesley |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1 | 10/2014 | Krenek et al. |
| 2014/0377042 A1 | 12/2014 | McMahon |
| 2015/0004895 A1 | 1/2015 | Hammers et al. |
| 2015/0069052 A1 | 3/2015 | Allegretti et al. |
| 2015/0086307 A1 | 3/2015 | Stefan |
| 2015/0107822 A1 | 4/2015 | Tudor |
| 2015/0110565 A1 | 4/2015 | Harris |
| 2015/0115589 A1 | 4/2015 | Thiessen |
| 2015/0159232 A1 | 6/2015 | Zucchi et al. |
| 2015/0209829 A1 | 7/2015 | De Siqueira et al. |
| 2015/0284183 A1 | 10/2015 | Houghton et al. |
| 2016/0148813 A1 | 5/2016 | Rogers et al. |
| 2016/0177678 A1 | 6/2016 | Morris et al. |
| 2016/0185522 A1 | 6/2016 | Herman et al. |
| 2016/0273355 A1 | 9/2016 | Gosney et al. |
| 2016/0280480 A1 | 9/2016 | Smith et al. |
| 2017/0129721 A1 | 5/2017 | Harris et al. |

FOREIGN PATENT DOCUMENTS

| | | |
|---|---|---|
| CN | 201390486 | 1/2010 |
| CN | 201881469 | 6/2011 |
| CN | 103350017 | 10/2013 |
| DE | 3108121 | 9/1982 |
| DE | 3342281 | 6/1985 |
| DE | 4217329 | 5/1993 |
| EP | 0019967 | 12/1980 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |
| EP | 1775190 | 4/2007 |
| EP | 2062832 | 5/2009 |
| EP | 2311757 | 4/2011 |
| FR | 2173445 | 10/1973 |
| FR | 2640598 | 6/1990 |
| GB | 1296736 | 11/1972 |

(56) References Cited

FOREIGN PATENT DOCUMENTS

| | | |
|---|---|---|
| GB | 2374864 | 10/2002 |
| JP | S4871029 | 9/1973 |
| JP | S4876041 | 9/1973 |
| JP | S58161888 | 10/1983 |
| JP | 10087046 | 4/1998 |
| JP | 10264882 | 10/1998 |
| MX | 2012011046 | 5/2013 |
| WO | 1990008082 | 7/1990 |
| WO | 1992002437 | 2/1992 |
| WO | 1993001997 | 2/1993 |
| WO | 1993006031 | 4/1993 |
| WO | 1996025302 | 8/1996 |
| WO | 2006039757 | 4/2006 |
| WO | 2007005054 | 1/2007 |
| WO | 2007061310 | 5/2007 |
| WO | 2010026235 | 3/2010 |
| WO | 2012021447 | 2/2012 |
| WO | 2012058059 | 5/2012 |
| WO | 2011099358 | 6/2013 |

OTHER PUBLICATIONS

International Search Report for related International Application No. PCT/US2012/066639, dated Feb. 25, 2013.
International Search Report for related International Application No. PCT/US2013/035442, dated Jun. 23, 2013.
International Search Report for related International Application No. PCT/US2013/032819, dated May 23, 2013.
International Search Report for related International Application No. PCT/US2013/049028, dated Mar. 4, 2014.
International Preliminary Report on Patentability for PCT/US2012/066639, dated Feb. 26, 2013.
International Preliminary Report on Patentability for PCT/US2013/032819, dated Sep. 23, 2014.
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, Sep. 23, 2011. (21 pages).
International Search Report for PCT/US2015/024810, dated Jul. 8, 2015. (13 pages).
European Search Report for Application No. 15167039.5, dated Sep. 8, 2015. (7 pages).
SandBox Logistics, "Mine to Wellhead Logistics," Houston, TX, May 2013.
SandBox Logistics, screenshots from video made in Apr. 2013 and publicly shown in May 2013, Arnegard, North Dakota.
PCT International Search Report for PCT/US15/57601, dated May 6, 2016. (11 pages).
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Arrows Up, Inc., Jumbo BTS—Bulk Transport System, Aug. 1, 2014.
Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action dated Sep. 27, 2016 for co-pending U.S. Appl. No. 13/555,635.
Non-Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.

(56) References Cited

OTHER PUBLICATIONS

Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
PCT International Search Report for PCT/US15/49074, dated Dec. 17, 2015. (11 pages).
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
International Search Report for PCT Application No. PCT/US2016/050859 dated Dec. 9, 2016.
Non-Final Office Action dated Apr. 3, 2017 for co-pending U.S. Appl. No. 13/555,635.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Feb. 24, 2017 for co-pending U.S. Appl. No. 14/943,182.
Non-Final Office Action dated Jul. 26, 2017 for co-pending U.S. Appl. No. 15/463,201.
Final Office Action dated Jul. 27, 2017 for co-pending U.S. Appl. No. 14/738,485.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 9, 2010 (53 pages).
WW Trailers Inc., Model GN2040EZ datasheet, Portland, OR, Jan. 2007 (4pages).
WW Trailers Inc., Model GN204S9A datasheet, Portland, OR, Jan. 2007 (4pages).
Yergin, Daniel, The Quest: Energy, Security, and the Remaking of the Modern World, 2011.
Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Watford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.
Eagle Ford Shale Task Force Report, Railroad Commission of Texas, Convened and Chaired by David Porter, Mar. 2013.
*Sandbox Logistics LLC et al v. Grit Energy Solutions LLC*, 3:16-cv-00012, 73.Parties' P.R. 4-3 Joint Claim Construction and Prehearing Statement by Oren Technologies LLC, SandBox Enterprises LLC, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.
Kelsey, Timothy W. et al., Economic Impacts of Marcellus Shale in Pennsylvania: Employment and Income in 2009, The Marcellus Shale Education & Training Center, Aug. 2011.

(56) References Cited

OTHER PUBLICATIONS

2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
VIN Requirements, 49 C.F.R. § 565, Oct. 1, 2011.
Benson, Mary Ellen et al., Frac Sand in the United States—A Geological and Industry Overview, U.S. Department of the Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 effective Sep. 1, 2005 and Section 621.403 effective Sep. 1, 1995).
Garner, Dwight, Visions of an Age When Oil Isn't King, New York Times, Sep. 20, 2011.
Non-Final Office Action dated Sep. 8, 2017 for co-pending U.S. Appl. No. 15/475,354.
Non-Final Office Action dated Sep. 8, 2017 for co-pending U.S. Appl. No. 15/143,942.
International Search Report and Written Opinion for PCT/US17/34603 dated Aug. 22, 2017.
Non-Final Office Action dated Aug. 30, 2017 for co-pending U.S. Appl. No. 14/943,182.
Non-Final Office Action dated Aug. 4, 2017 for co-pending U.S. Appl. No. 13/625,675.
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.
Final Office Action dated Jun. 1, 2017 for co-pending U.S. Appl. No. 13/628,702.
Final Office Action dated Jul. 3, 2017 for co-pending U.S. Appl. No. 14/923,920.
Non-Final Office Action dated Jun. 28, 2017 for co-pending U.S. Appl. No. 15/589,185.
Final Office Action dated Jun. 7, 2017 for co-pending U.S. Appl. No. 14/848,447.
Final Office Action dated Jun. 28, 2017 for co-pending U.S. Appl. No. 14/485,687.
Final Office Action dated Jun. 21, 2017 for co-pending U.S. Appl. No. 14/943,182.
Randy Lafollette, Key Considerations for Hydraulic Fracturing of Gas Shales, May 12, 2010.
Case No. 4:17-cv-00589, Plaintiffs' P.R. 3-1 and 3-2 Infringement Contentions and Disclosures, Jun. 8, 2017.

* cited by examiner

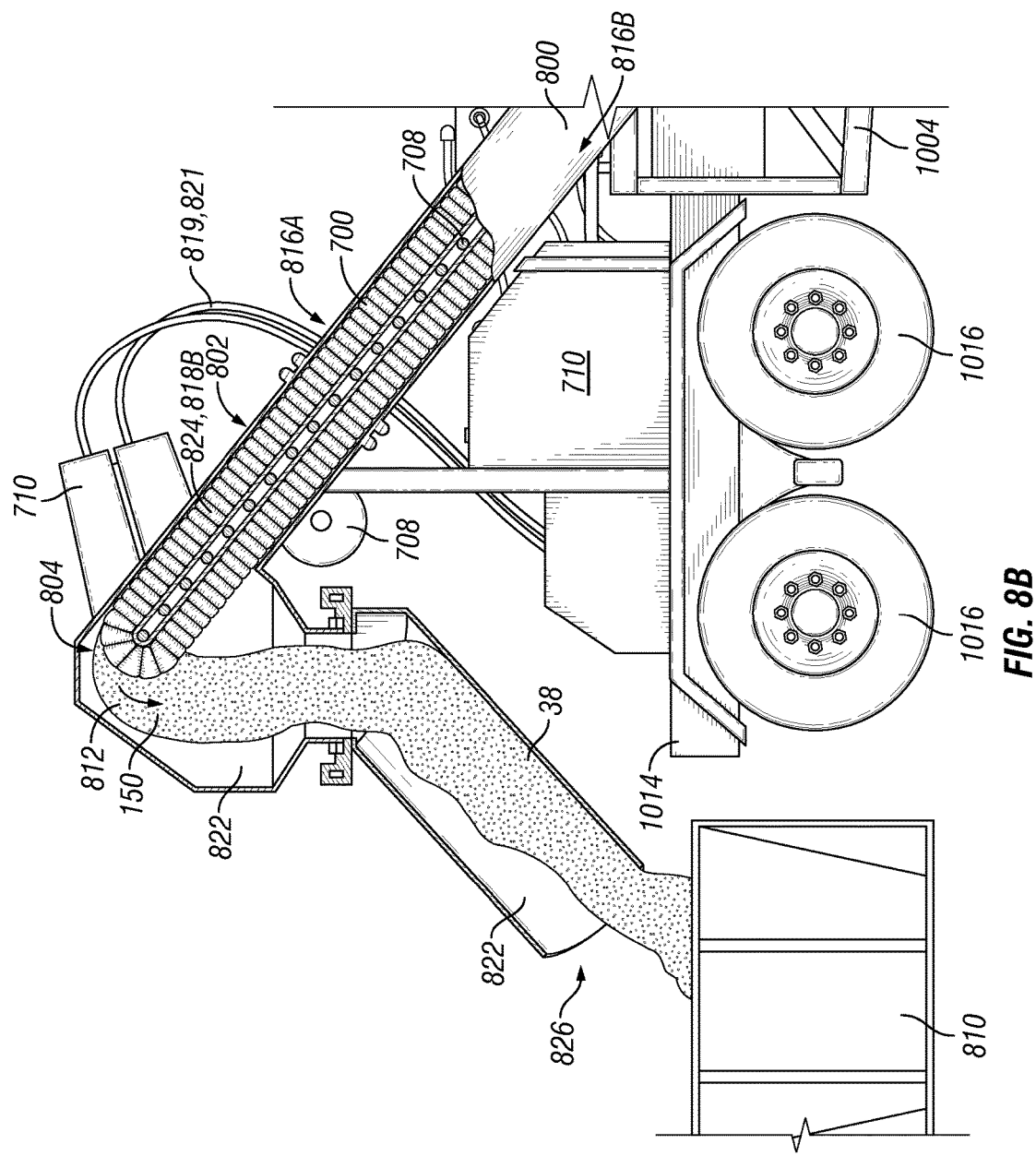

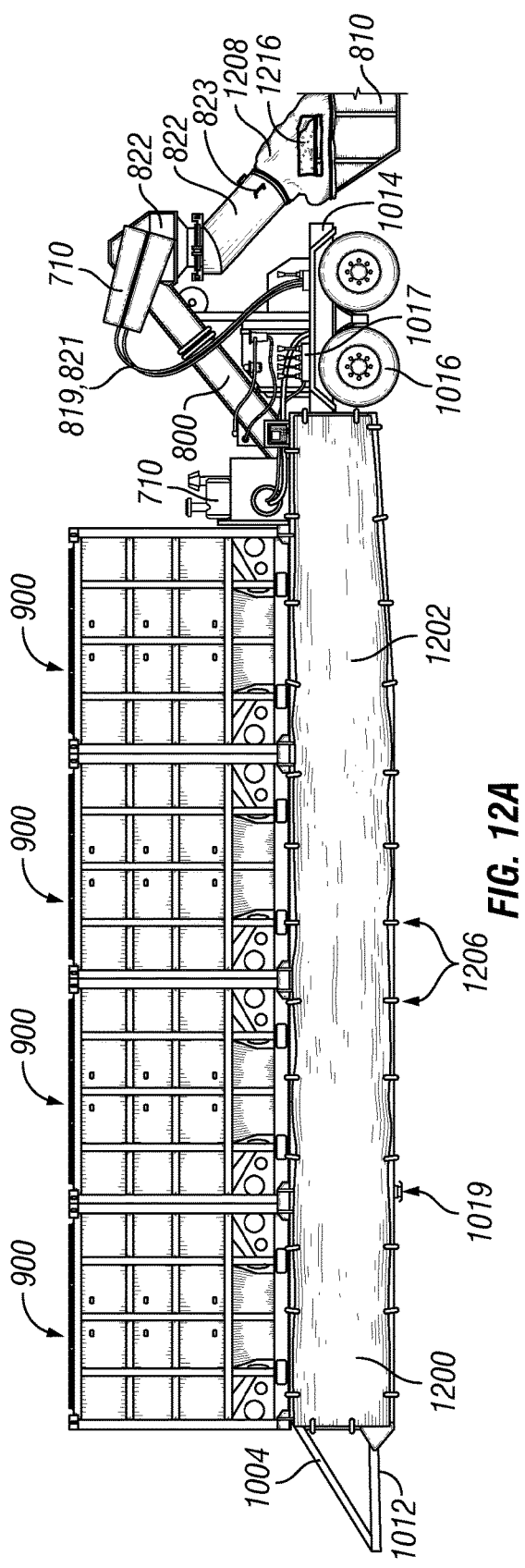
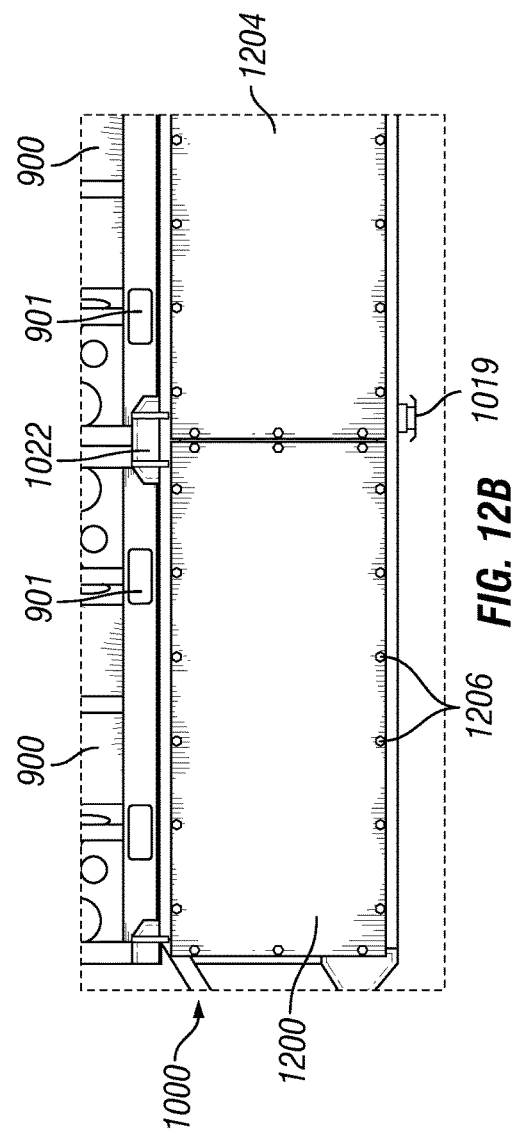
FIG. 12A
FIG. 12B

METHODS AND SYSTEMS TO TRANSFER PROPPANT FOR FRACKING WITH REDUCED RISK OF PRODUCTION AND RELEASE OF SILICA DUST AT A WELL SITE

RELATED APPLICATIONS

This application is a continuation and claims priority to, and the benefit of, U.S. patent application Ser. No. 14/676,039, filed Apr. 1, 2015, titled "Methods and Systems to Transfer Proppant for Fracking with Reduced Risk of Production and Release of Silica Dust at a Well Site," which claims priority to, and the benefit of, U.S. Provisional Application No. 62/012,160, filed Jun. 13, 2014, titled "Process and Apparatus for Reducing Silica Exposure During the Delivery of Proppants to a Mine," U.S. Provisional Application No. 62/014,479, filed on Jun. 19, 2014, titled "System and Methods for Reducing Silica Exposure at a Well Site," and U.S. Provisional Application No. 62/114,614, filed Feb. 1, 2015, titled "Methods and Systems to Transfer Proppant for Fracking with Reduced Risk of Production and Release of Silica Dust at a Well Site." The present application still further is a continuation in part of U.S. application Ser. No. 13/555,635, filed on Jul. 23, 2012, and titled "Proppant Discharge System Having a Container and the Process for Providing Proppant to a Well Site," all of which are incorporated herein by reference in their entireties.

BACKGROUND

1. Field of the Invention

The present invention relates to reducing the risk of production and release of silica dust at a well site during fracking operation. More particularly, the invention relates to methods and systems to enhance transfer of proppant for hydraulic fracking operations from a container while reducing the risk of production and release of silica dust at a well site.

2. Description of Related Art

Hydraulic fracturing or "fracking" has been used for decades to stimulate production from conventional oil and gas wells. In recent years, the use of fracking has increased due to the development of new drilling technology such as horizontal drilling and multi-stage fracking. Such techniques reach previously-unavailable deposits of natural gas and oil. Fracking generally includes pumping fluid into a wellbore at high pressure. Inside the wellbore, the fluid is forced into the formation being produced. When the fluid enters the formation, it fractures, or creates fissures, in the formation. Water, as well as other fluids, and some solid proppants, are then pumped into the fissures to stimulate the release of oil and gas from the formation.

By far the dominant proppant is silica sand, made up of ancient weathered quartz, the most common mineral in the Earth's continental crust. Unlike common sand, which often feels gritty when rubbed between your fingers, sand used as a proppant tends to roll to the touch as a result of its round, spherical shape and tightly-graded particle distribution. Sand quality is a function of both deposit and processing. Grain size is critical, as any given proppant should reliably fall within certain mesh ranges, subject to downhole conditions and completion design. Generally, coarser proppant allows a higher capacity due to the larger pore spaces between grains. This type of proppant, however, may break down or crush more readily under stress due to the relatively fewer grain-to-grain contact points to bear the stress often incurred in deep oil- and gas-bearing formations.

Along with increased access to fossil fuels comes new and added challenges for the industry. Exposure to airborne silica has been identified by studies as a health hazard to workers conducting some fracking operations. These studies show that workers may be exposed to dust with high levels of respirable crystalline silica ("silica dust") during fracking operations. See Eric J. Esswein, Michael Breitenstein, John Snawder, Max Kiefer & W. Karl Sieber (2013): Occupational Exposures to Respirable Crystalline Silica During Hydraulic Fracturing, Journal of Occupational and Environmental Hygiene, 10:7, 347-356. The National Institute for Occupational Safety ("NIOSH") published a hazard alert along with OSHA relating to the health hazards particular to the fracking industry. The hazard alert explains that "[t]ransporting, moving, and refilling silica sand into and through sand movers, along transfer belts, and into blender hoppers can release dust containing silica into the air."

Workers use many tons of proppant at a well site for fracking. These workers risk being exposed to silica dust, which, risks eventually leading to a disease called silicosis, or "Potter's Rot." Silicosis is a form of occupational lung disease caused by inhalation of crystalline silica dust, and is marked by inflammation and scarring in the form of nodular lesions in the upper lobes of the lungs. It is a type of pneumoconiosis, or lung disease caused by the inhalation of dust, usually from working in a mining operation. This dust has other effects, such as contaminating the atmospheric air, creating a nuisance to adjacent landowners, and damaging equipment on the well site. Bloggers and environmental groups have taken a stand against hydraulic fracturing, in part, because of the silica dust created at the well site.

Throughout the process of delivering, blending, and mixing proppant at a well site, there is substantial production and release of silica dust. A large amount of proppant is delivered by pneumatic tankers. It is then blown into proppant storage containers. These storage devices can be pre-filled with proppant, either by dumping proppant into storage devices, or pneumatically conducting proppant to the storage devices, and then delivered to a well site for fracking. Once on the well site, various storage containers have openings in the top which allow air flow to the atmosphere. The flow of air creates a large dust cloud formed of silica dust, which blows out of access doors. This especially risks being a problem for workers who are looking into the interior of a storage container to monitor the appropriate fill level. As proppant is dispensed from the storage device, additional silica dust is produced and released. As the proppant is dumped into a blender, further silica dust is produced and released. As a result, dust often is produced and released at many different stages of the process at a well site.

During this process, if workers are at the well site, they also often stand near or directly in the path of a cloud of airborne silica dust. If workers inhale these small particles of silica dust, the each worker risks particles being embedded deeply into the tiny alveolar sacs and ducts in the worker's lungs, where oxygen and carbon dioxide gases are exchanged. The lungs may not be able to clear out the embedded dust by mucus or coughing. Substantial and concentrated exposure to silica dust therefore risks leading to silicosis.

SUMMARY

Applicants recognized the problems noted above herein and conceived and developed embodiments of systems and methods, according to the present invention, to reduce risk of production and release of silica dust at a well site. Embodiments of the present invention generally address problems associated with risk of inhalation of silica dust at a well site of a fracking operation. More particularly, embodiments of the present invention include methods and systems to transfer proppant from a closed container to a chute for delivery to a blender or other location at a well site while reducing the risk of production and release of silica dust. By uniquely designing, developing, interfacing, and positioning equipment into a system for transferring proppant, applicants have reduced the production and release of silica dust at a well site of a fracking operation.

In an embodiment, for example, a method includes positioning a plurality of sealed containers containing proppant for fracking such as by use of forklifts or other heavy machinery onto a conveyor with compartments adapted to receive the containers and which overlies one or more conveyor belts. A plurality of hoppers, e.g., one positioned to underlie each container when positioned on the compartment of the conveyor, overlays one or more conveyor belts. Once the sealed containers are positioned on the compartments of the conveyor, the proppant can be hydraulically or electrically released from the containers and be downwardly discharged from each respective container until each respective container is substantially emptied of proppant. After release, in this embodiment, for example, proppant is funneled from the one or more outlets of each of the plurality of containers to and through the plurality of hoppers positioned to reduce the risk of production and release of silica dust. Proppant, in turn, guidingly is received onto the one or more conveyor belts by a plurality of partitions associated with the one or more conveyor belts, e.g., the partitions can extend upwardly in a space-apart relation from the top surface of the one or more conveyor belts, such that the plurality of partitions is positioned to reduce production and release of silica dust into the air as proppant is positioned between the plurality of partitions and contacts the one or more conveyor belts. The one or more conveyor belts then convey the proppant to and through a shrouded portion of the conveyor, positioned to reduce the risk of release of silica dust, and toward a chute position along an end portion of the conveyor, for example. An embodiment of a chute, for example, can be rotatably-positioned to direct the proppant into a blender hopper for use in a fracking operation, but the chute also can deposit the proppant anywhere on the well site. Once the respective containers are substantially emptied of proppant, forklifts or other machinery can remove the empty containers for replacement with containers again being filled with and having proppant for fracking at the well site so that proppant continuously is supplied for and flows towards the chute for deposit into a blender hopper or other location when in operation.

In another embodiment, for example, a method can include positioning a plurality of sealed containers containing proppant for fracking using forklifts or other heavy machinery onto a conveyor having compartments adapted to receive the containers. The conveyor, in an embodiment, also can have a plurality of hoppers that overlays one or more conveyor belts. Once the sealed containers are positioned on the conveyor, proppant can be downwardly discharged from each respective container until each respective container is substantially emptied of proppant. Proppant, in this process, can be funneled from the one or more outlets of each of the plurality of containers to and through the plurality of hoppers so as to reduce the risk of production and release of silica dust. Proppant guidingly can be received onto the one or more conveyor belts by a plurality of partitions associated therewith, such that the plurality of partitions is positioned to reduce production and release of silica dust into the air as proppant is positioned on and contacts the conveyor belt. The one or more conveyor belts then convey the proppant to a blender hopper. Once the respective containers are substantially emptied of proppant, forklifts or other machinery remove the empty containers for replacement with containers having proppant for fracking at the well site so that proppant continuously is supplied and flows to the blender hopper during and for fracturing operations.

Embodiments of a system, for example, can include a conveyor positioned at a well site and having compartments adapted to receive each respective container of the plurality of containers. The conveyor also has one or more conveyor hoppers that align closely with each respective outlet of the plurality of containers to assist in funneling and metering the proppant flowing from the containers. One or more conveyor belts are positioned to underlie the one or more conveyor hoppers to receive proppant as the proppant passes to and through the opening of each of the one or more respective conveyor hoppers. The one or more conveyor belts, for example, can each have a first end, a second end, and a plurality of partitions associated therewith. An embodiment of a system also can include a shroud positioned to overlie a portion of the second end of the one or more conveyor belts thereby to define a shrouded portion of the one or more conveyor belts. The shroud, according to an embodiment thereof, for example, substantially encloses the shrouded portion as the one or more conveyor belts convey proppant. The system further can include a chute having an inlet positioned to receive the second end of the conveyor belt conveying proppant and one or more outlets positioned such that proppant is deposited into the chute by gravity feed, and proppant, in turn, flows out of the one or more outlets of the chute to a blender hopper or other location at the well site.

An embodiment of a system of the invention, for example, can have a conveyor positioned at a well site with compartments adapted to receive each respective container of the plurality of containers. The conveyor also can have one or more conveyor hoppers that align closely with each respective outlet of the plurality of containers when positioned on the conveyor and one or more conveyor belts positioned to underlie the one or more conveyor hoppers to receive proppant as the proppant passes to and through the opening of each of the one or more respective conveyor hoppers. The one or more conveyor belts, for example, each can have a first end, a second end, and a plurality of partitions associated therewith. The system further can include a blender hopper having an inlet positioned to receive the second end of the one or more conveyor belts thereby to convey proppant by gravity feed.

Embodiments of the system further can include a blender hopper cover positioned to reduce risk of production and release of silica dust as proppant flows between the one or more outlets of the chute and the one or more blender hoppers of the one or more blenders at a well site and a forklift positioned at a well site to load and unload each respective container onto and off of the conveyor by one or more slots. Each of the plurality of containers has one or more slots, for example, positioned adjacent a bottom portion of the respective container to enhance lifting and positioning of each container such as when being lifted by a forklift. The conveyor further can include one or more curtains positioned on or adjacent to the one or more sides of the conveyor to reduce risk of production and release of silica dust as proppant flows from the plurality of conveyor hoppers to the one or more conveyor belts.

Embodiments of a system, for example, are adapted and positioned to reduce the risk of production and release of silica dust at a well site by reducing the fall height for proppant as it flows between one structure and another, for example, and substantially enclosing either the entire system or portions of the entire system to reduce the risk of the escape of silica dust as the system operates. In addition to the potential health benefits for workers at a well site, and the potential environmental benefits for the areas around a well site, by reducing the risk of production and release of silica dust, embodiments of the system described herein have a host of other benefits directly to the fracking industry itself. Well sites frequently are set up on an open plain without much protection from the natural elements, and embodiments of the system, for example, also are adapted to prevent the wetting of proppant from rain or other precipitation, or the blowing of proppant by the wind from the one or more conveyor belts, for example, as proppant moves through the system. Other aspects of the embodiments of the system include, for example, the portability and stackability of the respective containers having proppant contained therein at a well site, which decreases the footprint of the proppant needed at the well site. The embodiments of the system, for example, also decrease transportation costs with the ability to transport those containers to a well site by ordinary trucks or railcars. Additionally, because the proppant is containerized, trucks or rails need not wait to be unloaded at the well site. As such, embodiments of the system of the present invention virtually eliminate the demurrage of trucks or rails at a well site that increased costs and time to provide sufficient proppant to enable the well site to continuously conduct fracking operations.

In an embodiment, a method of transferring proppant for fracking at a well site includes positioning a plurality of containers each having proppant for fracking contained therein onto a container cradle at a well site, each of the plurality of containers overlaying a conveyor belt. The method also includes downwardly discharging proppant from each respective container of the plurality of containers, each respective container further having inclined lower inner portions and one or more outlets positioned at a bottom of each respective container, such that as proppant flows by gravity feed along the inclined lower inner portions to and through the one or more outlets, risk of production and release of silica dust into the air is thereby reduced, and the respective container is substantially emptied of proppant. The method further includes funneling proppant from the one or more outlets of each of the plurality of containers, such that as proppant flows by gravity feed to the conveyor belt, risk of production and release of silica dust into the air is thereby reduced. The method also includes receiving proppant onto the conveyor belt, the conveyor belt arranged to reduce the risk of production and release of silica dust into the air as the proppant contacts and is carried by the conveyor belt. The method includes conveying proppant on the conveyor belt to a chute, the conveyor belt having a first end portion and a second end portion. The method also includes depositing the proppant from the second end portion of the conveyor into the chute.

In an embodiment, a method for reducing risk of production and release of silica dust at a well site during the transport of proppant for fracking includes utilizing a plurality of containers having proppant for fracking contained therein, each respective container having an outlet and a top, the top positioned to reduce risk of release of silica dust associated with proppant from the top of each respective container. The method also includes positioning each respective container on a conveyor at the well site, the conveyor having a plurality of hoppers and each of the plurality of hoppers having a controllable opening that is in fluid communication with a conveyor belt that underlies the conveyor to reduce risk of production and release of silica dust associated with proppant as the proppant flows from each respective container. The method further includes downwardly discharging the proppant from each respective container through each respective opening of each respective hopper onto the conveyor belt, the conveyor belt having a first end portion and a second end portion. The method includes conveying the proppant to a blender hopper. The method also includes depositing the proppant into the blender hopper by gravity feed.

In an embodiment, a system to convey proppant for fracking from a plurality of containers to a chute thereby to reduce risk of production and release of silica dust at a well site includes the plurality of containers each formed to contain proppant for fracking when positioned therein, each respective container having a top to reduce risk of release of silica dust associated with proppant into the air when positioned therein. Moreover, each respective container further includes interior portions inclined toward an outlet at a bottom of each respective container to reduce risk of production and release of silica dust associated with proppant as the proppant flows from each respective container until each respective container is substantially empty. The system also includes a conveyor positioned at the well site and to receive each respective container of the plurality of containers, the conveyor having one or more conveyor hoppers that align closely with each respective outlet of the plurality of containers to reduce risk of production and release of silica dust into the air. Each of the one or more respective conveyor hoppers includes a lower portion including an opening, such that when proppant downwardly flows through each respective outlet of each respective container of the plurality of containers when positioned therein, the proppant passes to and through the opening of each of the one or more respective conveyor hoppers. Also, the system includes a conveyor belt positioned to underlie the one or more conveyor hoppers to receive proppant as the proppant passes to and through the opening of each of the one or more respective conveyor hoppers, the conveyor belt having a first end and a second end. The system also includes a shroud positioned to overlie a portion of the second end of the conveyor belt thereby to define a shrouded portion of the conveyor belt, the shroud substantially enclosing the shrouded portion as the conveyor belt conveys proppant when positioned thereon from the plurality of containers to reduce risk of release of silica dust associated with proppant into the air from the portion. Furthermore, the system includes the chute having an inlet positioned to receive the second end of the conveyor belt conveying proppant and one or more outlets positioned such that as proppant is deposited into the chute by gravity feed, proppant flows out of the one or more outlets to one or more blenders or other location at the well site.

In an embodiment, a system to convey proppant for fracking from a plurality of containers to one or more blender hoppers thereby to reduce risk of production and release of silica dust at a well site includes the plurality of containers each formed to contain proppant for fracking when positioned therein. Each respective container includes a top to reduce risk of release of silica dust associated with proppant into the air when positioned therein. Each respective container further includes interior portions inclined toward an outlet at a bottom of each respective container to reduce risk of production and release of silica dust associated with proppant as the proppant flows from each respective container until each respective container is substantially empty. The system also includes a container cradle positioned at the well site and to receive each respective container of the plurality of containers, such that proppant downwardly flows through each respective outlet of each respective container of the plurality of containers when positioned therein. Also, the system includes a conveyor belt positioned to underlie the plurality of containers to receive proppant as the proppant passes to and through the outlet of each of the containers of the plurality of containers, the conveyor belt having a first end and a second end such that proppant contacts and is carried by the conveyor belt toward the second end. Furthermore, the system includes one or more blender hoppers having an inlet positioned to receive the second end of the conveyor belt conveying proppant such that proppant is deposited into the one or more blender hoppers by gravity feed.

BRIEF DESCRIPTION OF DRAWINGS

The foregoing aspects, features, and advantages of the present invention will be further appreciated when considered with reference to the following description of embodiments and accompanying drawings. In describing the embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

FIG. 8B is a fragmented perspective view of a second end of the conveyor according to an embodiment of a system and method of the present invention with a partial break-away view of a chute for clarity further to show the second end of the conveyor belt depositing proppant into the chute by gravity feed.

FIG. 12A is a side elevation view of a conveyor having a curtain and a blender hopper cover further to reduce the production and release of silica dust at a well site according to an embodiment of a system and method of the present invention.

FIG. 12B is a perspective view of a curtain attached to the conveyor according to an embodiment of a system and method of the present invention.

DETAILED DESCRIPTION

The foregoing aspects, features, and advantages of the present invention will be further appreciated when considered with reference to the following description of embodiments and accompanying drawings. In describing the embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

Figure 1:
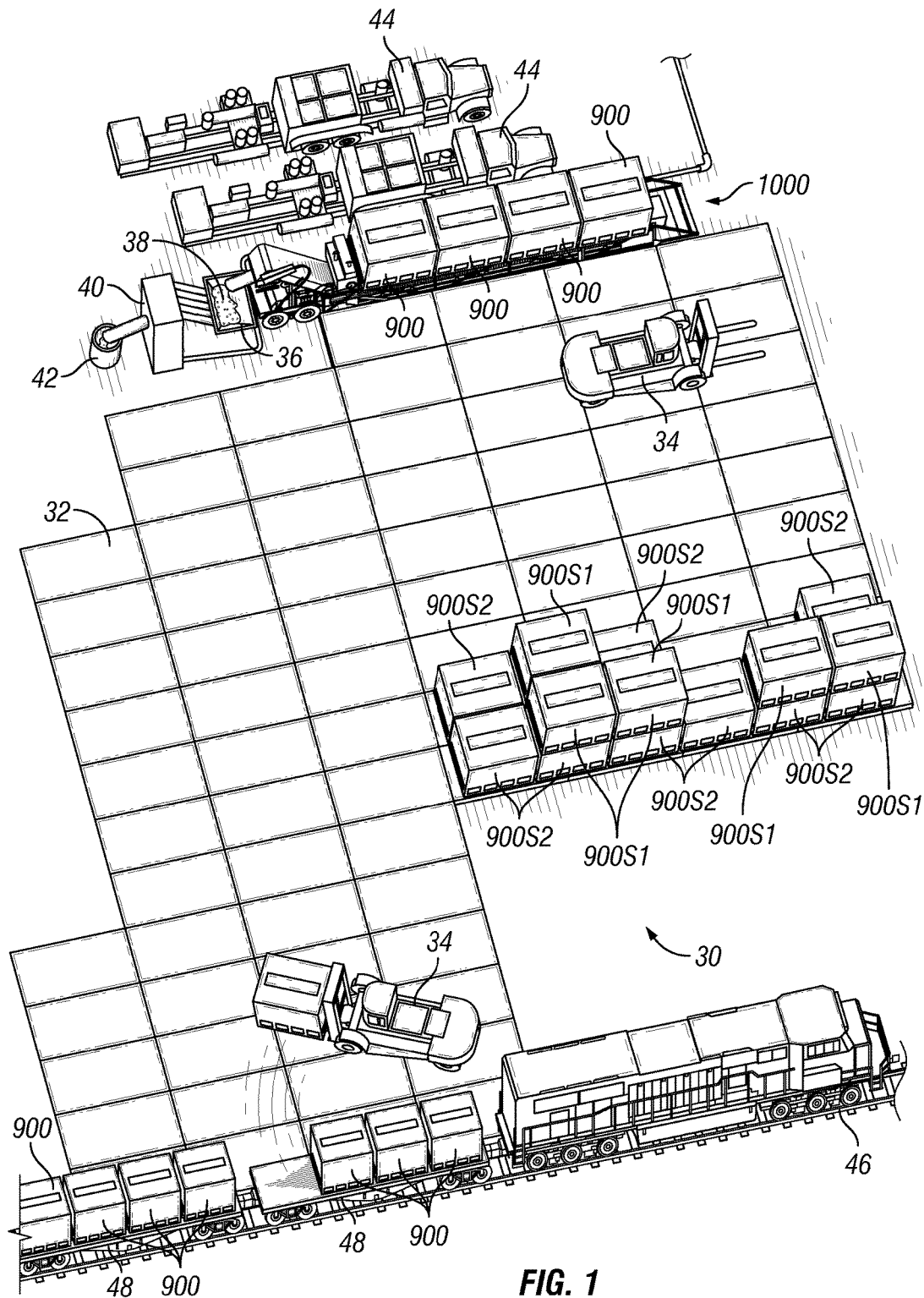
FIG. 1 is an environmental perspective view of a well site for fracking using an embodiment of the system and method according to the present invention.

Embodiments of methods and systems are useful at a well site 30 of a hydraulic fracturing operation. These well sites 30, as shown in FIG. 1, for example, includes a removable floor 32 made of wooden pallets to facilitate the use of heavy machinery, including one or more forklifts 34, cranes 35, or other hydraulic movers, for loading and unloading containers 900 off of the railroad 46 or eighteen-wheeler trucks 44. The railcars 48 are specially designed to accommodate four containers 900 in a side-by-side arrangement, for example, and containing proppant. The containers 900 are stackable; at the well site 30, containers 900S 1 can be stacked on top of other containers 900S2 so as to reduce the footprint of containers 900 at the well site 30 to thereby maximize the space available. Containers 900 can be stacked up to three-high, for example, at the well site 30. Because all the proppant 38 is containerized, the logistics problems of the prior art where trucks and trains would demurrage and to unload proppant 38 at the well site 30 is eliminated. The well sites 30 also can include blenders 36 for combining proppant 38, which is most ordinarily consisting of mined silica sand, but potentially comprising coated or treated sand, ceramic, or bauxite, with fracking fluids generally of a proprietary blend. The well site also can include fracking machinery 40 to pump the proppant 38 and other fracking fluids into the wellbore 42 at high pressure. Embodiments of systems, for example, can result in the transfer of fracking sand for depositing into a blender 36 or other desired location at the well site 30 with a reduced risk of the production and release of silica dust 50 into the air.

Figure 2:
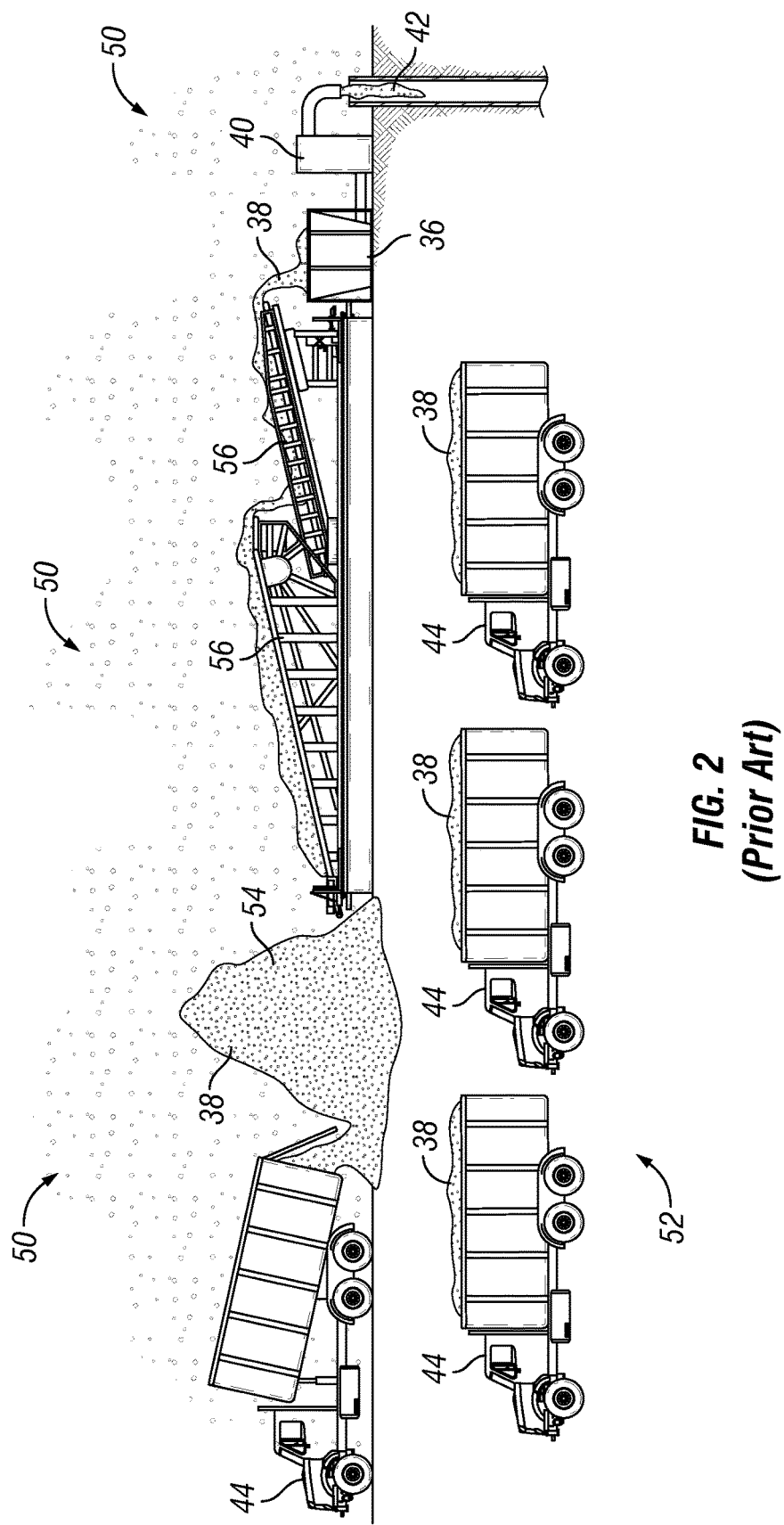
FIG. 2 is a perspective view of a well site for fracking using a prior art system and method.

As described in detail in the background section, prior art methods of transferring fracking sand or proppant 38 resulted in the production and release of harmful silica dust 50 at the well site. As shown in FIG. 2, for example, at a well site of the prior art 52, operators or machines carry out prior art methods for transferring fracking sand or proppant from a huge pile of sand 54 on open conveyors 56 into a blender 36 so it can be useful for the fracking operation. The prior art methods of transferring proppant 38 at a well site 52 frequently involved a plurality of trucks 44 delivering proppant 38 to a well site 52. These trucks 44, however, often had to wait, or demurrage, for long periods of time to deliver the load of sand 54 at the well site 32. As can be seen in FIG. 2, the methods used in the prior art result in the significant production and release of silica dust 50, which is known to pose significant health risk to well site workers and have a potentially negative effect on the environment.

Figure 3:
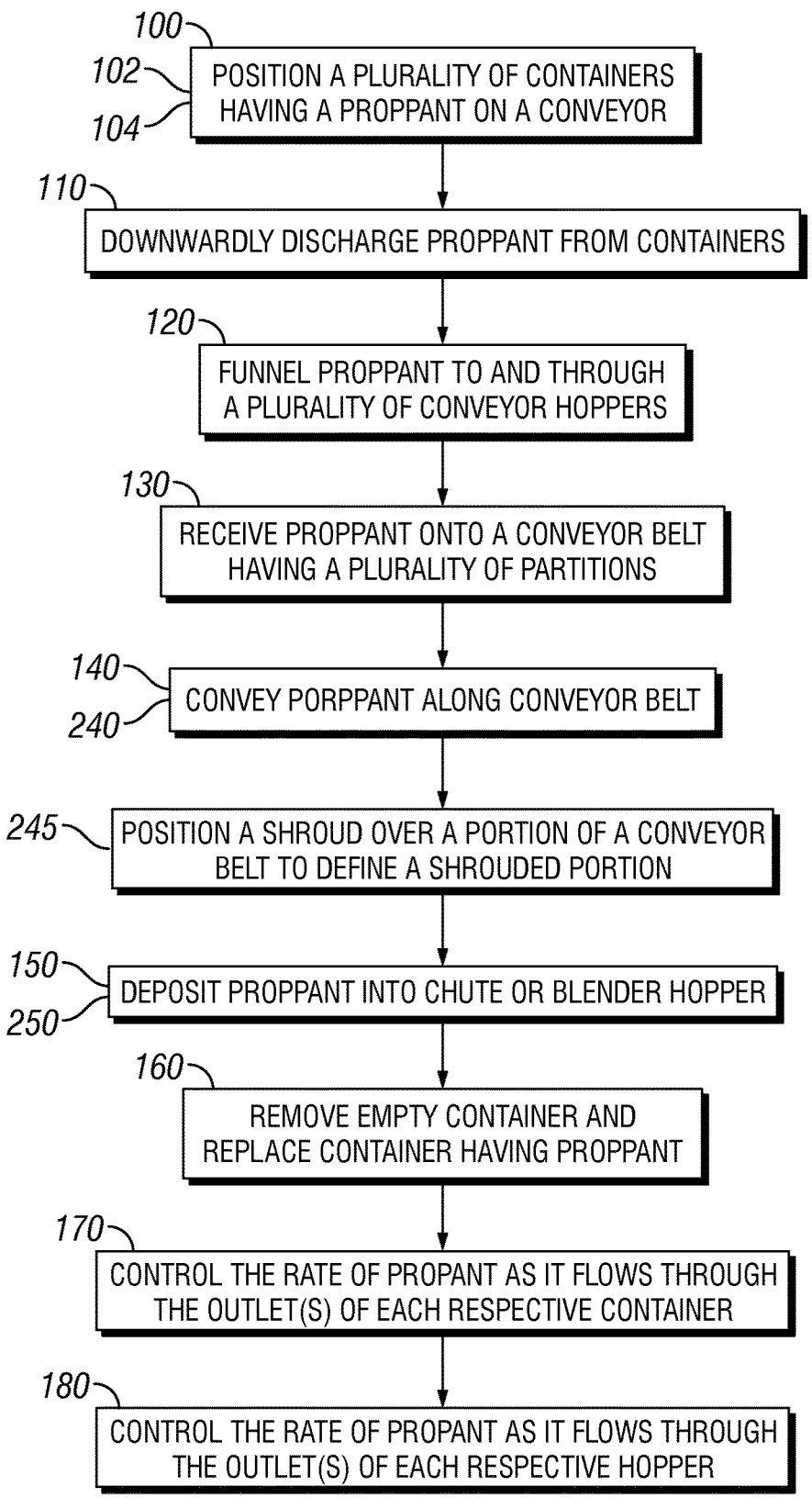
FIG. 3 is a flow chart demonstrating steps of a method according to embodiments of the present invention.

The flow chart depicted in FIG. 3, and as shown in FIGS. 4, 5C, 6A-6C, 7A, and 8A-8C, demonstrates embodiments of a method for transferring proppant 38 for fracking while reducing the risk of production and release of silica dust 50 into the air at a well site 30. Using forklifts 34, cranes 35, or other heavy machinery, operators or machines position 100 a plurality of sealed containers 900, each having proppant 38 for fracking contained therein, onto a conveyor 1000 adapted to receive the containers 900 and having a plurality of conveyor hoppers 600 that overlay one or more conveyor belts 700. These containers 900 can be positioned 102 in a side-by-side arrangement, or positioned 104 adjacent each other on the conveyor 1000. This positioning can, for example, maximize the amount of proppant 38 that can be transported to the wellbore 42 in the shortest amount of time possible for efficiency, while still reducing the risk of production and release of silica dust 50.

Operators or machines utilize hydraulics or electronics to selectively open a series of gates, for example, a flow gate 932 at the bottom 906 of each respective container 900, and a conveyor hopper gate 612 at the bottom 608 of each respective conveyor hopper 600, that control a series of openings, for example, one or more outlets 924 of a container 900 and one or more controllable openings 610 of a conveyor hopper 600, through which the proppant 38 is funneled. The close positioning and design of the containers 900 and conveyor 1000, for example, minimize the risk of production and release of silica dust 50 as the proppant 38 is funneled to the conveyor belt 700. For example, once the sealed containers 900 are positioned on the conveyor 1000, operators or machines downwardly discharge 110 the proppant 38 from each respective container 900 until each respective container 900 is substantially emptied of proppant 38. Proppant 38 then is funneled 120 from the one or more openings 924 of each of the plurality of containers 900 to and through the plurality of conveyor hoppers 600 that are adapted and positioned to reduce the risk of production and release of silica dust 50.

Proppant 38 is received 130 onto the conveyor belt 700 by a plurality of partitions 712 associated therewith, such that the plurality of partitions 712 is positioned to reduce production and release of silica dust 50 into the air as proppant 38 contacts and is carried by the conveyor belt 700. These plurality of partitions 712, for example, include a plurality of fingers 714 spaced-apart from each other on the top surface 702 of the conveyor belt 700. The plurality of partitions 712 further can include outside walls 716 of the conveyor belt. The plurality of partitions 712, therefore, can guidingly accept proppant onto the conveyor belt 700 while, for example, breaking up any clumps of proppant 38, if any, that may pass through each respective conveyor hopper 600, and further reduce any production and release of silica dust 50 as the proppant 38 contacts the conveyor belt 700. The conveyor belt 700 is also closely positioned beneath or adjacent the bottom portion 608 of each conveyor hopper 600 to further reduce the fall-height for the proppant 38 to a matter of inches, for example, as it contacts and is transported by the conveyor belt 700.

The one or more conveyor belts 700 then conveys 140 the proppant 38 to and through a shrouded portion 802 adapted and positioned to reduce the risk of release of silica dust 50 to a chute 822. This shrouded portion 802 can be optionally omitted if the conveyor 1000 is designed to directly deposit proppant 38 from the conveyor belt 700 into a blender hopper 810, for example, as shown in embodiments described herein, including FIG. 8D, for example. The conveyor belt 700 travels in a continuous loop around a designated path controlled by rollers 708 and powered by one or more diesel or electric engines 710. According to an embodiment, the conveyor belt 700 can be nearly enclosed or fully enclosed as it conveys the proppant 38 to the chute 822. In an embodiment, for example, proppant 38 can be protected from the natural elements of rain and wind, for example, to avoid deteriorating the condition of the proppant 38 and to further minimize the production and release of silica dust 50 onto the well site 30. Proppant 38 can be deposited 150 into the chute 822 by gravity feed 812 as the conveyor belt 700 turns about the rollers 708 of the conveyor 1000. This chute 822 can be designed and rotatably-positioned to direct the proppant 38 into a blender hopper 810 for use in the fracking operation, but the chute 822 could deposit the proppant 38 anywhere on the well site 38. The chute 822 can have handles 823 for an operator 806 at a well site 30 to direct proppant 38 from one or more outlets 826 of the chute 822 via gravity feed 812 into one or more blender hoppers 810, for example.

Once the respective containers 900 are substantially emptied of proppant 38, forklifts 34, cranes 35, or other machinery can remove 160 the empty containers 900 for replacement with containers 900 having proppant 38 for fracking at the well site 30 so that proppant 38 is continuously flowing toward the blender hopper 810 or other location at the well site 30 while in operation. Containers can be stacked 900S1, 900S1 at the well site 30, for example, up to three-high to be refilled with proppant or transported off the well site 30 to be refilled with proppant 38. The containerized aspects of the embodiments of the invention allow for the continuous flow of proppant 38 to the wellbore 42 at a well site 30 while the conveyor 1000 is in operation.

Embodiments of containers 900, for example, can be adapted for and positioned to reduce the risk of production and release of silica dust 50 at a well site 30. As depicted in FIGS. 9A-9E, each respective container 900 is in the nature of a box with an exterior frame 902 having two sets of parallel sides 901A1, 901A2, 90181, 90182 that are each perpendicular to a top 904 and a bottom 906. The container 900 can be a ten-foot ISO container. The container can have a ladder 903 for an operator to climb to the top 904 of the container 900 and inspect the contents within the container 900, for example. This means that the container 900 can have a length of ten feet, a width of eight feet, and a height of eight-and-a-half feet, for example. The height can also be nine-and-a-half feet. This embodiment, for example, can hold approximately twenty-three tons of proppant 38 (approximately 43,000-48,000 lbs.), in each such container 900. The containers 900 are designed to drain the proppant 38 contained therein in under two minutes, or at a rate of 25,000 pounds per minute. Because of the weight and magnitude of the proppant 38, the container 900 is made of steel or other similar material and the exterior frame 902 is cage-like or lattice-like and useful for the structural support and positioning of each container 900 onto the compartments 1002 of the conveyor 1000 that are adapted to receive each respective container 900. The frame 902 also includes a plurality of slots 901, including, for example, two slots 901, by which a forklift 34 can lift and position the plurality of containers 900 on the conveyor 1000.

The top 904 of each container 900 has an inlet 905 that may be opened and closed by a door 914, hatch, gate, or other closing mechanism. This door 914 can provide a seal, or an air-tight and water-tight connection, to the container 900, as it is preferable for the proppant 38 to remain substantially dry. Although proppant 38 can flow through embodiments of the system with some degree of moisture content, it is preferable to prevent the clumping of proppant 38 caused by moisture. The door 914 is also important to prevent the escape of silica dust 50 from the proppant 38 contained therein before and during the transfer of proppant 38 from the containers 900 through an embodiment of a system. A person having skill in the art can grasp the available options to design, affix, or attach a door 914 to accomplish this sealing function.

Figure 9A:
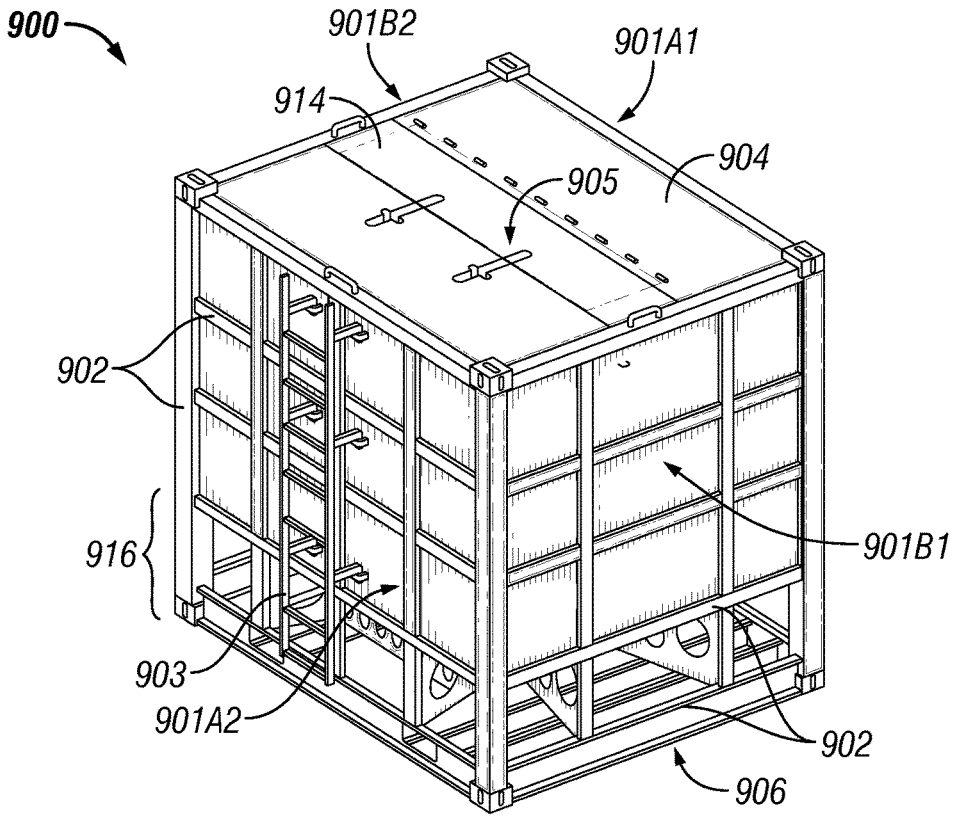
FIG. 9A is a perspective view of a container according to an embodiment of a system and method of the present invention.
Figure 9B:
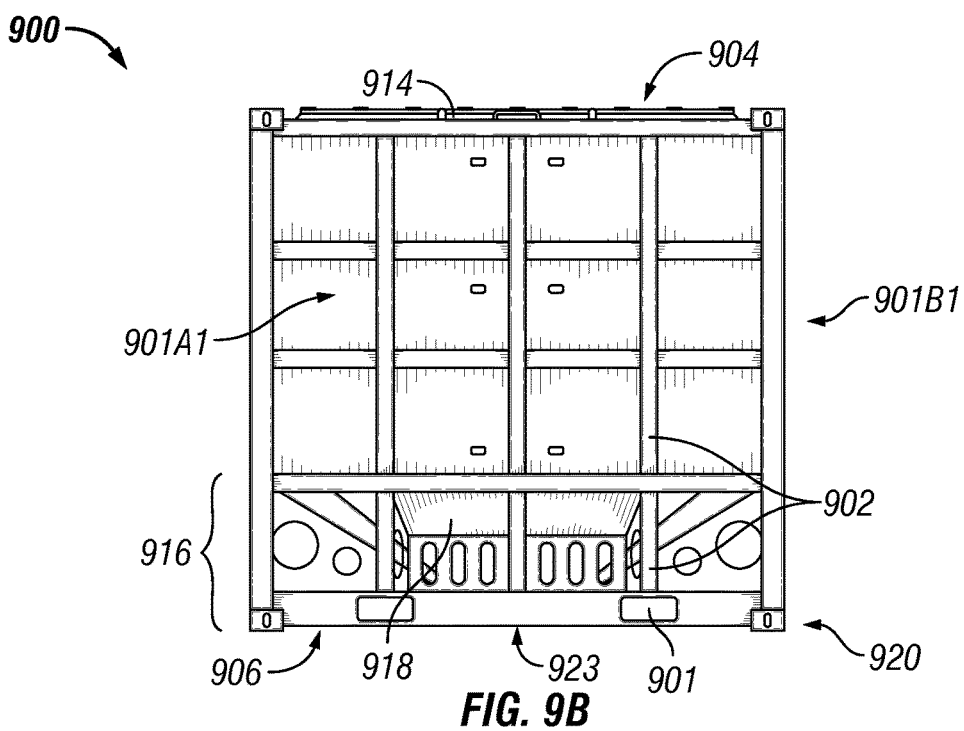
FIG. 9B is a front elevation view of a container according to an embodiment of a system and method of the present invention.

The container 900 is made of steel or other similar material. As viewed from the outside of the container 900, and as shown in FIGS. 9A-9E, the bottom portion 916 of the container 900 is open and looks like a funnel structure 918 enclosed within an open external frame 902. Referring to FIG. 9D, the external frame 902 forms a bottom 906 that comprises a planar surface 920 perpendicular to the two pairs of parallel sides 901A1, 901A2, 901B1, 901B2. Referring to FIG. 9B, The bottom portion 916 is open to allow the cylindrical or angular funnel structure 918 to dispense the proppant 38 in the container 900 according to embodiments of methods and systems. Embodiments having the bottom portion feature 916 can be useful in international shipping. During the course of international shipping, for example, it is important to avoid closed spaces within such a container 900. The exposure of the funnel shape 918 in the bottom portion 916 of the container 900 will allow inspectors to have visual access to the area adjacent the funnel shape 918.

Figure 5A:
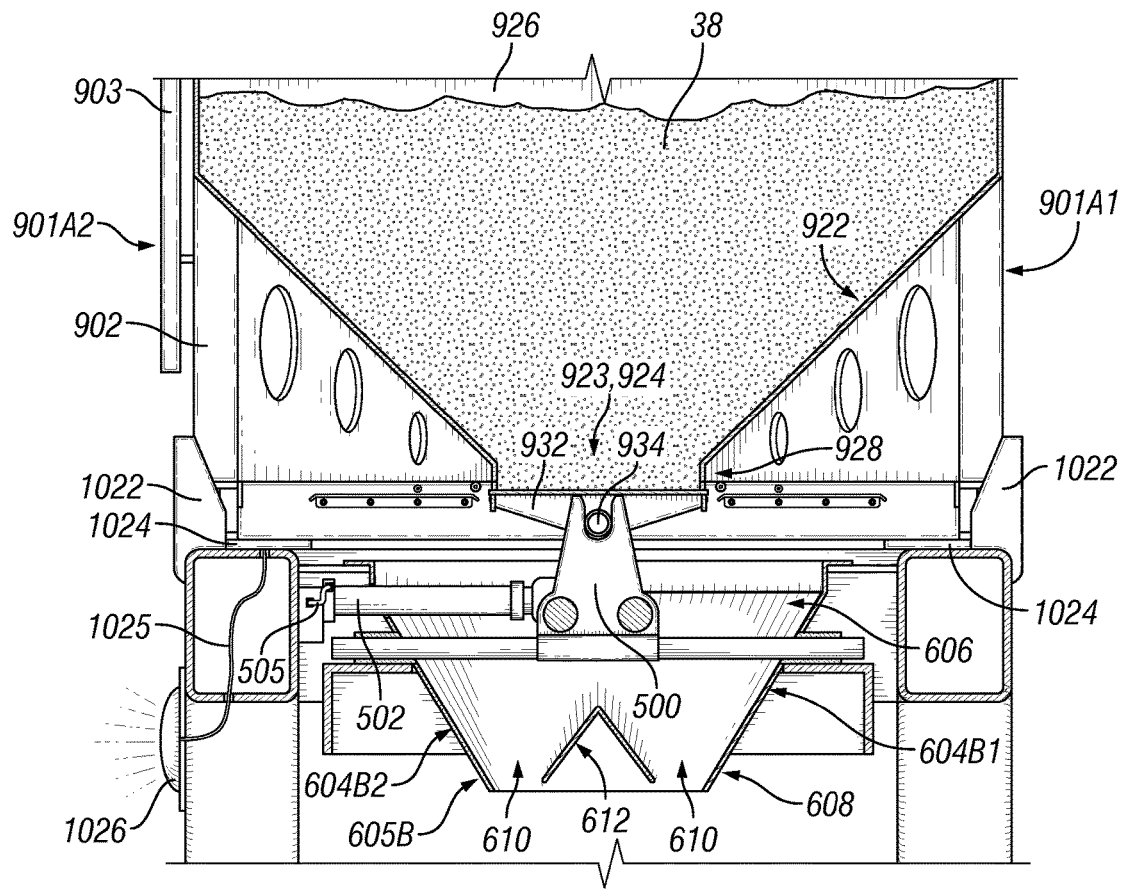
FIG. 5A is a fragmented perspective view of a container having proppant for fracking positioned on a conveyor according to an embodiment of a system and method of the present invention.
Figure 5B:
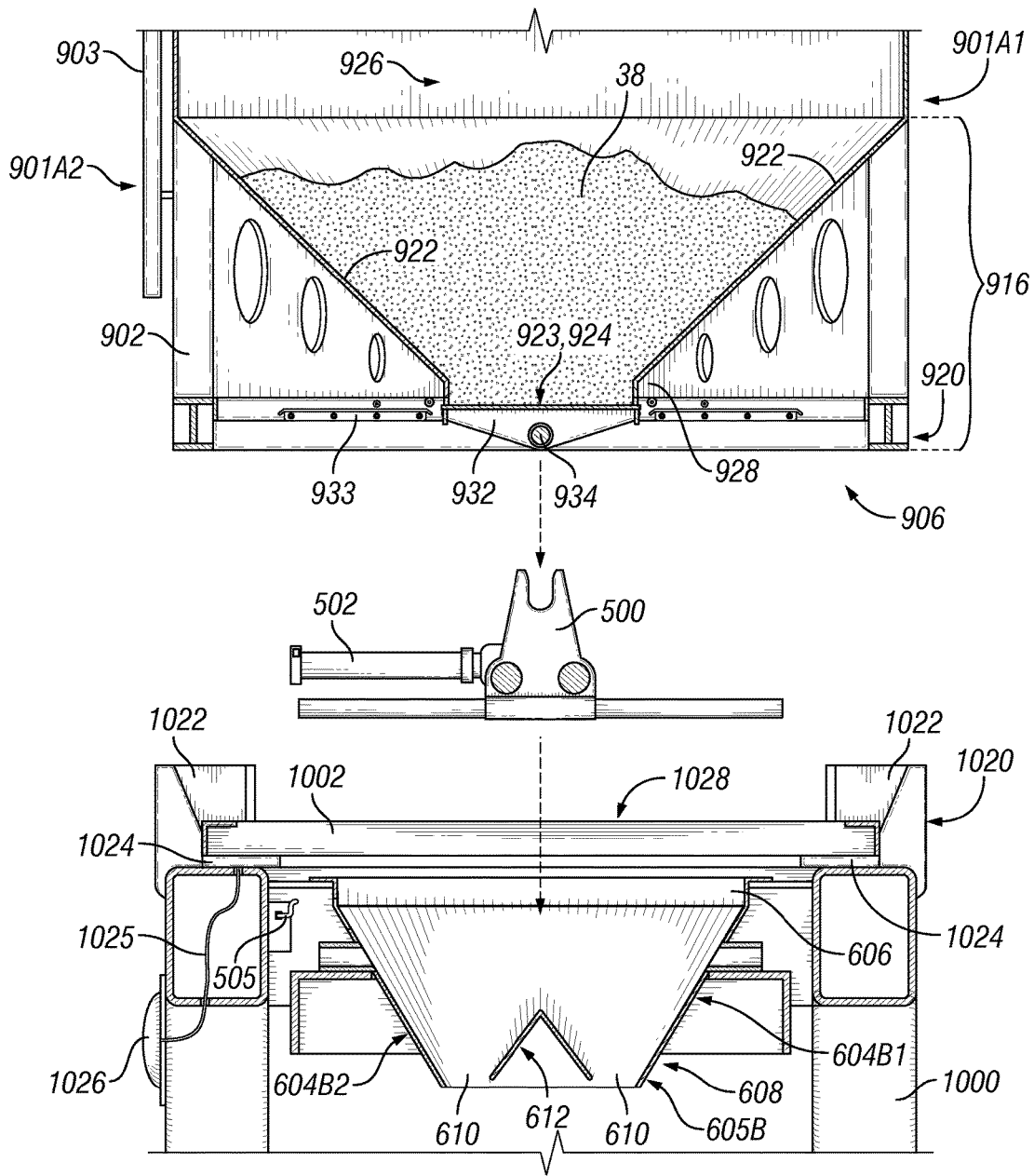
FIG. 5B is an exploded perspective view of FIG. 5A of a container having proppant for fracking positioned on the conveyor according to an embodiment of a system and method of the present invention.
Figure 5C:
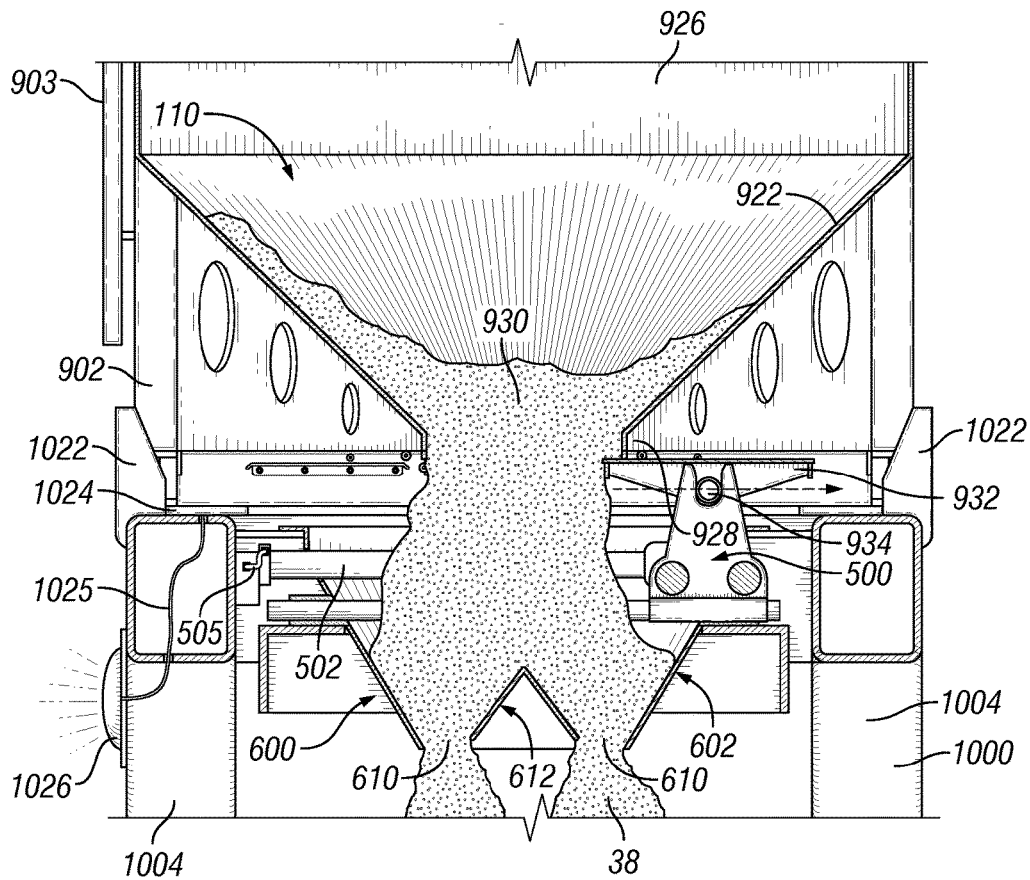
FIG. 5C is a fragmented perspective view of a container having proppant for fracking positioned on a conveyor according to an embodiment of a the system and method of the present invention with portions of the container shown in break-away for clarity.
Figure 6A:
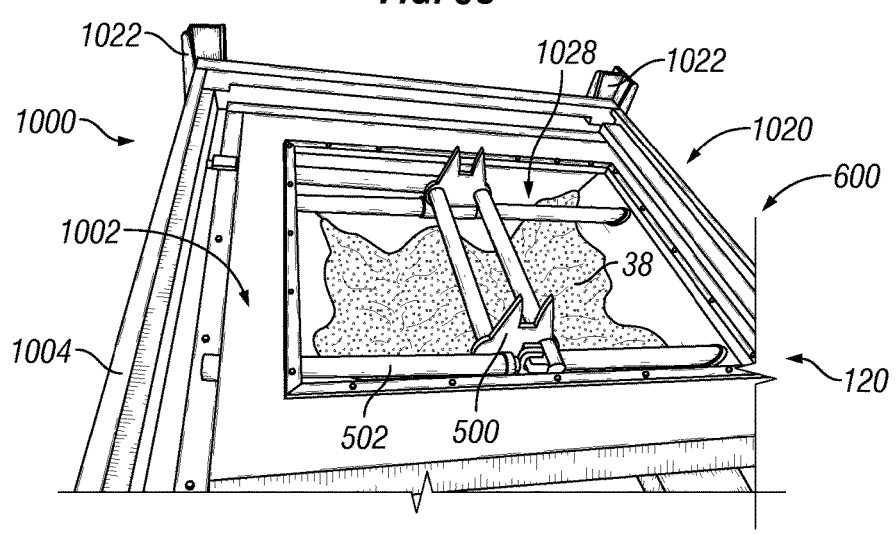
FIG. 6A is a fragmented perspective view of a conveyor hopper substantially full of proppant for fracking according to an embodiment of a system and method of the present invention.
Figure 6B:
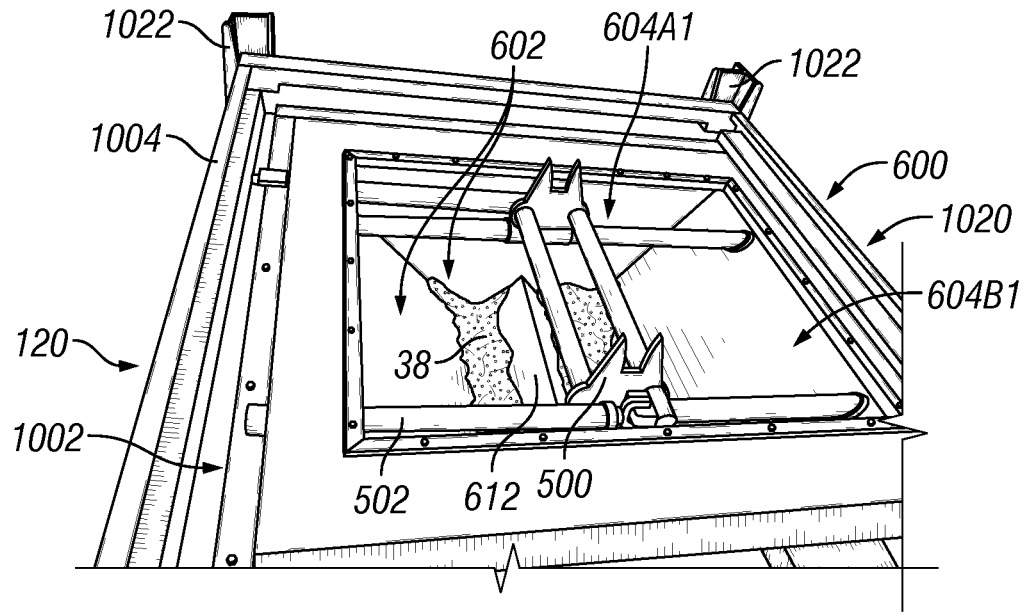
FIG. 6B is a fragmented perspective view of a conveyor hopper partially full of proppant for fracking according to an embodiment of a system and method of the present invention.
Figure 6C:
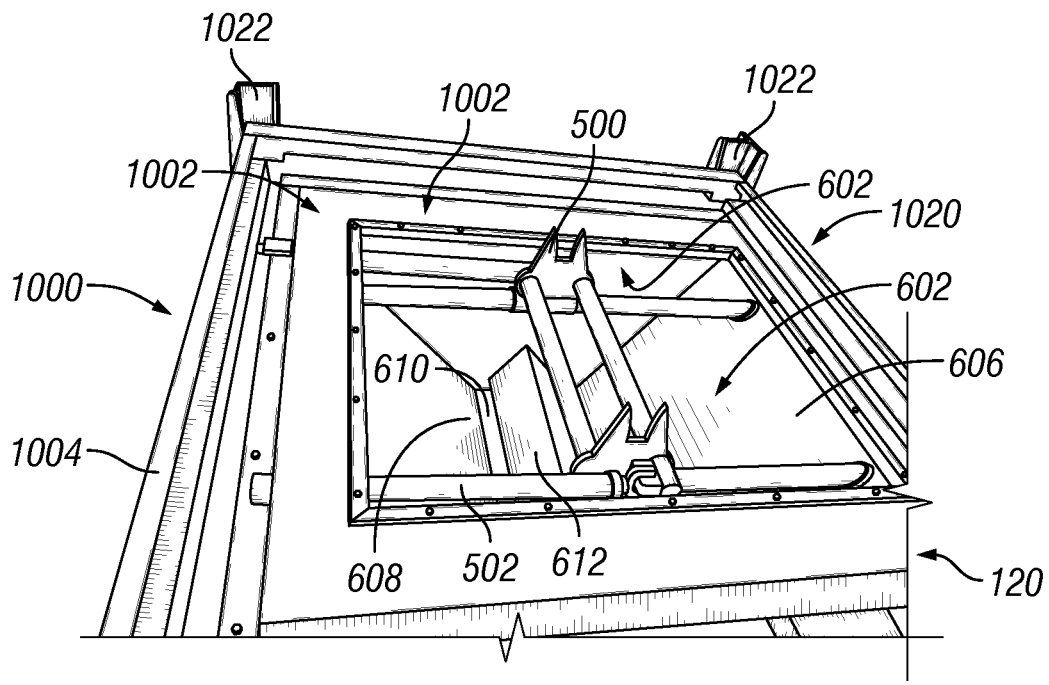
FIG. 6C is a fragmented perspective view of a conveyor hopper without proppant according to an embodiment of a system and method of the present invention.
Figure 9C:
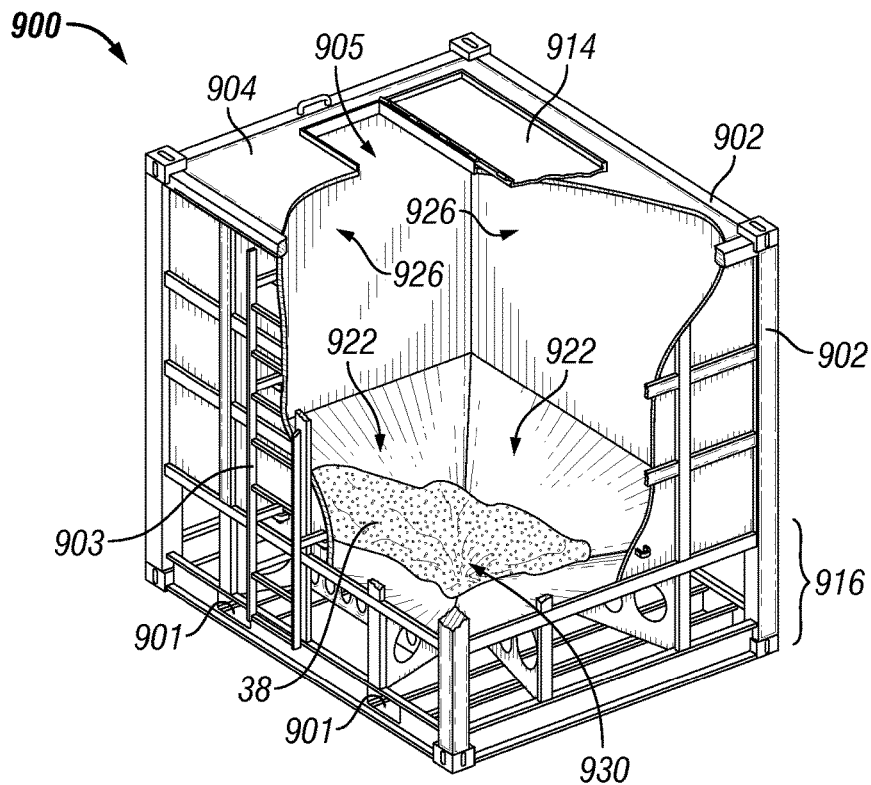
FIG. 9C is a perspective view of a container with portions broken away for clarity to show lower inner side portions of the container according to an embodiment of a system and method of the present invention.
Figure 9D:
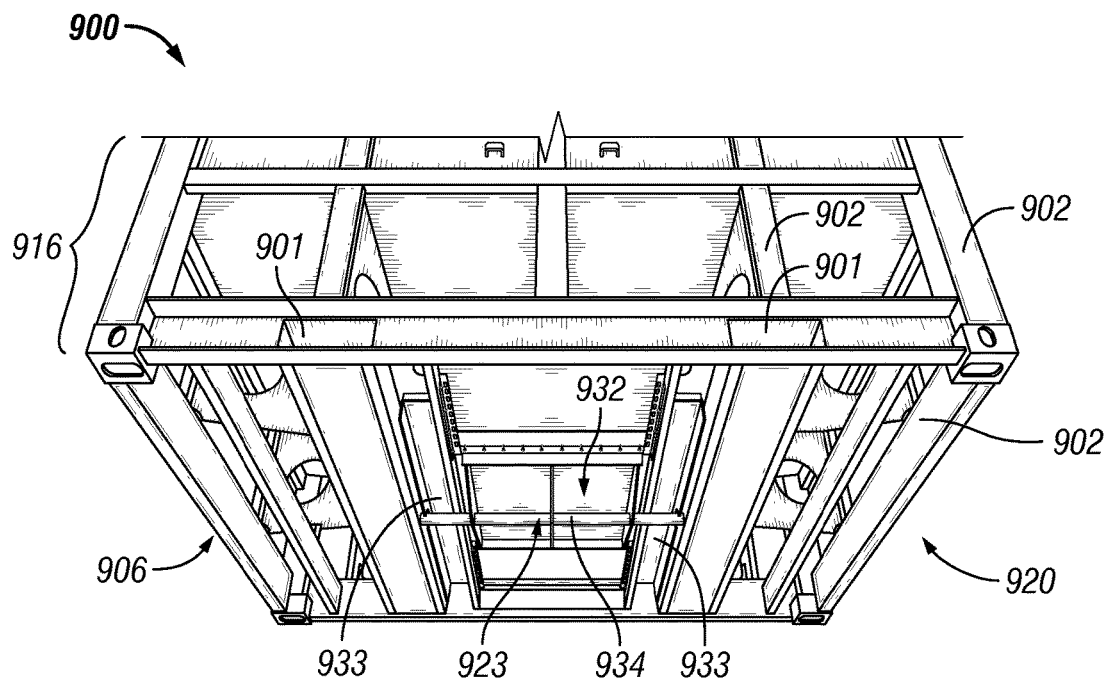
FIG. 9D is another perspective view of a container according to an embodiment of a system and method of the present invention.

As can be seen in from the partial break-away view of a container 900 shown in FIG. 9C and the series of cross-section views of the container in FIGS. 5A-5C, the funnel structure 918 comprises a plurality of inclined lower inner portions 922 of the container 900. The plurality of inclined lower inner portions 922 is roughly in the center 923 of the bottom 906 and has an opening or openings 924. The plurality of inclined lower inner portions 922 is designed to ensure that when proppant 38 is directed out of the container 900, proppant 38 flows from the container 900 until it is substantially empty. The inclined lower inner portions 922 of each respective container 900 are inclined inwardly from inner walls 926 of the respective container 900 toward a bottom 906 of the container at an angle 928 of about 31 degrees to about 37 degrees relative to a horizontal plane 920 of the bottom of each respective container 900 when each respective container 900 is level. Experiments have shown that this angle 928 is particularly effective in the full release of proppant 38 from the interior of the container 900. Any remaining proppant 38 in the container 900, for example, could risk posing a threat to workers in the vicinity of the container 900 during transport of the container 900 to another location. Additionally, because the plurality of inclined lower inner portions 922 is inclined in this respect, proppant 38 does not rush directly out of the interior, as it may otherwise do. Rather, proppant 38 flows along the plurality of inclined lower inner portions 922, creating a sink hole or a funnel 930, toward the one or more openings 924 so as to reduce the production and release of silica dust 50 as proppant 38 flows from the container 900.

Figure 9E:
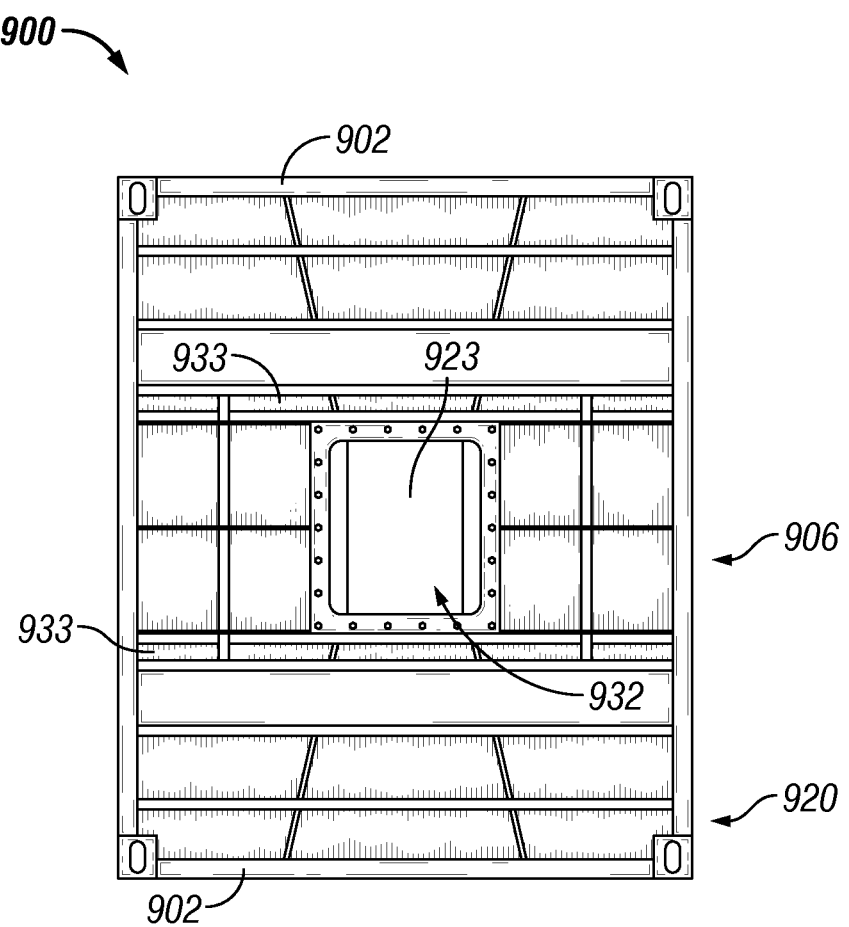
FIG. 9E is a bottom plan view of a container according to an embodiment of a system and method of the present invention.

A flow gate 932 is positioned within tracks 933 located on the bottom 906 over or adjacent the opening or openings 924 of the inclined lower inner portions 922 of each respective container 900, as shown in FIGS. 9D-9E. The flow gate 932 can be planar and is designed to cover the opening or openings 924. The flow gate 932 may be a metering gate or another structure capable of controlling the flow of proppant 38 from the opening or openings 924 that is known to a person skilled in the art. The flow gate 932 includes a handle 934 positioned outwardly from the flow gate 932. Referring to FIGS. 5A-5C, in an embodiment of the system, for example, the handle 934 of the flow gate 932 is designed to sit in the one or more forks 500 of the conveyor 1000, such that an actuator 502 connected to the forks 500 can move the flow gate 932 to enhance opening or closing the one or more openings 924 of the container 900. For a container 900 of this size and magnitude that holds approximately two tons of proppant 38, the actuator 502 can be hydraulically- or electrically-controlled to enhance opening and closing of the flow gate 932. If hydraulics are used, for example, a plurality of hydraulic pressure hoses 503 can connect the actuator to the one or more engines 710. If electronics are used, for example, a plurality of wires 505 can be used to connect the actuator to the one or more engines 710. Wireless connections are also contemplated. A person of skill in the art would understand the various connections to engines 710 and controls 1017 available for powering the actuator 502. The flow gate 932 can be controlled remotely via the internet, or locally on the well site 30, either by an operator or a machine. This flow gate 932 also controls the rate at which proppant 38 flows from the container 900 to reduce the production and release of silica dust 50 associated with the proppant 38 into the air at the one or more openings 924.

Figure 10A:
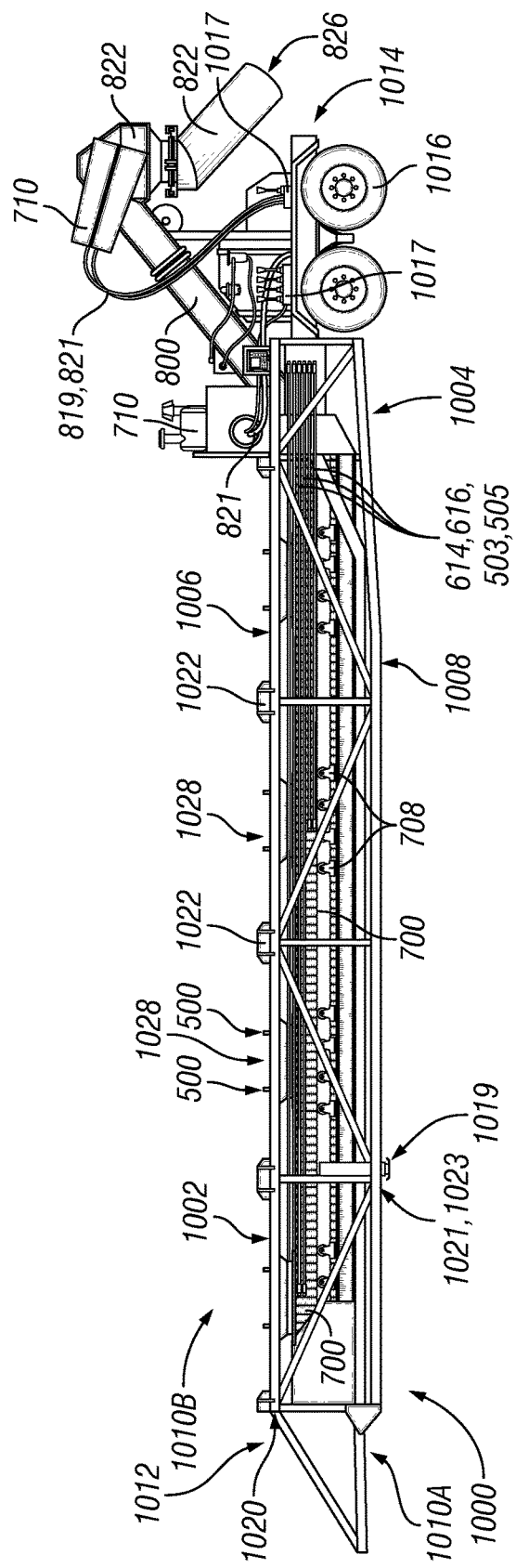
FIG. 10A is a side elevation view of a conveyor according to an embodiment of a system and method of the present invention.
Figure 10B:
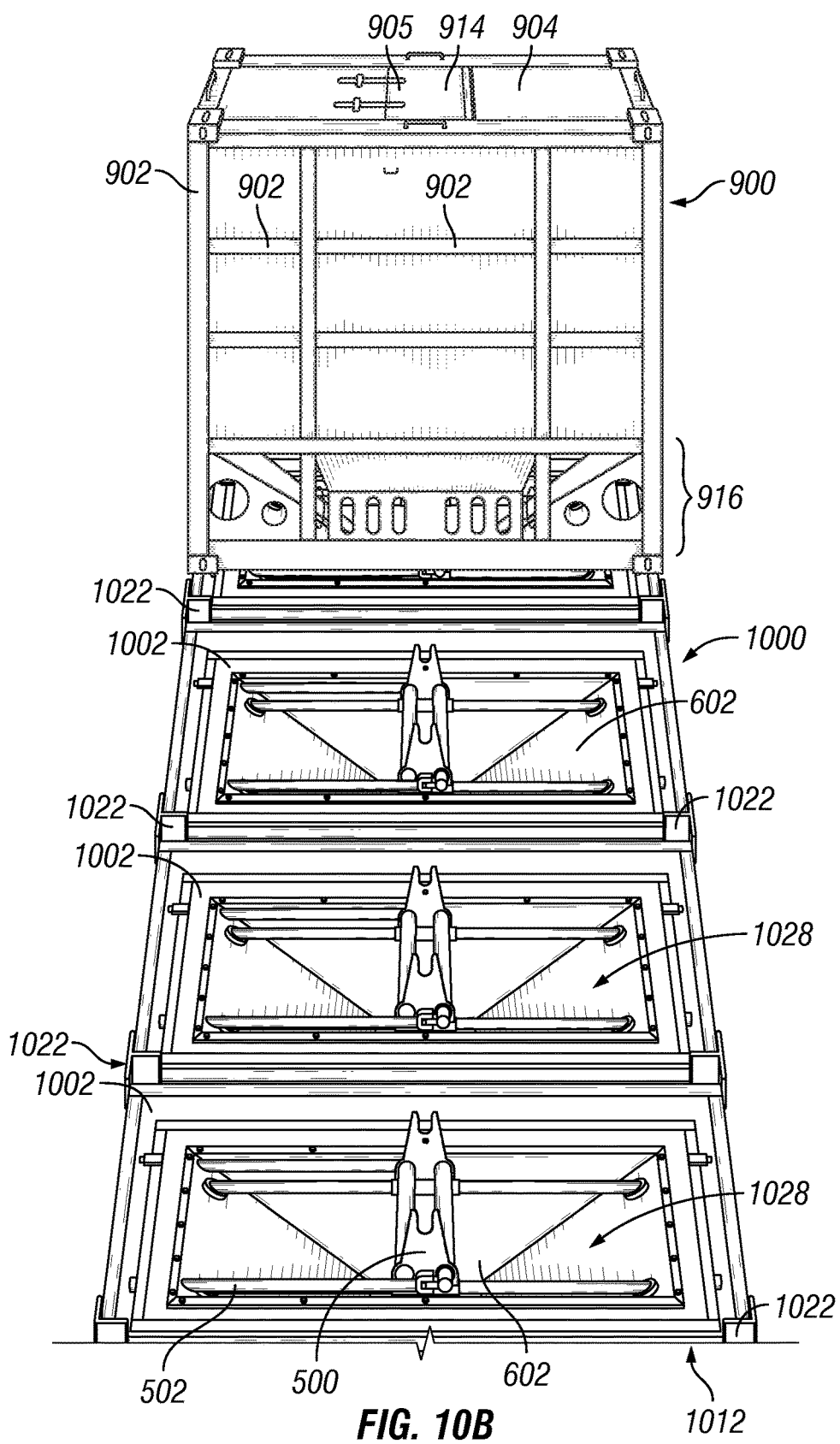
FIG. 10B is perspective view of a conveyor illustrating a container positioned above the conveyor according to an embodiment of a system and method of the present invention.

The containers 900 described herein are adapted to fit onto compartments 1002 of a conveyor 1000 adapted to receive the containers 900 thereon. As shown in FIGS. 10A, 10B, and 12B, an embodiment of a conveyor 1000 of embodiments of methods and systems includes a frame 1004 with a top 1006, a bottom 1008, two sides 1010A & 1010B, a first end 1012, and a second end 1014. The conveyor 1000 is made of steel or other similar material. It may be approximately forty feet in length, eight-and-a-half feet in width, four feet in height, and having wheels 1016 and controls 1017 on the first end 1012, the second end 1014, or both, but including, for example, on the second end 1014, and a trailer hitch 1018 on the first end 1012, the second end 1014, or both, but including, for example, on the second end 1014, such that an operator could attach the conveyor 1000 to the cab of an eighteen-wheeler truck 44 and pull the conveyor 1000 on a highway. The size of the conveyor 1000 is designed to be at or below the dimensions permitted by law for trailers of trucks 44, so the dimensions may be adjusted as dimensions change for safe highway travel. The frame 1004 must be able to support up to several tons of proppant 38 housed in a plurality of containers 900. The conveyor 1000 has one or more hydraulic or electric lifts 1019 to make sure that the frame 1004 is level because the well site may have uneven ground. If hydraulics are used, for example, a plurality of hydraulic pressure hoses 1021 can connect the lifts 1019 to the one or more engines 710 and controls 1017. If electronics are used, for example, a plurality of wires 1023 can be used to connect the lifts 1019 to the one or more engines 710. Wireless connections are also contemplated. A person of skill in the art would understand the various connections to engines 710 and controls 1017 available for powering the lifts 1019. The one or more lifts 1019 also decrease the risk that the conveyor 1000 will tip over or become unstable on the well site 30.

As shown in FIG. 10B, the top 1006 of the frame 1004 comprises a top surface 1020 that is adapted to receive embodiments of the containers 900 described herein. The top surface 1020 has one or more compartments 1002, each adapted to receive one or more containers 900, an example of which can be seen in FIG. 6C. In an embodiment, for example, the conveyor 1000 has three to five compartments 1002 to receive three to five containers 900 having proppant 38 for fracking. As shown in FIG. 10B and FIG. 12A, the top surface 1020 can have four compartments 1002 to receive four containers 900 having proppant 38 for fracking. In the same embodiment, for example, the four containers 900 are positioned on the conveyor 1000 such that each container 900 has either one or both parallel sides 901A1 and 901A2 adjacent the either one, or both parallel sides 901A1 and 901A2 of another container 900, the top 904 and bottom 906 of each container 900 is perpendicular to the top surface 1020 of the conveyor 1000, and the top 904 and bottom 906 of each container 900 is overlaying the conveyor belt 700 positioned below the top surface 1020 of the conveyor 1000. In this embodiment, for example, each container 900 is positioned in a line such that the proppant 38 contained within each container 900 will flow out of each container 900 onto one or more conveyor belts 700. In another embodiment, the plurality of containers 900 are positioned in a side-by-side arrangement on the top surface 1020 of the conveyor 1000 overlaying one or more conveyor belts 700.

Figure 4:
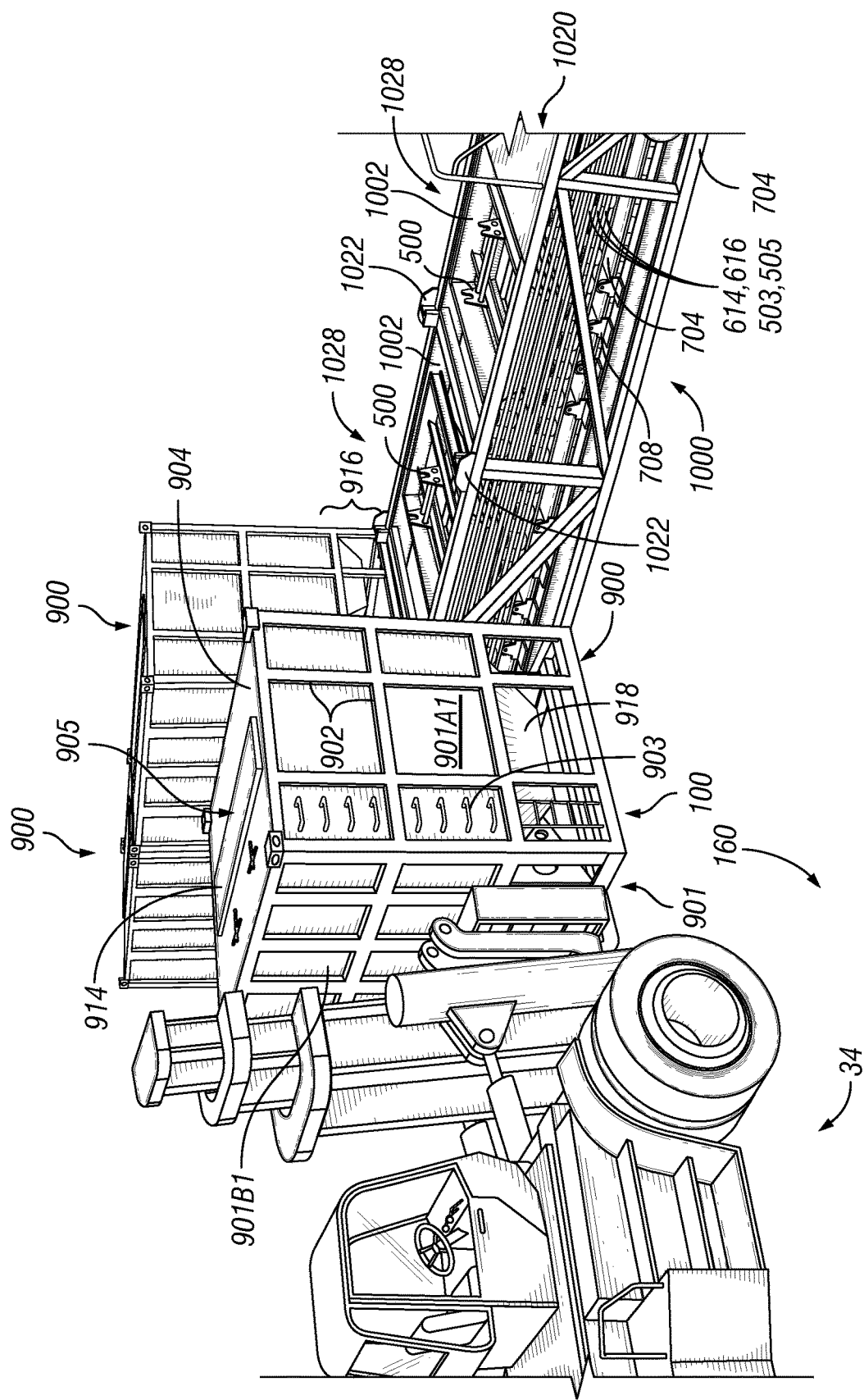
FIG. 4 is a perspective view of a forklift preparing to position a container having proppant for fracking onto a conveyor according to an embodiment of a system and method of the present invention.

As can be seen in FIGS. 4, 5A, 5C, 6A-6C, the one or more compartments 1002 of the conveyor 1000 can include corners 1022, tracks, lock-and-key connections, and female-and-male connections, for example. These corners 1022, for example, can be made of steel or other similar material. The container 900 need not fit tightly onto each compartment 1002. Instead, for example, the corners 1022 need only to guide the container 900 into position onto the compartment 1002 such that the container 900 will not fall off of the conveyor 1000. Alternatively, the container 900 may fit tightly on the compartment 1002. The sheer weight of the container 900, however, would usually prevent the container 900 from moving once it is positioned on the compartment 1002, even without any such corners 1022, and the compartment 1002 need not have any such corners 1022 as described herein. In an embodiment of a system, and as shown in FIG. 4, for example, a forklift 34, crane 35, or other heavy machinery lifts a container 900 having proppant 38 up and over the top of the respective compartment 1002 of the conveyor 1000, comprising steel corners 1022 extending vertically from each respective corner of each respective compartment 1002 of the conveyor 1000, and lowers the container 900 having proppant 38 into place onto the conveyor 1000. The corners 1022 of the compartment 1002 guide the container 900 into place. Referring to FIG. 5C, the respective corners 1022 of the compartments have a plurality of load cells 1024 for determining the weight of each container 900 on each respective compartment 1002 of the conveyor 1000. In an embodiment of the present invention, for example, a load cell 1024 is positioned in each of the four corners of the compartment 1002. These load cells 1024 inform an operator or machine how much proppant 38 is left in the respective container 900 by its weight so the operator or machine knows when to replace the respective empty container 900 with another container 900 filled with proppant 38 at a well site 30. The respective load cells 1024 are in electric or wireless communication via wires 1025 or wirelessly with a light 1026 to indicate to the operator or machine that the container 900 is positioned properly onto the compartment 1002. When a container 900 is positioned properly on the compartment 1002, for example, the light 1026 may change from red to green, for example. It should be understood that a forklift 34 need not lift the respective container 900 up and over the corners 1022 of the compartment 1002 of the conveyor 1000 if alternative structures are used instead of corners 1022. In this way, the forklift 34 could, for example, lift the container 900 up to the height of the top surface 1020 of the conveyor 1000 and slide the container 900 onto the respective compartment 1002.

The conveyor 1000, having a plurality of compartments 1002 adapted to receive containers 900, also can have a plurality of openings 1028 in the top surface 1020 of the conveyor 1000. The plurality of openings 1028 is positioned beneath the respective plurality of containers 900 on the conveyor 1000 such that proppant 38 flowing from each respective container 900 will pass through each respective opening 1028. Each opening 1028 has one or more forks 500 positioned above or adjacent the opening or openings 1028, the one or more forks 500 adapted to receive a handle 934 of a flow gate 932 of a container 900 to engage, contact, or communicate with the corresponding handle 934 of the flow gate 932 of the container 900, as shown in an embodiment depicted in FIGS. 5A-5C and 10C. The handle 934 of the flow gate 932, the one or more forks 500, or both, are in electric or wireless communication with the light 1026, along with the respective load cells 1024 of the corners 1022 via wires 1025 or wirelessly, to indicate to an operator or machine that the container 900 is in proper position when the handle 934 of the flow gate 932 is aligned or situated in the one or more forks 500 of the compartment 1002. The variety of connections or contacts to secure or place the container 900 onto the top surface 1020 of the conveyor 1000, such that the actuator 502 can operate the flow gate 932 of the container 900, will be apparent to a person having skill in the art.

Embodiments of the conveyor 1000, for example, also can include a plurality of conveyor hoppers 600 positioned adjacent or beneath the plurality of openings 1028 in the top surface 1020 of the conveyor 1000. The plurality of conveyor hoppers 600 is positioned such that when containers 900 are placed onto the conveyor 1000, each respective conveyor hopper 600 is beneath the flow gate 932 of the one or more openings 924 of each respective container 900. As shown in FIGS. 5A-C and FIGS. 6A-6C, each respective conveyor hopper 600 can include a plurality of inclined sides 602 to form a receptacle or funnel structure for proppant 38 to pass into and through as proppant 38 is discharged from each respective container 900 when in operation. The plurality of inclined sides 602 can include a pair of short sides 604A1, 604A2 and a pair of long sides 604B 1, 604B2. Based on experimental results, the short sides 604A 1-A2 can have a funnel angle 605A or slope of approximately 35 to 40 degrees relative to a horizontal plane 1020, including, for example, 38 degrees, and the long sides 604B1-B2 can have a funnel angle 605B or slope of approximately 28 to 33 degrees relative to a horizontal plane 1020, including, for example, 31 degrees, to maximize the capacity of the conveyor hopper 600 and the flow of proppant 38 from the conveyor hopper 600.

Figure 10C:
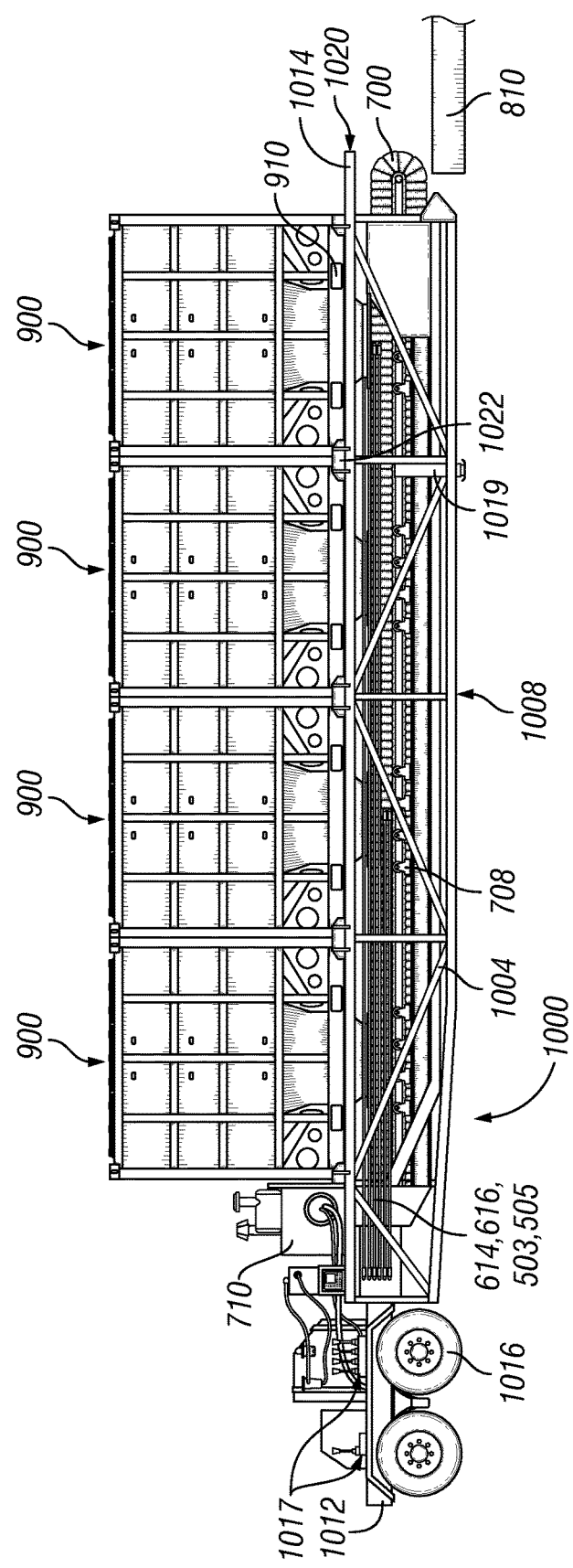
FIG. 10C is a side elevation view of an alternative embodiment of a conveyor according to an embodiment of a system and method of the present invention.

The conveyor hopper 600 has a top portion 606 and a bottom portion 608, and the bottom portion 608 can include one or more controllable openings 610. The top portion 606 of the conveyor hopper 600 can be in the same plane, above it, or below the top surface 1020 of the conveyor 1000. The top portion 606 of the conveyor hopper 600 can be in the same plane or higher than the top surface 1020 of the conveyor 1000, as can be seen in FIGS. 10B, 10C. Each conveyor hopper 600, for example, can be zero to two inches below the respective flow gate 932 of the one or more openings 924 of the bottom of each container 900. In this embodiment, for example, the distance the flowing proppant 38 has to pass from the one or more openings 924 of the container 900 into the conveyor hopper 600 is minimized to reduce the risk of production and release of silica dust 50. This close proximity further limits the risk of exposure to silica dust 50 by workers at the well site 30. The bottom portion 608 of the conveyor hopper 600 also can include one or more controllable openings 610. The one or more controllable openings 610 can include a hopper gate 612. The hopper gate, for example, can be made of steel or similar material, and can be formed in the shape of an inverted "V" or other shape that facilitates the flow of proppant 38 through the bottom portion 608 of the conveyor hopper 600. The hopper gate 612 can be connected to a hopper gate actuator 613 that can be optionally hydraulically- or electrically-controlled to enhance opening and closing of the one or more controllable openings 610 of the conveyor hopper 600. If hydraulics are used, for example, a plurality of hydraulic pressure hoses 614 can connect the hopper gate actuator 613 to the one or more engines 710 and controls 1017. If electronics are used, for example, a plurality of wires 616 can be used to connect the hopper gate 612 to the one or more engines 710 and controls 1017. Wireless connections are also contemplated. A person of skill in the art would understand the various connections to engines 710 and controls 1017 available for powering the hopper gate actuator 613. In the embodiments shown in the series from FIGS. 6A to 6C, for example, proppant 38 is controllably discharged from the conveyor hopper 600 so that there is no excess proppant 38 discharged at any one time. This embodiment prevents the creation of a cloud of silica dust 50 in the area of the conveyor belt 700, while maximizing the efficiency of the delivery of proppant 38 onto the conveyor belt 700.

Embodiments of methods and systems, for example, also can include one or more conveyor belts 700. Each respective conveyor belt 700 has a top surface 702, a bottom surface 704, and two sides 706A, 706B. Each respective conveyor belt 700 is manufactured as one long piece, or is zippered together to form one long piece. Each respective conveyor belt 700 has a first end portion 705 and a second end portion 707. Each respective conveyor belt 700 is suitably wound around rollers 708 to travel a desired path. Each respective conveyor belt 700 is powered by one or more engines 710. These engines 710 can be diesel, electric, or a combination of the two. Diesel engines 710 have been used in the filed for many years and are reliable in remote locations. Electric engines 710, however, are cleaner to use but may require, for example, an on-site generator, batteries, or access to electric power to run. The industry, however, is moving towards cleaner power sources, and the various engines 710 available will be known to a person of skill in the art. As shown in FIGS. 7A-7B and 8A-8D, each respective conveyor belt is adapted to reduce the risk of production and release of silica dust 50 as proppant 38 guidingly falls from the plurality of conveyor hoppers 600 to the one or more conveyor belt 700. The respective one or more conveyor belts 700 can include a plurality of partitions 712. Embodiments of the plurality of partitions 712 can include a plurality of fingers 714 and an outside wall 716 on each side. Each respective conveyor belt 700 can be manufactured to include, or integrate, the plurality of fingers 714 and the outside walls 716. Alternatively, the plurality of fingers 714 and the outside walls 716 can be connected to a top surface 702 of a conveyor belt using commercially-acceptable adhesive.

Figure 7A:
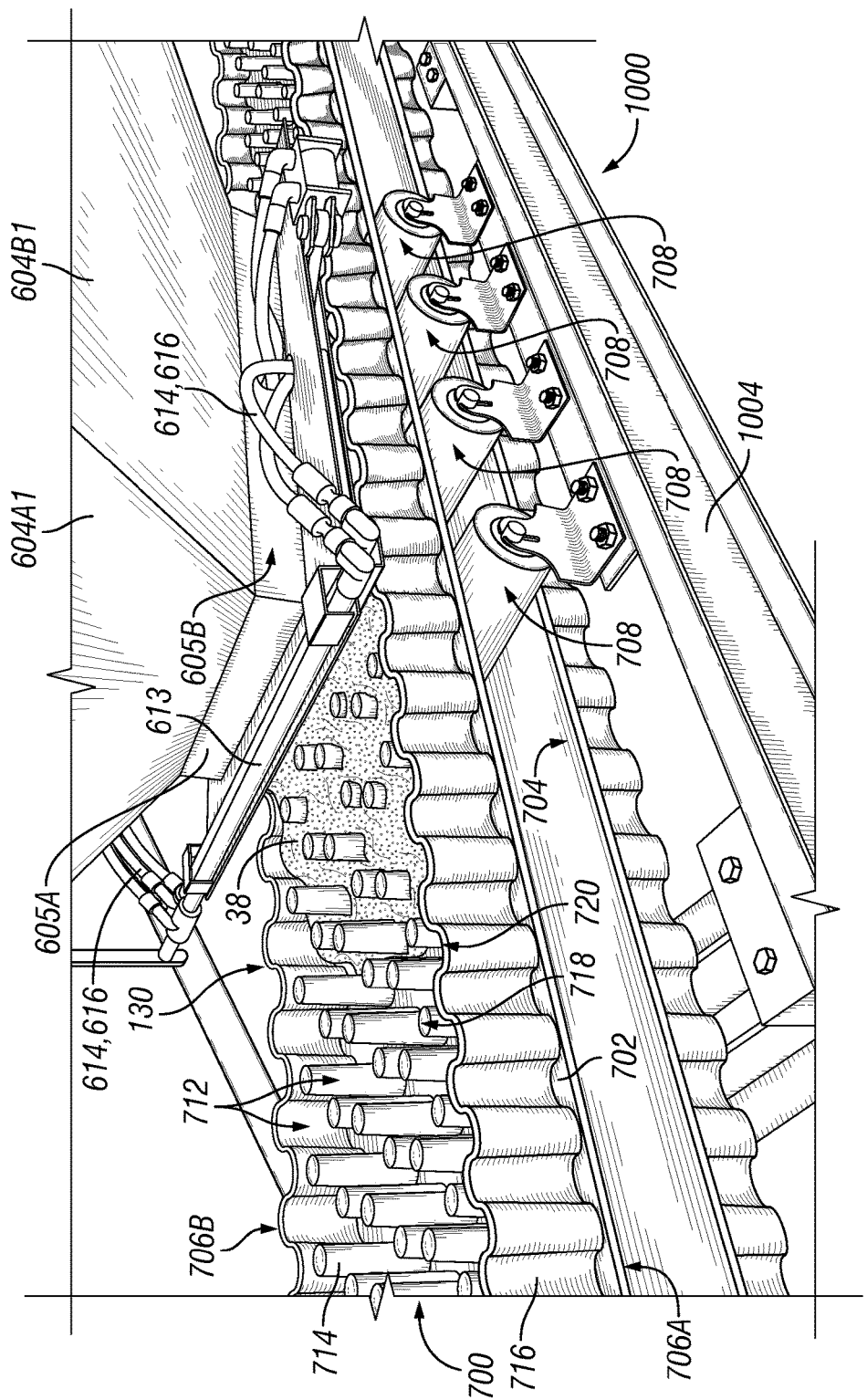
FIG. 7A is a fragmented perspective view of a conveyor belt having a plurality of partitions and a plurality of outside walls to convey proppant according to an embodiment of a system and method of the present invention.
Figure 7B:
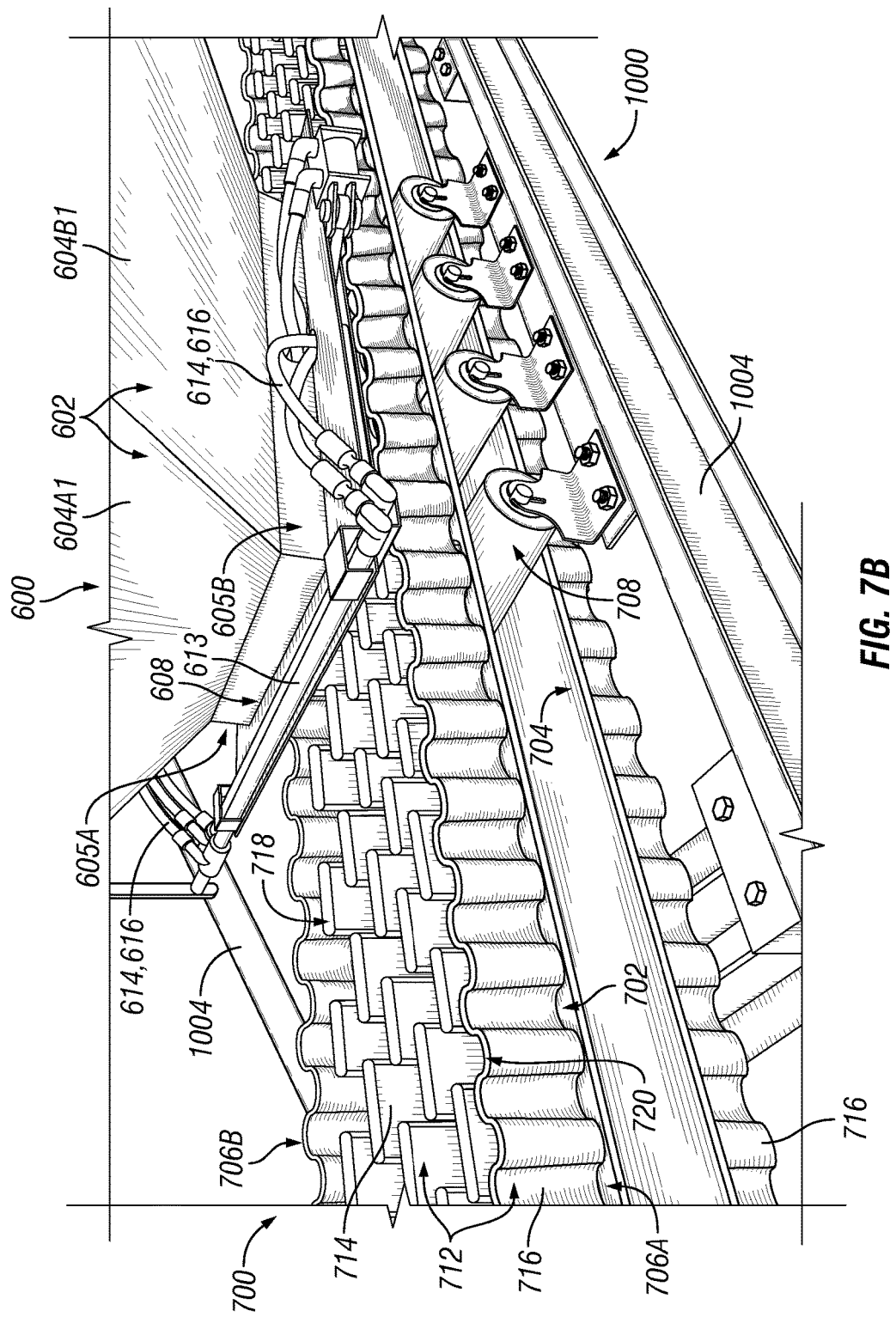
FIG. 7B is a fragmented perspective view of an alternative embodiment of a conveyor belt shown in FIG. 7A, having a plurality of partitions and a plurality of outside walls to convey proppant according to an embodiment of a system and method of the present invention.
Figure 11:
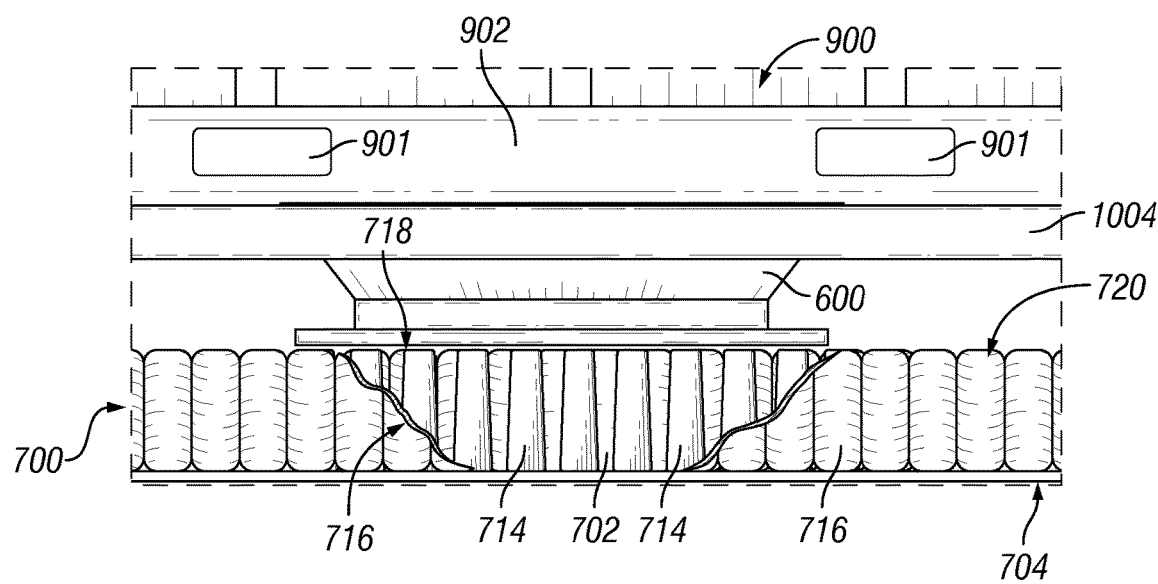
FIG. 11 is a side elevation view of a conveyor belt underlying a conveyor hopper with break-away portions of a front outer wall of the conveyor belt showing a plurality of partitions according to an embodiment of a system and method of the present invention.

Referring to FIG. 11, the plurality of fingers 714 of the conveyor belt 700 connect to and extend upwardly from a top surface 702 toward the conveyor hopper 600 when positioned to underlie the conveyor hopper 600, and each of the plurality of fingers 714 is spaced-apart from another one of the plurality of fingers 714 so that the top surface receives the proppant 38 thereon and between the plurality of fingers 714. The plurality of fingers 714 are perpendicular or near-perpendicular to the top surface 702 of the one or more conveyor belts 700. The plurality of fingers 714 are closely-spaced from one another, including from between one and four inches apart from one another. The plurality of fingers 714 may be arranged in a regular pattern or an irregular pattern on the top surface 702 of the respective conveyor belt 700. The arrangement or pattern of the plurality of fingers 714 need only to fulfill the function of the plurality of fingers 714, which is, for example, to separate out the proppant 38 and break up the clumps of proppant 38, if any, falling from the conveyor hopper 600. The plurality of fingers 714 also is useful in guiding the proppant onto the top surface 702 of the conveyor belt 700 to reduce the production of silica dust 50. As can be seen in the embodiments shown in FIGS. 7A and 7B, for example, the plurality of fingers 714 may be cylindrical, angular, or flat. Each respective finger 714 has a top 718 that may be flat or rounded. The plurality of fingers 714 each may have a top 718 that is flat because, as the conveyor belt 700 is running, the vibrations from the engine or engines 710 do not permit the proppant 38 to remain on the top 718 of the plurality of fingers 714. Rather, the proppant 38 will fall between the plurality of fingers 714 to the top surface 702 of the one or more conveyor belts 700, as is shown in FIG. 7A.

Each side 706A, 706B of the one or more conveyor belts 700 has an outside wall 716 positioned at or near the margin or edge of the respective side 706A, 706B. The outside wall 716 can be in a continuous "S" shape to permit the conveyor belt 700 to compress and flex around rollers 708 as the conveyor belt 700 is moving to prevent the escape of silica dust 50. The outer wall 716 also prevents proppant 38 from spraying or falling out the sides 706A, 706B of the conveyor belt 700 as it is being conveyed to the chute 822. It also prevents wind from blowing the proppant 38 or silica dust 50 off the conveyor belt 700. Other shapes, for example, a wave or triangular shape, of the outer wall 716 are acceptable so long as the conveyor belt 700 does not release silica dust 50 or proppant 38 through the outer wall 716 as it passes along the rollers 708. The outer wall 716 may comprise a flat or rounded top 720, much the same as the plurality of fingers 714. As can be seen in an embodiment shown in FIG. 11, for example, the plurality of fingers 714 and the outer wall 716 are relatively the same height from the top surface 702 of the conveyor belt 700. In the embodiment shown in FIG. 11, the height of the plurality of partitions 712 can be between four to eight inches, including, for example, six inches. The substantially similar height of the plurality of fingers 714 and the outer walls 716 allows the conveyor belt 700 to be positioned as closely to the bottom portion 608 of each respective conveyor hopper 600 to minimize the distance the proppant 38 has to fall as the proppant 38 flows from the plurality of conveyor hoppers 600 to the one or more conveyor belts 700. This distance between the plurality of conveyor hoppers 600, and the top 718, 720 of the plurality of partitions 712 can be between zero and two inches. With this negligible gap, the risk of production and release of silica dust 50 is reduced.

As shown in the embodiments of FIGS. 7A-7B and 8A-8D, the conveyor belt 700 is positioned at or near the one or more controllable openings 610 of the plurality of conveyor hoppers 600 to reduce risk of production and release of silica dust 50 as proppant 38 flows from the plurality of containers 900, to and through the plurality of conveyor hoppers 600, onto the one or more conveyor belts 700. In an embodiment, for example, the conveyor belt 700 is substantially enclosed. In an embodiment shown in FIGS. 12A and 12B, a curtain or curtains 1200 may be added to one or more sides 1010A, 1010B of the conveyor 1000 to fully enclose the one or more conveyor belts 700. The curtain or curtains 1200 may include tarps 1202, steel panels 1204, or similar structures, that are removably or permanently attached to the conveyor 1000 using fasteners 1206 such as bungee cords, rope, zip ties, bolts, screws, welding, or other material adapted to be integral with or attached to the conveyor 1000. The curtain or curtains 1200 further protect the proppant 38 from the wind at it is blowing across the well site 30, from the rain or precipitation at the well site 30, and from any incidental silica dust 50 or proppant 38 that may spray from the conveyor belt 700, and thus further reduce the risk of the release of silica dust 50 into the air.

Similarly to the curtain or curtains 1200 of an embodiment shown in FIG. 12A-12B, an embodiment of the present invention can include a blender hopper cover 1208. Like the curtain or curtains 1200, the blender hopper cover 1208 may be added to the one or more outlets 826 of the chute 822 or to the second end 1014 of the conveyor 1000 to fully enclose the path to the blender hopper 810. The blender hopper cover 1208 may include tarps 1210, steel panels 1212, or similar structures, that are removably or permanently attached to the chute 822 or conveyor 1000 using fasteners 1214 such as bungee cords, rope, zip ties, bolts, screws, welding, or other material adapted to be integral with or attached to the chute 822 or the conveyor 1000. The blender hopper cover 1208 further protects the proppant 38 from the wind at it is blowing across the well site 30, from the rain or precipitation at the well site 30, and from any incidental silica dust 50 or proppant 38 that may spray from chute 822 or conveyor belt 700 as proppant 38 is deposited into the blender hopper 810, and thus further reduces the risk of the release of silica dust 50 into the air.

In an embodiment shown in FIG. 10A, for example, a first end portion 705 can be parallel to the ground and positioned at the first end 1012 of the conveyor 1000. A second end portion 707 of the conveyor belt 700 can be elevated relative to the first end portion 705 of the conveyor belt 700 and positioned between the last respective container 900 on the second end 1014 of the conveyor 1000 and the chute 822, at an angle 805 above parallel with respect to the ground. Rollers 708 positioned within the conveyor 1000 control the path the one or more conveyor belts 700 travel. In an embodiment, for example, the conveyor belt 700 travels in a path that is level from the first end 1012 of the conveyor 1000 as the conveyor belt 700 passes beneath each of the plurality of conveyor hoppers 600 and containers 900 positioned thereabove, bends upward after the conveyor belt 700 has passed beneath the last container 900 positioned on the conveyor 1000, and travels upward towards a second end 1014 of the conveyor 1000, relative to a horizontal plane 1020, to the chute 822, where the conveyor belt 700 turns about a roller 708 and returns toward the first end 1012 of the conveyor 1000. In an embodiment, for example, the second end 1014 of the conveyor 1000 can be elevated relative to the first end 1012 of the conveyor 1000 so that proppant 38 may be deposited off of the end of the conveyor belt 700 via gravity feed 812 into the chute 822 for deposit into the blender hopper 810.

Figure 8A:
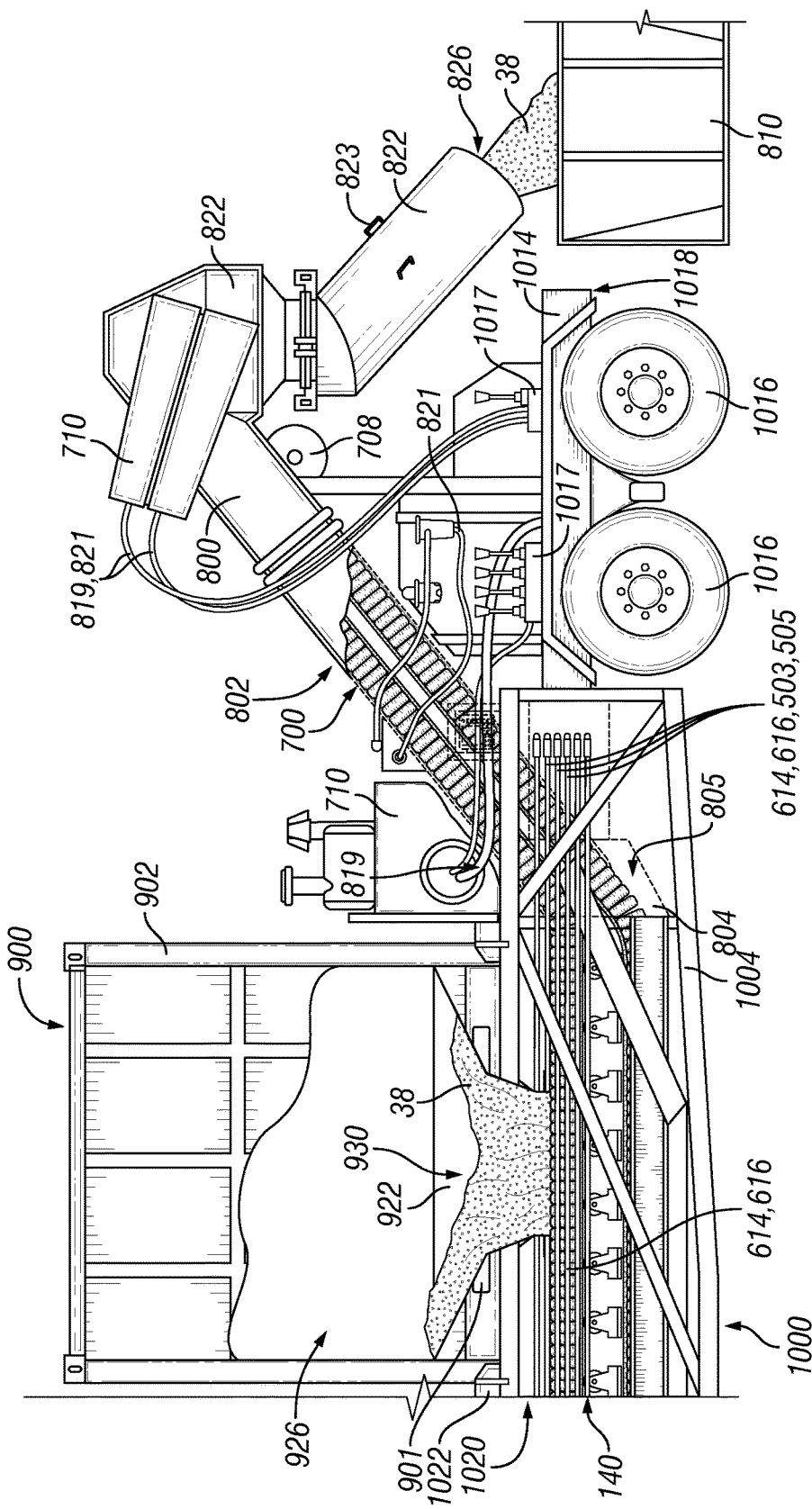
FIG. 8A is a fragmented perspective view of a second end of a conveyor according to an embodiment of a system and method of the present invention with a partial break-away view of the shroud for clarity further to show a conveyor belt.
Figure 8C:
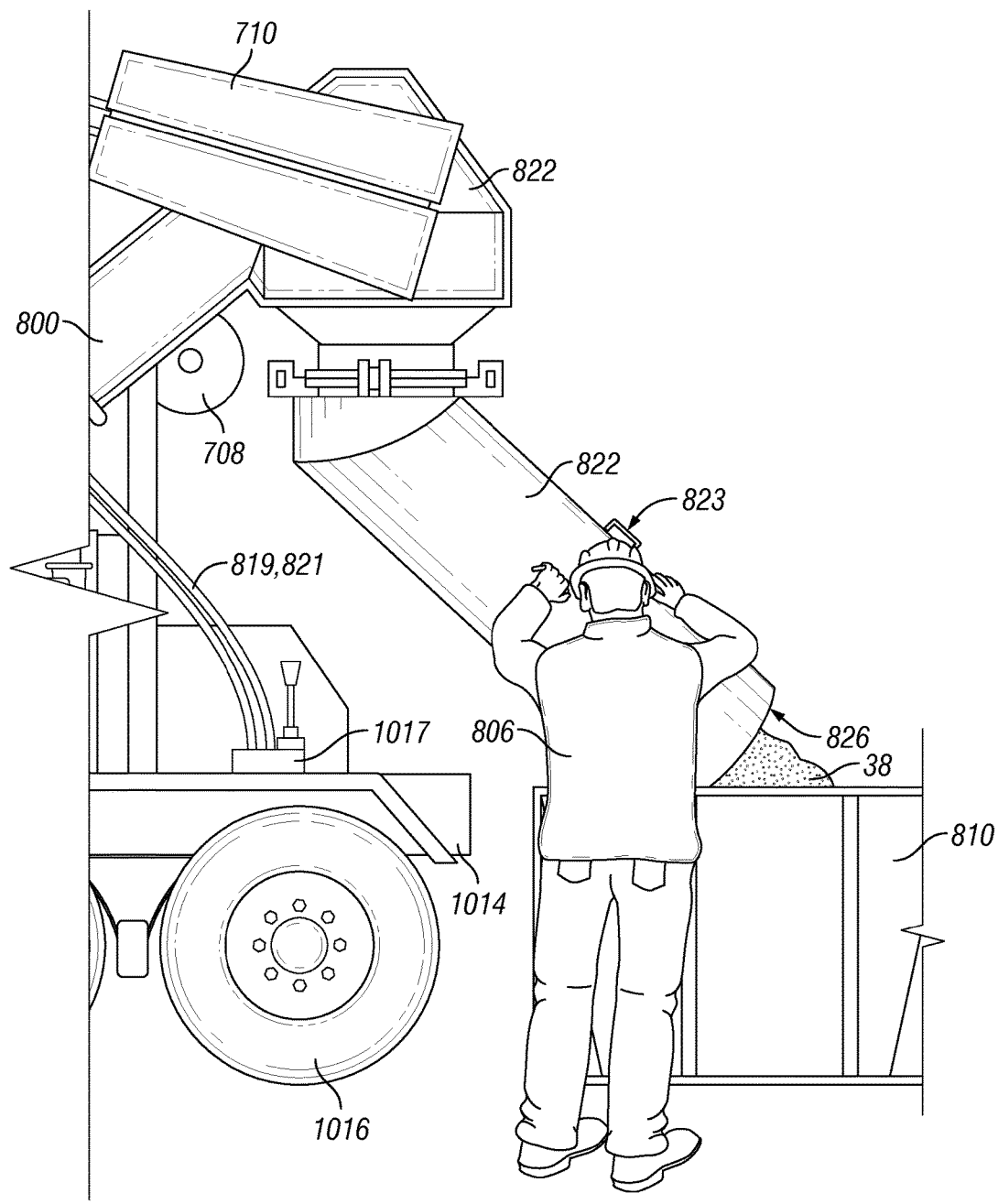
FIG. 8C is a perspective view of an operator positioning a chute to deposit proppant into a blender hopper according to an embodiment of a system and method of the present invention.

In an embodiment of a method, for example, where a conveyor 1000 is holding all of the containers 900 it is designed to hold, as shown, for example, in FIG. 12A, the conveyor belt 700 is level with the ground as it passes beneath each of the plurality of containers 900 positioned on the conveyor 1000. As shown by the break-away portions of FIG. 8A, once the conveyor belt 700 passes the end of the last respective container 900 positioned on the conveyor 1000, the conveyor belt 700 is directed by one or more rollers 708 in an upward direction towards the second end 1014 of the conveyor 1000. This portion 802 of the conveyor belt 700 can travel upwards at an angle 805 of approximately thirty to sixty degrees with respect to a horizontal plane 1020 extending from the conveyor belt 700 as it is level with the ground. The portion 802 of the conveyor belt 700 that travels in an upward direction also passes through a shroud 800, therein defining a shrouded portion 802 of the conveyor belt 700, as shown in FIGS. 8A-8B. The shrouded portion 802 is positioned between a last respective container 900 on the conveyor 1000 and an inlet 824 of the chute 822 at an angle 805 of approximately 30 to 60 degrees from a horizontal plane 1020 when the conveyor 1000 is level. At the second end 1014 of the conveyor 1000, the one or more conveyor belts 700 turns about within the chute 822 that is substantially enclosed and travels downward towards a first end 1012 of the conveyor 1000. As shown in FIG. 8B, as the conveyor belt 700 turns about, the proppant 38 is deposited into a chute 822 that is enclosed by gravity feed 812. The proppant 38 flows down the chute 822 and is deposited where the operator 806 or machine directs the proppant 38 from the outlet 826 of the chute 822, but the chute 822 can be positioned to deposit proppant 38 into a blender hopper 810 at the well site 30, as shown in FIG. 8C.

In an embodiment, for example, shown in FIGS. 8D and 10C, the conveyor belt 700 need not travel in an upward direction at the second end 1014 of the conveyor 1000, but rather, may stay level, or travel in a downward path, if the conveyor 1000, the one or more conveyor belts 700, or the chute 822, is positioned to deposit proppant 38 into a blender hopper 810 that is at or below the one or more conveyor belts 700, or if the chute 822 is positioned to deposit proppant 38 into a hole, for example. This embodiment of the present invention may include the one or more conveyor belts 700 traveling in a substantially level or downward path from the first end 1012 of the conveyor 1000 to the second end 1014, underneath the plurality of conveyor hoppers 600, and depositing the proppant 38 into a chute 822 or directly into a blender hopper 810 without passing through a shrouded portion 802. In this embodiment, the chute 822 or blender hopper 810 is adapted or positioned to remain lower to the ground than the top surface 702 of the conveyor belt 700 such that proppant 38 is deposited directly into either the chute 822 or the blender hopper 810 by gravity feed 812 as the conveyor belt 700 turns about around a roller 708. This embodiment, for example, provides that the one or more engines 710 and the controls 1017, if any, may need to be moved from the second end 1014 of the conveyor 1000 to the first end 1012 to accommodate the elimination of the shrouded portion 802 at the second end 1014. In this embodiment, the wheels 1016 of the conveyor 1000 may also move to the first end 1012 of the conveyor 1000. This embodiment may also include a blender hopper cover 1208 and a plurality of curtains 1200 to reduce the risk of production and release of silica dust 50 at the well site 30.

Referring to FIGS. 8A-8B, the shroud 800 is a box, tube, or container structure that substantially or completely encloses a the shrouded portion 802 of the conveyor belt 700 while it is traveling in an upward direction towards the second end 1014 of the conveyor 1000. The shroud 800 can be a closed and elongated box having four sides 816A, 816B, 816C, 816D, and a first end 818A and a second end 818B, each end being open to allow the conveyor belt to pass through. The sides 816A-D of the shroud 800 can include a plurality of steel panels bolted together around the conveyor belt 700, and bolted to the conveyor at a first end 818A, and bolted to the chute 822 at a second end 818B. The material need not be steel panels, but could also include a seamless steel box, or another structure made of a similar metal, plastic, cloth, tarp, or other sheets. The shroud 800 need not fully enclose the conveyor belt 700. For example, the shroud 800 may include a tarp covering the top surface 702 of the conveyor belt 700 having a plurality of partitions 712, connected to the second end 1014 of the conveyor 1000 at the first end 818A of the shroud 800 and the chute 822 at the second end 818B of the shroud 800, using fasteners 820 such as bungee cords, rope, zip ties, or other connection means. Alternatively, the shroud 800 and chute 822 may be integral with one another or fully connected by bolts, welding, or similar connection. The shroud 800 is adapted and positioned to reduce the risk of release of silica dust 50 associated with proppant 38 as it is conveyed along the conveyor belt 700. The shroud 800 also prevents wind from blowing proppant 38 off of the conveyor belt 700, and rain from wetting the proppant 38 that may hinder the proppant 38 from flowing properly.

The chute 822 is positioned at the second end 1014 of the conveyor 1000 to receive the proppant 38 that is deposited by the conveyor belt 700 via gravity feed 812. The chute 822 can be tube-shaped, but a chute 822 may alternatively have a bottom portion and a top portion, for example. The chute 822 has an inlet 824 and one or more outlets 826, the inlet 824 positioned to receive the second end 1014 of the conveyor 1000 and the one or more conveyor belts 700 conveying proppant, and the one or more outlets 826 of the chute 822 positioned to deposit proppant 38 into a blender hopper 810 or another location on the well site 30. The chute 822, like the shroud 800, is adapted and positioned to reduce the risk of release of silica dust 50 at the well site 30, but also to prevent wind and rain from contacting the proppant 38. The chute 822, in one embodiment, for example, is rotatably connected to the shrouded portion 802 of the conveyor belt 700 such that an operator 806 or a machine can hold on to handles 823 attached to the chute 822 for positioning the opening or openings 826 of the chute 822 towards a blender hopper 810 or another location at a well site 30, as shown in FIG. 8C. The chute 822 may be controlled manually, by hydraulics, or by electronics via remote or wireless control, or via the internet. If hydraulics are used, for example, a plurality of hydraulic pressure hoses 819 can connect the chute 822 to the one or more engines 710 and controls 1017. If electronics are used, for example, a plurality of wires 821 can be used to connect the chute 822 to the one or more engines 710 and controls 1017. Wireless connections are also contemplated. A person of skill in the art would understand the various connections to engines 710 and controls 1017 available for powering the chute 822.

Figure 12C:
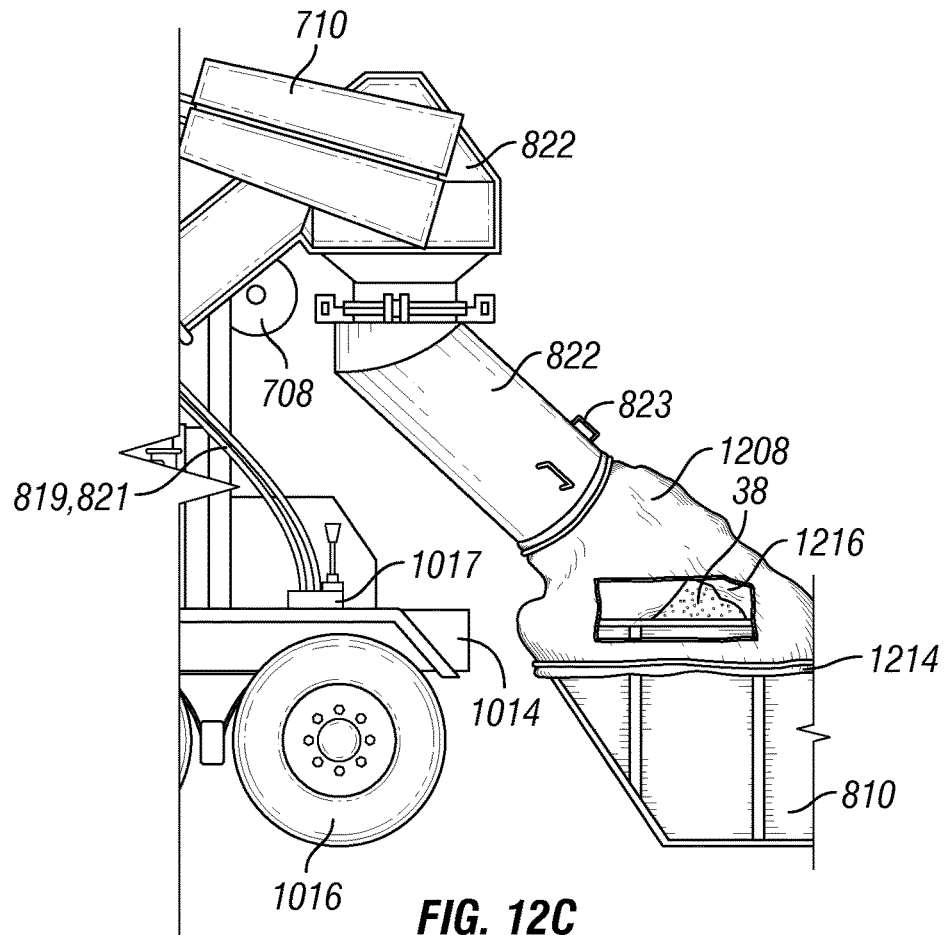
FIG. 12C is a perspective view of a blender hopper cover positioned between a chute and a blender hopper of a conveyor according to an embodiment of a system and method of the present invention.

Well site operators also may be concerned about reducing the silica dust 50 that may be produced or released as proppant 38 flows from the one or more openings 826 of the chute 822 into the one or more blender hoppers 810 of one or more blenders 36 at a well site 30. As shown in FIGS. 12A and 12C, a blender hopper cover 1208 may be attached to, or positioned over the one or more openings 826 of the chute 822 to substantially or completely enclose the path between the one or more openings 826 of the chute 822 to the blender hopper 810. The blender hopper cover 1208 may be adapted to connect more than one chute 822 into the same blender hopper 810, for instance, where two conveyors 1000 of the present invention are positioned adjacent each other at a well site 30. In another embodiment, and as shown in FIG. 8D and FIG. 10C, for example, the blender hopper cover 1208 may be attached or positioned over the second end 1014 of the conveyor 1000 and the one or more conveyor belts 700 to substantially enclose the path between the second end 1014 of the conveyor 1000 and the one or more conveyor belts 700 to the blender hopper 810. In this embodiment, as well, the blender hopper cover may be adapted to connect more than one second end 1014 of the conveyor 1000 and conveyor belt 700 to the same blender hopper 810, for instance, where two conveyors 1000 of the present invention are positioned adjacent each other at a well site 30. The blender hopper 1208 cover may include tarps 1210, steel panels 1212, or panels of similar metals, plastic, or similar material. The blender hopper cover can be manufactured to fit over or attach to the one or more openings 826 of the chute 822 and to the one or more blender hoppers 810 of the one or more blenders 36 at a well site 30. The blender hopper cover 1208 may include a window portion 1216 so the operator 806 may inspect the progress of proppant 38 as it fills up the blender hopper 810. The blender hopper 810 may also include electronic or wireless transmission signals to an operator 806 or machine to indicate a problem or that the blender hopper 810 is full. The blender hopper cover 1208 reduces the risk of production and release of silica dust 50 at the well site 30 as proppant flows out of an embodiment of a system to one or more blenders 36.

As demonstrated in FIGS. 1, 3, 4, 5C, 6A-6C, 7A, and 8A-8C, an embodiment of the method of the present invention includes, for example, positioning 100 a plurality of containers 900 each having proppant 38 for fracking contained therein onto a conveyor 1000 at a well site 30, the conveyor 1000 having a plurality of conveyor hoppers 600 and each of the plurality of conveyor hoppers 600 overlaying one or more conveyor belts 700, each respective container 900 having a sealed top 904, 914 to reduce risk of release of silica dust 50 associated with proppant 38 into the air. It further includes downwardly discharging 110 proppant 38 from each respective container 900 of the plurality of containers 900, each respective container 900 further having inclined lower inner portions 922 and one or more outlets 924 positioned at a bottom 906 of each respective container 900, such that as proppant 38 flows by gravity feed 812 along the inclined lower inner portions 922 to and through the one or more outlets 924, the risk of production and release of silica dust 50 into the air is reduced, and the respective container 900 is substantially emptied of proppant 38. It further comprises funneling 120 proppant 38 from the one or more outlets 924 of each of the plurality of containers 900 through a plurality of conveyor hoppers 600, each respective conveyor hopper 600 having inclined sides 602 and one or more controllable openings 610 positioned adjacent and overlying the one or more conveyor belts 700, such that as proppant 38 flows by gravity feed 812 along the inclined sides 902 of each of the plurality of conveyor hoppers 600 through the one or more controllable openings 610 to the conveyor belt 700, the risk of production and release of silica dust 50 into the air through the one or more controllable openings 610 is reduced. It further comprises receiving 130 proppant onto the one or more conveyor belts 700, the conveyor belt 700 having a plurality of partitions 712 associated therewith, such that the plurality of partitions 712 are positioned to reduce risk of production and release of silica dust 50 into the air as proppant 38 contacts and is carried by the conveyor belt 700. It further comprises conveying 140 proppant 38 on the conveyor belt 700 to a chute 822, the conveyor belt 700 having a first end portion 705 and a second end portion 707, the second end portion 707 of the conveyor belt 700 including a shrouded portion 802 that has a shroud 800 substantially enclosing the conveyor belt 700 and positioned to substantially reduce risk of release of silica dust 50 associated with proppant 38 into the air as the proppant 38 is conveyed through the shrouded portion 802. It further comprises depositing 150 the proppant 38 from the second end portion 707 of the conveyor belt 700 to the chute 822 for depositing into a blender hopper 810 or another location at the well site 30.

After proppant 38 has been discharged from a respective container 900 of the plurality of containers 900, the method further can include removing 160 the respective container 900 from the conveyor 1000 for replacement with another respective container 900 filled with proppant 38, such that the conveyor belt 700 continuously conveys proppant 38 at the well site 30 from the plurality of containers 900 to the blender 36. An operator 806 or machine may use a forklift 34, crane 35, or other heavy machinery to move containers 900 at the well site 30.

A flow gate 932 and inclined lower inner portions 922 of each respective container 900 help to control the flow of proppant 38 from the container 900 and thereby reduce the risk of production of silica dust 50 from the container 900. An embodiment of the method further can include controlling 170 the rate of proppant 38 as it flows through the one or more outlets 924 of each respective container 900 by one or more flow gates 932 positioned at the one or more outlets 924 to reduce the risk of production and release of silica dust 50 into the air through the one or more outlets 924. The flow gate 932 can be connected to an actuator 502 thereby to enhance opening and closing of the flow gate 932. The actuator 502 may be optionally controlled by hydraulics or electronics. If hydraulics are used, for example, a plurality of hydraulic pressure hoses 503 can connect the actuator 502 to the one or more engines 710 and controls 1017. If electronics are used, for example, a plurality of wires 505 can be used to connect the actuator 502 to the one or more engines 710 and controls 1017. Wireless connections are also contemplated. A person of skill in the art would understand the various connections to engines 710 and controls 1017 available for powering the actuator 502. The inclined lower inner portions 922 of each respective container 900 are inclined inwardly from inner walls of the respective container toward a bottom of the container at an angle 928 of about 31 degrees to about 37 degrees relative to a horizontal plane 920 of the bottom of each respective container 900 when each respective container 900 is level. This angle 928 helps to empty the container 900 of proppant 38 to reduce the risk of silica exposure for well site workers.

A hopper gate 612, a hopper gate actuator 613, and a plurality of inclined sides 602 of each respective conveyor hopper 600 help to control the flow of proppant 38 from each respective conveyor hopper 600 and thereby reduce the risk of production and release of silica dust 50 from the conveyor hopper 600. The method can also further include controlling 180 the rate of proppant 38 as the proppant 38 flows from the one or more controllable openings 610 of each respective conveyor hopper 600 to reduce the risk of production and release of silica dust 50 into the air through the one or more controllable openings 610, the one or more controllable openings 610 having a hopper gate 612 connected to a hopper gate actuator 613. The hopper gate actuator 613 is optionally controlled by hydraulics or electronics to enhance opening and closing of the one or more controllable openings 610 via the hopper gate 612. If hydraulics are used, for example, a plurality of hydraulic pressure hoses 614 can connect the hopper gate actuator 613 to the one or more engines 710 and controls 1017. If electronics are used, for example, a plurality of wires 616 can be used to connect the hopper gate 612 to the one or more engines 710 and controls 1017. Wireless connections are also contemplated. A person of skill in the art would understand the various connections to engines 710 and controls 1017 available for powering the hopper gate actuator 613. The plurality of inclined sides 602 can include, for example, a pair of short sides 604A1, 604A2 representing the depth of the conveyor hopper 600, and a pair of long sides 604B1, 604B2 representing the length of the conveyor hopper 600. The plurality of inclined sides 602 are positioned wherein pair of short sides 604A1, 604A2 have a funnel angle 605A or slope of approximately 35 to 40 degrees relative to a horizontal plane, and a pair of long sides 604B1, 604B2 have a funnel angle 605B or slope of approximately 28 to 33 degrees relative to a horizontal plane, in order to maximize the capacity of the conveyor hopper 600 and the flow of proppant 38 from the conveyor hopper 600, and to reduce the risk of production and release of silica dust 50 from each respective conveyor hopper 600.

In another embodiment, for example, and as illustrated in FIGS. 1, 3, 4, 5C, 6A-6C, 7A, and 8D, the method can include utilizing a plurality of containers 900 having proppant 38 for fracking contained therein, each respective container 900 having an outlet 924 and a sealed top 904, 914, the sealed top 904, 914 positioned to reduce risk of release of silica dust 50 associated with proppant 38 from the sealed top 904, 914 of each respective container 900. It further comprises positioning 100 each respective container 900 on a conveyor 1000 at a well site 30, the conveyor 1000 having a plurality of conveyor hoppers 600 and each of the plurality of conveyor hoppers 600 having one or more controllable openings 610 that is in fluid communication with a conveyor belt 700 that underlies the conveyor 1000 to reduce risk of production and release of silica dust 50 associated with proppant 38 as the proppant 38 flows from each respective container 900. It further comprises downwardly discharging 110 the proppant 38 from each respective container 900 through each respective controllable opening 610 of each respective conveyor hopper 600 onto the conveyor belt 700, the conveyor belt 700 having a first end portion 705, a second end portion 707, and a plurality of partitions 712 associated therewith, the plurality of partitions 712 of the conveyor belt 700 positioned to enhance reduction of production and release of silica dust 50 as the proppant 38 contacts and is carried by the conveyor belt 700. It further comprises conveying 240 the proppant to one or more blender hoppers 810, and depositing 250 the proppant 38 into the one or more blender hoppers 810 by gravity feed 812.

The method also can include, for example, removing 160 each respective container 900 that has been substantially emptied of proppant 38 from the conveyor 1000 at the well site 30 with a forklift 34 for replacement with a second respective container 900 filled with proppant 38 for fracking contained therein such that the conveyor belt 700 is continuously conveying proppant 38 when in operation to the chute 822.

The method also can include, for example, controlling 170 the rate of proppant 38 flowing from each respective container 900 using a flow gate 932 positioned at the one or more outlets 924 of each respective container 900 to reduce risk of production and release of silica dust 50 associated with proppant 38 into the air as proppant 38 flows out of the one or more outlets 924, as shown in FIG. 5B.

The method also can include, for example, controlling 180 the rate of proppant 38 downwardly flowing from each respective conveyor hopper 600 using a hopper gate 612 with a hopper gate actuator 613 positioned at the one or more controllable openings 610 of each respective conveyor hopper 600, and optionally controlling the hopper gate actuator 613 by hydraulics or electronics to enhance opening and closing of the hopper gate 612 to reduce risk of production and release of silica dust 50 associated with proppant 38 into the air as proppant 38 flows out of the one or more controllable opening 610, as shown in FIG. 11 and FIG. 7A. If hydraulics are used, for example, a plurality of hydraulic pressure hoses 614 can connect the hopper gate actuator 613 to the one or more engines 710 and controls 1017. If electronics are used, for example, a plurality of wires 616 can be used to connect the hopper gate 612 to the one or more engines 710 and controls 1017. Wireless connections are also contemplated. A person of skill in the art would understand the various connections to engines 710 and controls 1017 available for powering the hopper gate actuator 613.

The method also can include, for example, positioning 245 a shroud 800 over a portion 802 of the second end 707 of the conveyor belt 700 thereby to define a shrouded portion 802, the shrouded portion 802 positioned between the last respective container 900 on the conveyor 1000 and the chute 822 at an angle 805 of approximately 30 to 60 degrees from a horizontal plane 1020 when the conveyor is level. The shroud 800 substantially encloses the one or more conveyor belts 700 to reduce the risk of release of silica dust 50 associated with proppant 38 in the air.

The method also can include, for example, positioning 102 each of the plurality of containers 900 side-by-side on the conveyor 1000.

The method also can include, for example, positioning 104 the plurality of containers 900 adjacent each other on the conveyor 1000, wherein each of the plurality of partitions 712 of the conveyor belt 700 extend upwardly from a top surface 702 of the conveyor belt 700 toward the conveyor hopper 600 when positioned to underlie the conveyor hopper 600 and each of the plurality of fingers 714 is spaced-apart from another one of the plurality of fingers 714 so that the top surface 702 of the conveyor belt 700 guidingly receives the proppant 38 thereon and between the plurality of partitions 714.

An embodiment of the system of the present invention can include, for example, a plurality of containers 900 each adapted to have proppant 38 for fracking contained therein, each respective container 900 having a sealed top 904, 914 to reduce risk of release of silica dust 50 associated with proppant 38 into the air when positioned therein. Each respective container 900 has interior portions 922 inclined toward an outlet 924 at a bottom 916 of each respective container 900 to reduce risk of production and release of silica dust 50 associated with proppant 38 as the proppant 38 flows from each respective container 900 until each respective container 900 is substantially empty.

The system further can include a conveyor 1000 positioned at a well site 30 and to receive each respective container 900 of the plurality of containers 900, the conveyor 1000 having one or more conveyor hoppers 600 that align closely with each respective outlet 924 of the plurality of containers 900 to reduce risk of production and release of silica dust 50 into the air, each of the one or more respective conveyor hoppers 600 having a lower portion 608 including an opening 610, such that when proppant 38 downwardly flows through each respective outlet 924 of each respective container 900 of the plurality of containers 900 when positioned therein, the proppant 38 passes to and through the opening 610 of each of the one or more respective conveyor hoppers 610.

The system further can include one or more conveyor belts 700 positioned to underlie the one or more conveyor hoppers 600 to receive proppant 38 as the proppant 38 passes to and through the opening 610 of each of the one or more respective conveyor hoppers 600, the conveyor belt 700 having a first end 705, a second end 707, and a plurality of partitions 714 associated therewith, such that the plurality of partitions 714 are positioned to reduce risk of production and release of silica dust 50 as proppant 38 contacts and is carried by the conveyor belt 700.

The system further can include a shroud 800 positioned to overlie a portion of the second end 705 of the conveyor belt 700 thereby to define a shrouded portion 802 of the conveyor belt 700, the shroud 800 substantially enclosing the shrouded portion 802 as the conveyor belt 700 conveys proppant 38 when positioned thereon from the plurality of containers 900 to reduce risk of release of silica dust 50 associated with proppant 38 into the air from the shrouded portion 802.

The system further can include a chute 822 having an inlet 824 positioned to receive the second end 707 of the conveyor belt 700 conveying proppant 38 and one or more outlets 826 positioned such that as proppant 38 is deposited into the chute 822 by gravity feed 812, proppant 38 flows out of the one or more outlets 826 to a blender hopper 810 or other location at the well site 30.

The system also further can include a blender hopper cover 1208 positioned to reduce risk of production and release of silica dust 50 as proppant 38 flows between the one or more outlets 826 of the chute 822 and the one or more blender hoppers 810 of the one or more blenders 36 at a well site 30.

The system also further can include a forklift 34 positioned at a well site 30 to load and unload each respective container 900 onto and off of the conveyor 1000 by one or more slots 901, wherein each of the plurality of containers 900 has one or more slots 901 positioned adjacent a bottom portion 906 of the respective container 900.

The system also further can include a plurality of curtains 1200 positioned on or adjacent the conveyor 1000 to reduce risk of production and release of silica dust 50 as proppant 38 flows from the plurality of conveyor hoppers 600 to the one or more conveyor belts 700.

Another embodiment of the system, for example, can include a plurality of containers 900 each adapted to have proppant 38 for fracking contained therein, each respective container 900 having a sealed top 904, 914 to reduce risk of release of silica dust 50 associated with proppant 38 into the air when positioned therein. Each respective container 900 has interior portions 922 inclined toward an outlet 924 at a bottom 906 of each respective container to reduce risk of production and release of silica dust 50 associated with proppant 38 as the proppant 38 flows from each respective container 900 until each respective container 900 is substantially empty.

The system further can include a conveyor 1000 positioned at a well site 30 and to receive each respective container 900 of the plurality of containers 900, the conveyor 1000 having one or more conveyor hoppers 600 that align closely with each respective outlet 924 of the plurality of containers 900 to reduce risk of production and release of silica dust 50 into the air, each of the one or more respective conveyor hoppers 600 having a lower portion 608 including an opening 610, such that when proppant 38 downwardly flows through each respective outlet 924 of each respective container 900 of the plurality of containers 900 when positioned therein, the proppant 38 passes to and through the opening 610 of each of the one or more respective conveyor hoppers 600.

The system further can include one or more conveyor belts 700 positioned to underlie the one or more conveyor hoppers 600 to receive proppant 38 as the proppant 38 passes to and through the opening 610 of each of the one or more respective conveyor hoppers 600, the conveyor belt 700 having a first end 705, a second end 707, and a plurality of partitions 714 associated therewith, such that the plurality of partitions 714 are positioned to reduce risk of production and release of silica dust 50 as proppant 38 contacts and is carried by the conveyor belt 700.

Figure 8D:
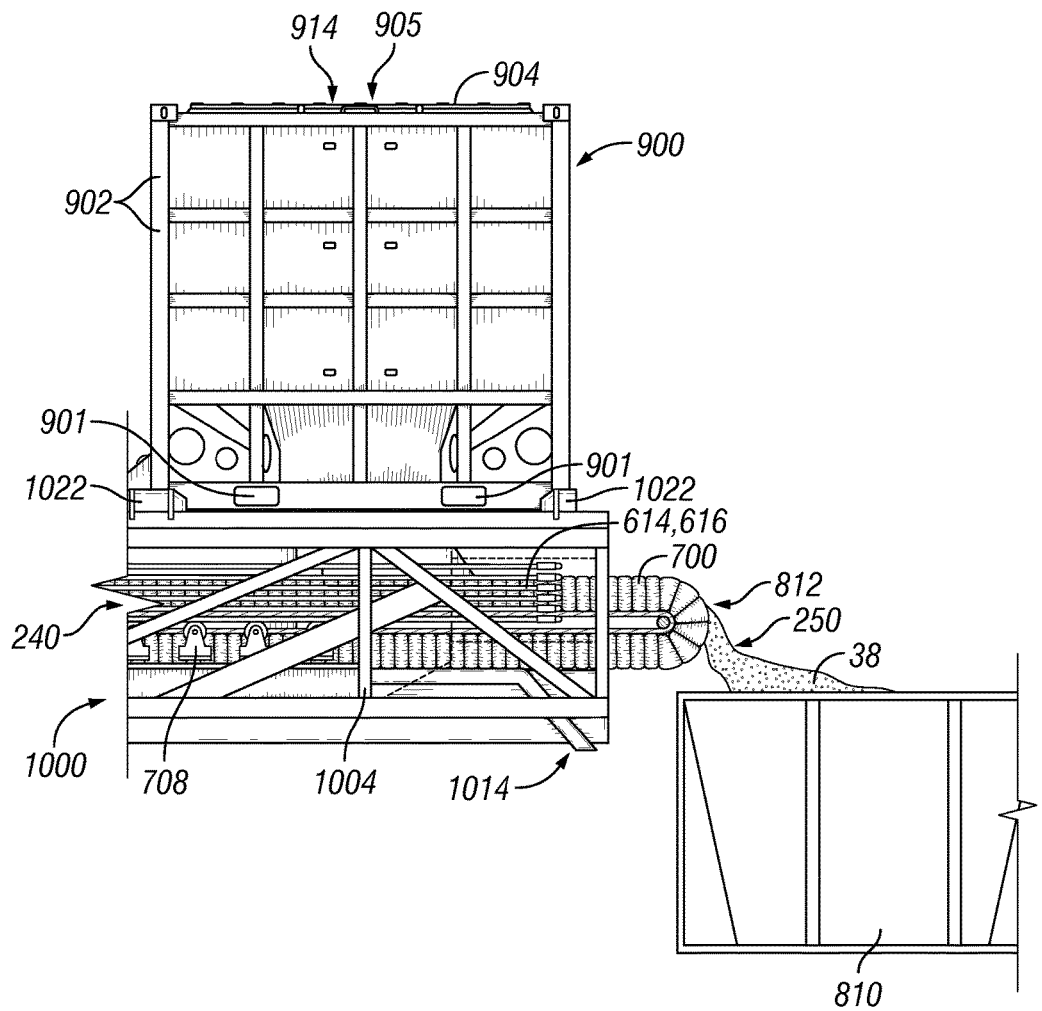
FIG. 8D is a perspective view of an alternative embodiment of a second end of a conveyor without a shroud according to an embodiment of a system and method of the present invention.

As shown in FIG. 8D, the system further can include a blender hopper 810 positioned to underlie the second end 707 of the conveyor belt 700 conveying proppant 38 such that proppant 38 is deposited into the blender hopper 810 by gravity feed 812.

Figure 12D:
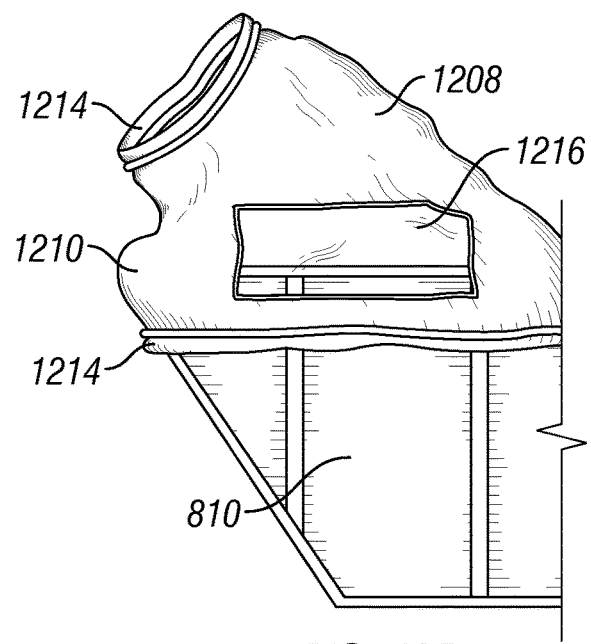
FIG. 12D is a perspective view of a blender hopper cover of a conveyor and being positioned between a second end of the conveyor and a blender hopper according to an embodiment of a system and method of the present invention.

As shown in FIG. 12D, the system also further can include a blender hopper cover 1208 positioned to reduce risk of production and release of silica dust 50 as proppant 38 flows between the one or more outlets 808 of the chute 822 and the one or more blender hoppers 810 of the one or more blenders 36 at a well site 30.

The system also further can include a forklift 34 positioned at a well site 30 to load and unload each respective container 900 onto and off of the conveyor 1000 by one or more slots 901, wherein each of the plurality of containers 900 has one or more slots 901 positioned adjacent a bottom portion 916 of the respective container 900.

The system also further can include a plurality of curtains 1200 positioned on or adjacent the sides of the conveyor 1000 to reduce risk of production and release of silica dust 50 as proppant 38 flows from the plurality of conveyor hoppers 600 to the conveyor belt 700.

The owner of the present application conducted experiments to determine the amount of reduction to respirable crystalline silica particles using an embodiments of method and systems relative to conventional pneumatic delivery. The testing was carried out by Weston Solutions, Inc. of Lakewood, Colo. The tests were based on samples collected for personal breathing zone samples to assess likely employee exposure to respirable crystalline silica by job category at a well site. Personal breathing zone samples were collected in order to compare the results to those found in the NIOSH study.

Personal breathing zone samples were collected using conventional industrial hygiene techniques. A filter cassette and a particle sizing cyclone were affixed to each monitored worker's collar or shoulder seam within ten inches of the mouth and nose. A Tygon™ tube conducted airflow from the breathing zone collection device to a hygiene sampling pump worn in a pouch affixed to a belt around the worker's waist. Sample flow rates were determined before and after sampling using a primary standard flow calibrator.

Sixteen personal breathing zone monitoring samples were collected over three days, and during four work shifts. Three of the sixteen samples exceeded the OSHA Permissable Exposure Limit ("PEL") for respirable dust containing silica, or about 19%. These were notably fewer results from this assessment above the PEL than in the NIOSH study cited in the Silica Hazard Alert, discussed in the background section, where 51.4% of breathing zone samples exceeded the PEL. No breathing zone sample in this assessment exceeded the PEL by more than a factor of five, whereas six breathing zone exposure monitoring results of forty total from a Minot area well fracture job using pneumatic sand delivery exceeded the PEL by a factor of ten or more. Four of the sixteen personal breathing zone samples, or 25%, exceeded the NIOSH Recommended Exploded Limit ("REL"). On a pneumatic delivery fracture job near Minot, twenty-four of the forty breathing zone samples, or 60%, exceeded the NIOSH REL. That result was somewhat less than in the NIOSH study where 68.5% of all samples exceeded the REL. In summary, the geometric mean result for breathing zone samples from t-belt operators in the NIOSH study was 0.327 mg/m$^3$ as the REL, whereas the geometric mean exposure for sand workers in this assessment was 0.0874 mg/m$^3$, a roughly four-fold reduction.

This application is a continuation and claims priority to, and the benefit of, U.S. patent application Ser. No. 14/676,039, filed Apr. 1, 2015, titled "Methods and Systems to Transfer Proppant for Fracking with Reduced Risk of Production and Release of Silica Dust at a Well Site," which claims priority to, and the benefit of, U.S. Provisional Application No. 62/012,160, filed Jun. 13, 2014, titled "Process and Apparatus for Reducing Silica Exposure During the Delivery of Proppants to a Mine," U.S. Provisional Application No. 62/014,479, filed on Jun. 19, 2014, titled "System and Methods for Reducing Silica Exposure at a Well Site," and U.S. Provisional Application No. 62/114,614, filed Feb. 11, 2015, titled "Methods and Systems to Transfer Proppant for Fracking with Reduced Risk of Production and Release of Silica Dust at a Well Site." The present application still further is a continuation in part of U.S. application Ser. No. 13/555,635, filed on Jul. 23, 2012, and titled "Proppant Discharge System Having a Container and the Process for Providing Proppant to a Well Site," all of which are incorporated herein by reference in their entireties.

The foregoing disclosure and description of the invention is illustrative and explanatory of the embodiments of the invention. Various changes in the details of the illustrated embodiments can be made within the scope of the appended claims without departing from the true spirit of the invention. The embodiments of the present invention should only be limited by the following claims and their legal equivalents.

The invention claimed is:

1. A method of transferring proppant for fracking at a well site, the method comprising:
   positioning a plurality of containers each having proppant for fracking contained therein onto a container cradle at the well site, each of the plurality of containers overlaying a conveyor belt and positioned within a respective compartment formed on the container cradle and at least partially defined by a respective receptacle coupled to the container cradle;
   downwardly discharging proppant from each respective container of the plurality of containers, each respective container further having inclined lower inner portions and one or more outlets positioned at a bottom of each respective container, the inclined lower inner portions being supported by one or more inclined lower inner portion supports extending toward an outer surface of the inclined lower inner portions from a frame of the containers, the inclined lower inner portion supports shaped to conform to an outer surface of the inclined lower inner portions and extending radially inward toward the one or more outlets, such that as proppant flows by gravity feed along the inclined lower inner portions to and through the one or more outlets, risk of production and release of silica dust into the air is thereby reduced, and the respective container is substantially emptied of proppant;
   funneling proppant from the one or more outlets of each of the plurality of containers, such that as proppant flows by gravity feed to the conveyor belt, risk of production and release of silica dust into the air is thereby reduced;
   receiving proppant onto the conveyor belt, the conveyor belt arranged to reduce the risk of production and release of silica dust into the air as the proppant contacts and is carried by the conveyor belt;
   conveying proppant on the conveyor belt to a chute, the conveyor belt having a first end portion and a second end portion;
   depositing the proppant from the second end portion of the conveyor belt into the chute; and
   after proppant has been discharged from a respective container of the plurality of containers, removing the respective container from the conveyor for replacement with another respective container filled with proppant, such that the conveyor belt continuously conveys proppant at the well site from the plurality of containers to the chute.

2. The method of claim 1, further comprising:
   controlling the rate of proppant as it flows through the one or more outlets of each respective container using a flow gate positioned at the one or more outlets to reduce the risk of production and release of silica dust into the air through the one or more outlets, the flow gate optionally controlled by hydraulics or electronics to enhance opening and closing of the flow gate, and wherein the container cradle includes a plurality of conveyor hoppers positioned side-by-side and are substantially aligned with the plurality of containers.

3. The method of claim 1, wherein the inclined lower inner portions of each respective container are inclined inwardly from inner walls of the respective container toward the respective bottoms of the plurality of containers at an angle of about 31 degrees to about 37 degrees relative to a horizontal plane of the bottom of each respective container when each respective container is level.

4. The method of claim 2, further comprising:
   controlling the rate of proppant as it flows from one or more controllable openings of each respective conveyor hopper to reduce the risk of production and release of silica dust into the air through the one or more controllable openings, the one or more controllable openings having a hopper gate and a hopper gate actuator, the hopper gate actuator being controlled by: (a) hydraulics, or (b) electronics; and
   wherein a plurality of inclined side portions of the conveyor hopper further comprise a pair of short side portions of the conveyor hopper having a funnel angle or slope of approximately 35 to 40 degrees relative to a horizontal plane, and a pair of long side portions of the conveyor hopper having a funnel angle or slope of approximately 28 to 33 degrees relative to a horizontal plane, to maximize the capacity of the conveyor hopper and the flow of proppant from the conveyor hopper.

5. The method of claim 1, wherein the second end portion includes a shrouded portion positioned between a last respective container on the container cradle and the chute at an angle of approximately 30 to 60 degrees from a horizontal plane when the container cradle is level, and the respective receptacles comprise walls fixed to the container cradle and extending upwards from a top surface of the container cradle, the walls directing the plurality of containers to the respective compartments.

6. A method for reducing risk of production and release of silica dust at a well site during the transport of proppant for fracking, the method comprising:
utilizing a plurality of containers having proppant for fracking contained therein, each respective container having a plurality of inclined lower inner portions, each respective container further having an outlet, a top positioned to reduce risk of release of silica dust associated with proppant from the top of each respective container, structurally supported sidewalls extending between corners posts to thereby at least partially define an interior volume of each respective container of the plurality of containers, and support braces arranged along the sidewalls in a cage-like configuration to support the container when proppant is contained therein, the support braces shaped to conform to an outer surface of the inclined lower inner portions and extend radially inward toward the outlet;
positioning each respective container on a conveyor at the well site, the conveyor having a plurality of hoppers arranged below a top surface of the conveyor and each of the plurality of hoppers having a controllable opening that is in fluid communication with a conveyor belt that underlies the conveyor to reduce risk of production and release of silica dust associated with proppant as the proppant flows from each respective container;
downwardly discharging the proppant from each respective container through each respective opening of each respective hopper onto the conveyor belt, the conveyor belt having a first end portion and a second end portion;
conveying the proppant to a blender hopper; and
depositing the proppant into the blender hopper by gravity feed.

7. The method of claim 6, wherein the plurality of inclined lower inner portions are each inclined at an angle of about 31 degrees to about 37 degrees relative to a horizontal plane of a bottom of each respective container when each respective container is level, such that proppant downwardly flows by gravity feed along the plurality of inclined lower inner portions to reduce risk of production and release of silica dust associated with proppant into the air at the outlet of each respective container until each respective container is substantially empty of proppant, and wherein the support members are substantially parallel to one or more of the corner posts.

8. The method of claim 6, further comprising:
after proppant has been downwardly discharged from each respective container, removing each respective container from the conveyor at the well site with a forklift via engagement of one or more slots coupled to a frame for replacement with a second respective container filled with proppant for fracking contained therein such that the conveyor belt is continuously conveying proppant to the blender hopper.

9. The method of claim 6, further comprising:
controlling the rate of proppant flowing from each respective container using a flow gate positioned at the outlet of each respective container to reduce risk of production and release of silica dust associated with proppant into the air as proppant flows out of the outlet; and
controlling the flow gate by hydraulics or electronics to enhance opening and closing of the flow gate to reduce risk of production and release of silica dust associated with proppant into the air as proppant flows out of the outlet.

10. The method of claim 6, further comprising:
controlling the rate of proppant downwardly flowing from each respective hopper using a hopper gate and a hopper gate actuator positioned at the controllable opening of each respective hopper, wherein the plurality of hoppers are positioned side-by-side and are substantially aligned with the plurality of containers; and
controlling the hopper gate actuator by hydraulics or electronics to enhance opening and closing of the hopper gate to reduce risk of production and release of silica dust associated with proppant into the air as proppant flows out of the controllable opening.

11. The method of claim 6, further comprising positioning a shroud over a portion of the second end portion of the conveyor belt thereby to define a shrouded portion, the shroud substantially enclosing the shrouded portion to reduce the risk of release of silica dust associated with the proppant into the air, and wherein the support members extend along substantially an entire length of the sidewalls.

12. The method of claim 6, wherein each of the plurality of containers is positioned side-by-side on the conveyor, a top surface of the conveyor is substantially aligned with a plane of a respective top portion of each hopper of the plurality of hoppers, and the support members are arranged in a spaced relationship and positioned about a perimeter of the container.

13. The method of claim 6, wherein the plurality of containers are positioned adjacent each other on the conveyor, and wherein each of a plurality of partitions of the conveyor belt extend upwardly from a top surface of the conveyor belt toward the plurality of hoppers when positioned to underlie the plurality of hoppers and each of the plurality of partitions is spaced-apart from another one of the plurality of partitions so that the top surface of the conveyor belt receives the proppant thereon and between the plurality of partitions.

* * * * *